United States Patent [19]

Cagley et al.

[11] Patent Number: 5,112,638
[45] Date of Patent: May 12, 1992

[54] PROCESS FOR THE IMPROVEMENT OF EDIBLE FIBER AND PRODUCT

[75] Inventors: Paul M. Cagley; James O. Kysilka, both of Fargo, N. Dak.; Terry D. McGillivray, Moorhead, Minn.

[73] Assignee: American Crystal Sugar Company, Moorhead, Minn.

[21] Appl. No.: 580,263

[22] Filed: Sep. 10, 1990

Related U.S. Application Data

[63] Continuation of Ser. No. 406,954, Sep. 11, 1989.

[51] Int. Cl.$^5$ .............................. A23L 1/214
[52] U.S. Cl. ................... 426/640; 426/270; 162/99; 162/150; 127/44
[58] Field of Search ............... 426/541, 267, 270, 615, 426/623, 635, 258, 259, 640, 431, 253, 256, 251, 429, 658; 162/91, 99, 10, 160, 150; 127/43, 44

[56] References Cited

U.S. PATENT DOCUMENTS

| | | |
|---|---|---|
| 18,389 | 10/1857 | Collyer . |
| 1,448,512 | 3/1923 | Benjamin . |
| 2,367,771 | 1/1945 | Hampel . |
| 2,426,076 | 8/1947 | Zenzes . |
| 2,430,674 | 11/1947 | Hampel . |
| 2,474,650 | 6/1949 | Birdseye . |
| 2,723,199 | 11/1955 | Todd . |
| 2,801,940 | 8/1957 | Stark et al. . |
| 2,807,560 | 9/1957 | Brownell et al. . |
| 3,237,768 | 3/1966 | Koch, Jr. et al. . |
| 3,251,731 | .5/1966 | Gard . |
| 3,365,297 | 1/1968 | Burgess et al. . |
| 3,484,254 | 12/1969 | Peterson et al. . |
| 3,574,634 | 4/1971 | Singer . |
| 3,676,150 | 7/1972 | Glicksman et al. . |
| 3,692,531 | 9/1972 | Heusdens et al. . |
| 3,734,773 | 5/1973 | Haley . |

(List continued on next page.)

FOREIGN PATENT DOCUMENTS

| | | |
|---|---|---|
| 1191378 | 8/1985 | Canada . |
| 105482 | 4/1984 | European Pat. Off. . |
| 223703 | 5/1987 | European Pat. Off. . |
| 308299 | 3/1989 | European Pat. Off. . |
| 414329 | 8/1910 | France . |
| 1603673 | 6/1971 | France . |
| 2589683 | 5/1987 | France . |
| 224484 | 7/1985 | German Democratic Rep. . |
| 57-54573 | 4/1982 | Japan . |
| 58-9665 | 1/1983 | Japan . |
| 61-103832 | 5/1986 | Japan . |
| 2-77250 | 3/1990 | Japan . |
| WO88/09622 | 12/1988 | PCT Int'l Appl. . |
| WO89/04120 | 5/1989 | PCT Int'l Appl. . |
| 250359 | 6/1948 | Switzerland . |
| 2733 | of 1855 | United Kingdom . |
| 27 | of 1863 | United Kingdom . |
| 119923 | 10/1918 | United Kingdom . |
| 121355 | 12/1918 | United Kingdom . |
| 1555647 | 11/1970 | United Kingdom . |

OTHER PUBLICATIONS

R. D. Williams et al., *J. Nutr.*, 11, 433 (1936) "The Effect of Cellulose, Hemicellulose and Lignin . . . Laxation in Man".

K. Wagnerowski, *Gazeta Cukrownicza*, 82, 234–239 (1974).

(List continued on next page.)

*Primary Examiner*—Carolyn Paden
*Attorney, Agent, or Firm*—Merchant, Gould, Smith, Edell, Welter & Schmidt

[57] ABSTRACT

A process for preparing a preferred vegetable fiber product is described. A particular process for reducing off-flavor and off-odor problems in materials such as sugarbeet fiber is specifically described. Also, a preferred system for conducting the process, and preferred products are disclosed. In general, the products result from preferred steps of heating, heat-treating, and washing the vegetable fiber material. Food products incorporating the preferred fiber material, and methods for incorporating the preferred fiber material into food products, are described.

20 Claims, 22 Drawing Sheets

U.S PATENT DOCUMENTS

| | | |
|---|---|---|
| 3,928,121 | 12/1975 | Zepeda-Castillo . |
| 3,993,791 | 11/1976 | Breed et al. . |
| 3,998,976 | 12/1976 | Pernod et al. . |
| 4,053,112 | 10/1977 | Vander Hooven et al. . |
| 4,076,552 | 2/1978 | Farag et al. . |
| 4,143,169 | 3/1979 | Skoch et al. . |
| 4,200,486 | 4/1980 | Vagac et al. . |
| 4,241,093 | 12/1980 | Farag et al. . |
| 4,273,590 | 6/1981 | Cronewitz et al. . |
| 4,307,121 | 12/1981 | Thompson . |
| 4,314,854 | 2/1982 | Takagi . |
| 4,326,892 | 4/1982 | Madsen et al. . |
| 4,356,982 | 11/1982 | Nakabayashi et al. . |
| 4,379,782 | 4/1983 | Staub et al. . |
| 4,432,806 | 2/1984 | Madsen et al. . |
| 4,451,489 | 5/1984 | Beale et al. . |
| 4,479,978 | 10/1984 | Robertiello et al. . |
| 4,502,893 | 3/1985 | Dietrich . |
| 4,560,572 | 12/1985 | Watanabe . |
| 4,629,575 | 12/1986 | Weibel . |
| 4,704,201 | 11/1987 | Keck et al. . |
| 4,737,582 | 4/1988 | Goldman et al. . |
| 4,757,948 | 7/1988 | Nomaka et al. . |
| 4,770,886 | 9/1988 | Lee . |
| 4,787,303 | 11/1988 | Papchenko et al. . |
| 4,795,653 | 1/1989 | Bommarito . |
| 4,831,127 | 5/1989 | Weibel . |
| 4,882,190 | 11/1989 | Olson et al. . |

OTHER PUBLICATIONS

K. Wagnerowski, *Gazeta Cukrownicza*, 82, 255–260 (1974).

K. Wagnerowski, C. Dabrowski, S. Murawski, R. Oder, *Gazeta Cukrownicza*, 83, 86–90 (1975).

K. Wagnerowski, C. Dabrowski, S. Murawski, R. Oder, *Gazeta Cukrownicza*, 83, 113–116 (1975).

F. A. Lee, *Basic Food Chemistry*, AVI Publishing Co. Inc., pp. 215–216 (1975).

K. L. Kapur et al., *Indian Food Packer*, "Non-Traditional Uses of Sugarbeet," pp. 40–44 (1977).

A. H. Bausier et al., *Sucrerie Belge*, 96, pp. 371–384 (1977).

L. D. Tyler et al., *J. Agric. Food Chem.*, 26, 1466–1469 (1978).

M. Satin et al., *Cereal Foods World*, 23, 676–680 (1978).

L. D. Tyler, *Ph.D. Thesis*, "The Importance and Origin of Earthy Odor Components in Beets," University Microfilms International, pp. 28, 37, 51 and 56 (1979).

J. Tredger et al., *Diabete & Metabolisme*, 7, 169 (1981).

G. V. Genie, *Sugar Technology Reviews*, Elseview Publishing Co., vol. 9, Juice Extraction in the Beet Sugar Factor, pp. 217, 228, 263, and 266 (Jul. 1982).

P. Kelly, *Animal Feed Science and Technology*, 8, pp. 1–18 (1983).

"Fibrex-A Food Product from Beet Pulp", *Zuckerindustrie*, 110, 1095 (1985).

B. O. Schneeman, *Food Technology*, 40, 104–110 (1986).

A. E. Przybyla, *Food Engineering*, "Sulfite Labeling . . . ," pp. 80–82 (Jun. 1986).

*Food Engineering*, "Acidulants Find Growth Niches in Mature Market," pp. 83–88 (Oct. 1986).

H. Graham et al., *J. Nutr.*, 116, 242–251 (1986).

*Food Engineering*, "New Technology Produces . . . Sugarbeet Fiber," pp. 50–51 (Reprint) (Sep. 1987).

*Prepared Foods*, Reprint, Oct. 1987.

Dietary Fiber Guide, *Cereal Foods World*, 32, 555 (1987).

L. F. Wen et al., *J. Food Sci.*, 53, 826–829 (1988).

L. Phatak et al., *J. Food Sci.*, 53, 830–833 (1988).

*Applied Sensory Analysis of Foods;* vol. I; 1988 Edition; Howard Moskowtz, Ed.,; CRC Press, Inc.; Boca Raton, Fla.; pp. 44–71.

J. Tjebbes, *Chemistry and Processing of Sugarbeet and Sugarcane*, Clarke & Godshall, eds., Elsevier Science Publishers, Amsterdam, Ch. 9, 139–143 (1988).

F. Michel et al., *J. Sci. Food Agric.*, 42, 77–85 (1988).

J. M. Hall, *Cereal Foods World*, 34, 526–528 (1989).

C. T. Gordon, *Cereal Foods World*, 34, 517–523 (1989).

G. S. Lo, *Cereal Foods World*, 34, 530–533 (1989).

E. H. Christensen, *Cereal Foods World*, 34, 541–544 (1989).

"Status Report: Fiber", is a preprint of an article believed to be published in *Food Processing*, Aug. 1989.

"Canadian Harvest of USA" (DuPont/Con Agra), product information sheet.

"Fibrex", product information sheet.

"SSHE Handbook" brochure.

"Contherm ®" brochure.

"We Turned the Earth Upside Down", product information brochure published by American Crystal Sugar in May/Jun. 1987.

"The Natural", product information brochure published by American Crystal Sugar in May/Jun. 1989.

*Kirk-Othmer Encyclopedia of Chemical Technology*, Third Edition, vol. 19, Pulp, pp. 413–415.

*Kirk-Othmer Encyclopedia of Chemical Technology*, Third Edition, vol. 22, Sulfur Compounds, pp. 147 and 164–166.

"Physiological Benefits of Sugarbeet Fiber", compilation of references prepared by American Crystal Sugar Company.

Hagander et al., *Diabetes Res.*, 3:91–96 (Abstract) (1986).

Hagander et. al., *European J. Clin. Nutr.*, 43:35–44 (Abstract) (1989).

OTHER PUBLICATIONS

Lampe et al., *FASAB J. Abstracts,* 4, No. 3, a 527 (Abstract) (1990).

Morgan et al., *Proc. Nutr. Soc.,* 47:105 (Abstract) (1988).

Sandstrom et al., *Brit. J. Nutr.,* 58:49-57 (Abstract) (1987).

Sugarman et al., *J. Amer. Dietetic Assn. Suppl.,* A112 (Abstract) (1989).

"Physiological Effect of Four Types of Dietary Fiber in Healthy Subjects", American Dietetic Association 72nd Annual Meeting in Kansas City, Mo. (Oct. 26, 1989).

"Reduction of Serum Cholesterol with Sugarbeet Fiber Feeding in Normal Human Subjects", University of Minnesota (1989).

F. LaBell, *Food Processing,* "Sugarbeet Fractions are Sources of New Food/Fibers", pp. 52 and 54 (Dec. 1990).

SENSORY ATTRIBUTE MEANS
OF THE ACCEPTABLE LIMITS
OF SUGARBEET FIBER

SENSORY ATTRIBUTE MEANS
FROM THE TASTE PANEL
OF SUGARBEET FIBER

BEFORE PROCESS TREATMENT

SENSORY ATTRIBUTE MEANS
FROM THE TASTE PANEL
OF SUGARBEET FIBER

AFTER PROCESS TREATMENT

SENSORY ATTRIBUTE MEANS
OF THE ACCEPTABLE LIMITS
OF SUGARBEET FIBER

SENSORY ATTRIBUTE MEANS
FROM THE TASTE PANEL
OF SUGARBEET FIBER

AFTER PROCESS TREATMENT
RUN #1

SENSORY ATTRIBUTE MEANS
FROM THE TASTE PANEL
OF SUGARBEET FIBER

AFTER PROCESS TREATMENT
RUN #2

SENSORY ATTRIBUTE MEANS
FROM THE TASTE PANEL
OF SUGARBEET FIBER

AFTER PROCESS TREATMENT
RUN #4

SENSORY ATTRIBUTE MEANS
FROM THE TASTE PANEL
OF SUGARBEET FIBER

AFTER PROCESS TREATMENT
RUN #5

SENSORY ATTRIBUTE MEANS
FROM THE TASTE PANEL
OF SUGARBEET FIBER

AFTER PROCESS TREATMENT
RUN #8

PROCESS FOR THE IMPROVEMENT OF EDIBLE FIBER AND PRODUCT

This application is a continuation-in-part of application Ser. No. 07/406,954, filed Sep. 11, 1989.

FIELD OF THE INVENTION

The present invention relates to dietary fiber material. In particular it concerns such material with a relatively high percentage of total dietary fiber, a relatively high percentage of soluble fiber, a relatively low caloric content, and an odor and flavor acceptable to humans. The present invention also relates to a process and system for the production of dietary fiber material. Furthermore, the present invention concerns food products incorporating the dietary fiber material, and methods for the production of the food products.

GENERAL BACKGROUND OF THE INVENTION

Dietary fiber and the role of fiber in the human diet and metabolism have been areas of extensive research recently, at least in part because numerous human diseases and disorders have been shown to benefit in some fashion from increased fiber content. It has been observed that persons whose diets are high in fiber-containing foods generally have a lower occurrence of intestinal disorders, cardiovascular diseases, and cancer, especially colon cancer.

Total dietary fiber (TDF) may be defined as plant material and other polymers in foods that upon ingestion are resistent to digestion, e.g., hydrolysis, by human gastrointestinal secretions and enzymes in the digestive system. Included within TDF are cellulose, hemicelluloses, lignin, lignin-containing material, pectic substances, and gums, as well as various other complex carbohydrates, i.e., polysaccharides. These compounds are largely found in the cell walls of plant tissues; however, some are found in the intracellular cement and seeds. The broad definition of TDF also includes nonplant materials like xylans and polydextrose. The following discussion, however, is limited to plant material.

Total dietary fiber is made of individual sugars and sugar acids that allow for binding, bonding, or reaction among themselves or with other compounds. TDF components may be generally classified as either soluble or insoluble. For example, cellulose and lignin are considered relatively insoluble, pectin and gums are highly soluble, and hemicelluloses exhibit a wide range of solubilities.

Increased intakes of TDF are correlated with a reduced incidence of major diseases such as cancer of the colon, hypercholesterolemia, atherosclerosis, diabetes, diverticulosis, constipation, hypertension, obesity, and gallstones. The different fiber components of TDF have different physiological functions and effects, both in degree and in kind. For example, it is generally believed that the level of serum cholesterol, and insulin dependency for diabetics, is reduced more by soluble fiber components; whereas, insoluble fiber components are considered effective in treating digestive disorders such as diverticulosis.

It is believed that the different physiological functions and effects of fibers is due, at least in part, to their properties of water-binding and absorption of organic molecules. The reduction in the incidence of cardiovascular diseases apparently relates to the ability of fiber to absorb materials such as bile acids and cholesterol. The intestinal related diseases appear to be affected by the water-binding properties of fiber and the decrease in the transit time of foods through the digestive system. Furthermore, the water-binding properties of fibers are believed to remove possible carcinogenic chemical factors by frequent elimination.

At least in part because of the different health benefits of soluble and insoluble fibers, a dietary fiber material with a relatively high total dietary fiber content that includes a combination of insoluble and soluble fiber components is sometimes advantageous. However, certain dietary fiber materials with a combination of soluble and insoluble fiber components have relatively low concentrations of soluble fiber. For obtaining the benefits associated with both soluble and insoluble fibers, a material that is relatively high in total dietary fiber and relatively high in soluble fiber content is desired. The presence of too high a concentration of soluble fiber, however, can present problems for food producers in the incorporation of the material into food products. This is partially due to a tendency for soluble fiber components to cause gelation, generally because of the high viscosity of these components. Thus, a material with a relatively high total dietary fiber content, i.e., combined soluble and insoluble components, and with a relatively high amount of soluble fiber components is desired provided the soluble fiber content is not so high as to present processing difficulties. An advantageous amount of soluble fiber is one that is high enough to provide health benefits, but not so high as to adversely affect the functional properties of the dietary fiber material and products into which it is incorporated.

There are some known dietary fiber materials that have advantageous amounts of total dietary fiber and soluble fiber; however, they are generally relatively high in fat and calories. It is generally desirable, for many applications, to have a dietary fiber material with an advantageous ratio of insoluble to soluble fibers, i.e., total dietary fiber to soluble fiber, and a relatively low fat and caloric content.

A wide variety of food sources, such as fruits, grains, and vegetables, and food additives, such as cellulose and gums, supply dietary fiber. For example, wheat bran has approximately 42% to 55% total dietary fiber, of which only about 3% to 6% is soluble fiber. Cellulose, which is used as a food additive for thickening purposes, has a total fiber content of about 92% to 100%, which is mostly insoluble fiber; whereas, gums have approximately 80% to 90% total fiber, which is mostly soluble fiber. Herein, the percentages referred to are weight percentages unless otherwise noted. Herein, the total dietary fiber is based upon the total dry weight of the material, and the soluble fiber content is reported as a percentage of the total dietary fiber content, unless otherwise noted. Alternatively, the soluble fiber content can be reported as a percentage of the total dry weight of the material.

The values for total dietary fiber and soluble fiber components depend, at least in part, upon the material and/or product, e.g., how it was processed and its source, and upon the method used to analyze the product. For example, certain apple fiber products contain about 40% to 60% total dietary fiber, anywhere from about 2% to 30% soluble fiber, depending upon the product, and approximately 1 to 2 calories per gram; whereas, certain dried apple products contain about 11% total dietary fiber, 25% soluble fiber, and 3.6 calories per gram. Wheat germ products contain about 10% to 20% total dietary fiber, anywhere from about 2% to about 88% soluble fiber, and approximately 3 to 7 calories per gram; whereas, wheat bran products contain about 42% to 55% total dietary fiber, about 3% to 6% soluble fiber, and approximately 1 to 2 calories per gram. Corn bran contains anywhere from about 50% to 95% total dietary fiber, less than about 5% soluble fiber, and less than about 1.2 calories per gram. Oat fiber, which is made from oat hulls, contains about 67% to 98% total dietary fiber, about 1% to 7% soluble fiber, and less than about 0.5 calories per gram. Oat bran typically contains about 16% to 24% total dietary fiber, of which about 25% to 50% is soluble fiber. The caloric content of oat bran is generally about 3 to 5 calories per gram with about an 8% fat content. Rice bran, which is the thin brown layer that is removed during the processing of white kernels of rice, contains approximately 20% to 40% total dietary fiber, about 5% to 7% soluble fiber, and approximately 2 to 3 calories per gram, with certain rice products having a fat content of up to about 20%. Barley bran, which is generally produced from barley remaining after a brewing operation, contains anywhere from about 50% to about 70% total dietary fiber, typically about 3% to 4% soluble fiber, and approximately 1 to 2 calories per gram. Certain barley products have been reported to contain up to about 20% soluble fiber. Soy-containing products that contain both bran, which is from the external portion of the soybean, and fiber, which is derived from the internal portion, i.e., cotyledons, generally have about 65% to 70% total dietary fiber, up to about 10% soluble fiber, and about 1 calorie per gram. Soy-containing products without the hulls, i.e., soy fiber, generally contain anywhere from about 45% to 75% total dietary fiber, with some products reported to contain up to about 81%. The range of the soluble component in soy fiber products is anywhere from about 7% to 60% and the caloric content is typically within the range of about 0.5 to 1.5 calories per gram. Cellulose typically contains approximately 0 calories per gram and 92% to 100% total dietary fiber, which is almost totally insoluble fiber; pectin contains about 87% to 100% total dietary fiber, which is mostly soluble fiber; and, gums, such as guar, arabic, locust bean, karaya, agar, and tragacanth, contain approximately 80% to 90% total dietary fiber, which is almost all soluble. See, for example, "Dietary Fiber Guide" in *Cereal Foods World* 1987, 32, 555; and, "Status Report: FIBER" in *Food Processing* 1989, 50, 19.

It is noted that in evaluating the data for the fiber percentages reported in the literature, care must be taken to consider the method of analysis used in determining these values. A widely accepted method of analysis for determining fiber content is the AOAC (Association of Official Analytical Chemists) TDF method, sometimes referred to as the "Prosky Method" (*AACC Approved Methods*, 8th Ed., Method 32–05).

As stated previously, soluble fibers have been shown to reduce serum cholesterol levels and reduce or eliminate insulin dependency for diabetics. Therefore, dietary fiber materials with a relatively high soluble fiber content are desirable; however, as stated above, high concentrations of soluble fiber can present problems in the incorporation of the material into food products. For example, gums, which are almost 100% soluble, are generally not used at a level of more than about 10% of the weight of the food product. This is generally because of the viscosity properties of the materials, which present processing difficulties. That is, the more soluble fiber a material possesses, the more difficult is the food product to process upon its incorporation, because the material has a strong tendency to gel. In other words, the product becomes too "thick" to process, e.g., mix and/or extrude, properly. Insoluble fiber components do not present such processing problems, and are generally easily processed. Thus, a combination of soluble and insoluble fibers is advantageous from a processing perspective. Furthermore, since insoluble fibers are believed to provide additional and different health benefits than do soluble fibers, a dietary fiber material with a combination of insoluble and soluble fiber, wherein the soluble component is not so high as to cause processing problems, is advantageous.

Oat fiber has a combination of soluble and insoluble fiber components, as does corn fiber, soy fiber, and a variety of other fiber-containing materials. Certain of these materials provide advantageous processing results; however, many of these materials contain a relatively low soluble fiber content, such that the health benefits are not necessarily realized at least to a preferred extent, and/or they are relatively high in fat and caloric content. The relatively high fat and caloric contents are not typically desirable features, especially for those consumers who are also in need of reducing their fat and caloric intake. Although often the fat can be removed, this generally requires chemical treatment, which does not always remove all the fat, especially in a product such as oat bran in which the fat is quite diffuse. Therefore, it is desirable to produce a dietary fiber material that is relatively high in total dietary fiber, relatively high in soluble fiber, but not so high as to present processing problems, and relatively low in fat and caloric content naturally, i.e., without further treatment.

Sugarbeet fiber, also referred to as sugarbeet pulp, is the vegetable material remaining after sugar has been extracted from the sugarbeet. The common beet "Beta Vulgaris" is commercially grown in large quantities for sugars and upon its processing, a fiber by-product is generated. Depending upon the species, growing conditions, and other factors, unprocessed mature sugarbeets typically consist of about 80% to 85% water, 10% to 22% sugar, 5% to 8% fibrous material, and minor amounts of other components such as organic acids, amino acids, proteins, lipids, and minerals. The sugar content of sugarbeets is typically extracted by immersing slices, i.e., cossettes, in water under conditions sufficient to cause a transfer of the sugar from the sugarbeet cossettes to the water. The process results in an aqueous solution of sugar commonly referred to as the juice and a mass of water insoluble material commonly referred to as the pulp, or fiber. The sugar is typically extracted from the juice by crystallization and sold as a sweetener, while at least in the past the pulp has been typically dried and treated as a waste or sold as livestock and other animal feed. Use of the pulp has generally been limited to livestock and other animal feed, at least in part, because the pulp has an unappetizing flavor (off-flavor) and unappealing odor or smell (off-odor). These not only make the material generally unacceptable for incorporation into human foods, but they also make processing unpleasant.

The dry sugarbeet fiber material is relatively high in total dietary fiber content, generally above 75% and typically at least about 80%, and contains both soluble and insoluble fibers. In addition to its high total fiber content, it is very low in fat and calories. Typically, sugarbeet fiber contains less than about 1% fat, and less than about 1 calorie per gram. The soluble fiber content generally ranges from about 10% to 25%, of the total fiber content (or about 8% to 23% of the total dry weight of the material), which is high enough to provide beneficial health effects but not so high as to adversely effect the functional properties of the material.

Because of its relatively high total dietary fiber content, its relatively high soluble fiber content, and its relatively low caloric content, sugarbeet fiber offers excellent dietary and physiological benefits to consumers. Furthermore, sugarbeet fiber also offers manufacturing and functional advantages to food processors. It has excellent moisture retention, good texture and mouth feel, excellent expansion and extrusion properties, and can be produced in a variety of particle sizes for relatively easy blending with other ingredients. Sugarbeet fiber has also been of much lower cost than gums and other soluble fibers, and competitive in cost to insoluble fibers. Thus, this material would arguably be desirable for use in such products as cereals, bakery products, pasta, processed meats, soups, and snacks, but for the presence of the off-flavor and off-odor problems.

A small percentage of sugarbeet fiber, even with its undesirable flavor and odor, may be usable in very small quantities in human consumable products, such as selected bakery applications and cereals. This amount, however, would generally be limited to not more than about 2% by weight. As stated previously, the majority of sugarbeet fiber, in the past, has been used in animal feeds, where odor and taste are less of a problem. Thus, in the past sugarbeet fiber has been of very limited commercial value.

Over 20 million tons ($1.8 \times 10^{10}$ kg) of sugarbeets are harvested every year in the United States, and sugarbeet refining generates approximately 5.5% fiber from the beet. Therefore, the United States sugarbeet industry produces over one million tons ($9.0 \times 10^8$ kg) of sugarbeet fiber annually. Within ten years, it is estimated, at least 50 to 60 million pounds ($2.3 \times 10$; to $2.7 \times 10$; kg) of this material could be readily utilized in the human consumable marketplace per year, if the odor/taste problems could be overcome.

Many methods have been used to treat sugarbeet pulp in an attempt to render it fit for human consumption. Most of these methods have not, however, effectively and/or satisfactorily eliminated or controlled the off-flavor and off-odor, which may even be enhanced during processing and storage. Other methods are known that have apparently eliminated or controlled the off-flavor and off-odor; however, this has not been done without adding other undesirable components to the sugarbeet pulp and/or without use of undesirable processing methods.

For example, in U.S. Pat. No. 4,379,782 it is disclosed that sugarbeet pulp may be extracted with isopropyl alcohol to remove off-colors and off-flavors. In U.S. Pat. No. 4,451,489 it is further disclosed that sugarbeet pulp can be contacted with an alcoholic solution such as methanol, ethanol, or isopropanol, to remove bitter constituents and colors. Other solvents disclosed as removing bitter constituents and color include t-butyl alcohol, ethylene glycol, monomethyl ether, 2-methylethyl ether, and hexane.

However, it is known that residual amounts of organic solvents, such as alcohol, are extremely difficult to remove from sugarbeet pulp. In some instances vacuum techniques are required. After such a process, the residual alcohol in the pulp can be reduced to less than about 500 ppm. The difficulty with which alcohols, as well as other organic solvents, are removed from sugarbeet fiber could be a result of case hardening of the surface of the sugarbeet fiber during drying resulting in the physical entrapment of the alcohol. Alternatively, it could be a result of the components of sugarbeet fiber chemically "fixing" the alcohol. As a result, an organic solvent-free, e.g., alcohol-free, method is needed to effectively and satisfactorily eliminate or reduce the off-flavor and off-odor of a vegetable fiber material such as sugarbeet fiber. Another reason why it is desirable to avoid organic solvents in processing is to avoid the special precautions required in handling flammable solvents, toxic fumes, and organic waste solutions.

SUMMARY OF THE INVENTION

Evaluation of Certain Flavor/Odor Causing Agents

It may be theorized that the bad odor and taste of the sugarbeet fiber is due to certain specific agents or compounds present in the material. It may be further theorized that reducing, i.e., lowering the amount of, and/or removing the compounds in the sugarbeet fiber that are responsible for the off-flavor and off-odor, will result in improvement, assuming such a removal is possible. Sugarbeet fiber may be generally characterized by off-flavor/odor agents such as, for example, those which cause undesirable odors/flavors generally described as rancid/rotten and, those which cause undesirable off-odors/flavors generally described as musty/earthy. These characterizations, however, may overlap. Certain agents responsible for either or both types of problems would typically have to be reduced or removed, for significant improvement. Also included within the meaning of the phrase "reduction and/or removal" of compounds that are responsible for the off-flavor and off-odor is the possibility that the compounds are altered in some manner such that they no longer impart the undesirable odor and flavor characteristics to the fiber material. Other compounds which contribute to off-flavor and off-odor include those with strong "green" odors and heavy "fruity" odors. Improvement will also occur if the presence of such agents in the fiber material is reduced.

The identification, isolation, and quantification of the odor and flavor constituents in any food product can be a very complex process. The process becomes even more complex when it is desirable to standardize and correlate subjective sensory evaluation data with quantitative analytical data. However, certain methods are known and usable to reliably accomplish this task.

The components that contribute to sensory characteristics, such as odor, can be identified by correlating gas chromatographic profiles of volatile components, which have been purged from the sample of interest, with the smell of a specific component of the material as it exits an olfactory sniffer port. These detection systems allow for qualitative identification based on both known retention indices and sensory evaluation. That is, a sample of the off-gases of a product can be collected, and the specific components of the off-gases can be separated using gas chromatography. As a specific component exits the chromatography column, a portion may be directed to the chromatographic detector and a portion may be directed to an olfactory sniffer port. As the retention time of the component is recorded, an appropriately trained individual identifies it by smell. Also, a component can be identified for example: by comparison of its retention time, i.e., the time it remains on the chromatographic column, to the retention time of a substance of known identity; and/or, by mass spectroscopic techniques. Once the components contributing to the odor are identified, they can be correlated to taste by trained sensory panelists, for example, through "spiking" of the product with various concentrations of each of the components.

In the mid 1970s a technique was developed to describe the sensory characteristics, such as flavor, odor, and texture, of a product in mathematical terms. This technique is referred to as Quantitative Descriptive Analysis (QDA) and is described in, for example, *Applied Sensory Analysis of Foods*, 1988 Edition, Vol. I; Howard Moskowitz, Ed.; CRC Press, Inc.; Boca Raton, FL, which is incorporated herein by reference. The QDA technique has been used to statistically measure variability and to compare and/or contrast one product with another. QDA is a technique in which trained individuals identify and quantify the sensory properties, such as salty, buttery, sweetness, bitterness, etc., of a product or ingredient. This method includes the use of: judges who have been chosen because of their ability to perceive differences in the specific product or ingredient evaluated, and who are trained for effectively evaluating the specific product or ingredient; a trained panel leader; a pre-evaluated descriptive score card with intensity scales for each characteristic or attribute evaluated; repeated evaluations of the product or ingredient by judges who are isolated from one another; statistical variance analysis including average ratings, standard deviations, and probabilities of significance; and, a spider web method of graphically displaying the data. The results of such a technique can be analyzed and information can be extracted about the products or ingredients evaluated, including variability. Also, performance information about the judges can be extracted from the statistical analysis. Furthermore, this information can be statistically analyzed for an evaluation of its significance. Thus, the QDA technique, if properly performed, can generally provide precise and reliable information with a relatively high degree of repeatability.

In a sensory evaluation analysis of a food product, individuals are initially screened to determine if they can sufficiently and repeatably detect certain characteristics in, for example, the smell and taste of the product. The individuals that prove to be able to discriminate between certain distinguishing odor and flavor characteristics of the product and their intensities are chosen as the panel of judges. These individuals are then trained to evaluate the specific product of interest. These individuals also collectively develop a score sheet of descriptive attributes that are generally characteristic of the product. This is typically done under the supervision of a trained panel leader, and after the panel of judges evaluates many samples and variations of the product. That is, during training, the panel of judges learns how to judge and "score" the intensity of an attribute on a qualitative level and correlate this to a quantitative evaluation of the attribute. The score sheet and judges are then evaluated on a pilot test before proceeding with an actual test or evaluation.

A QDA score sheet typically consists of a series of simple unstructured horizontal lines, although the horizontal lines can be marked with equidistant vertical lines. Each horizontal line is used for one attribute, with one of two descriptive terms, e.g., strong or weak, slight or extreme, at each end of the line. That is, for each attribute a horizontal line, typically an unstructured line, is marked at one end with the term "strong" and at the other end with the term "weak", or similar descriptive terms. Each individual judge then evaluates the product on the basis of the predetermined series of characterizing descriptive attributes. The judge evaluates the intensity of each attribute and places a mark on each horizontal line at a point that best describes the specific attribute (i.e., between strong and weak). They are able to effectively evaluate these attributes and their relative strengths because they have been typically trained to do so using a standard product, variations of the product with known component intensity differences, and a reference sample. The intensity is later converted into a numerical score, the scale referred to herein being from 0 to 60 (weak to strong). These scores can then be statistically evaluated and graphically displayed.

Sugarbeet Fiber

Components that may be contributing to the rancid/rotten odor and taste of sugarbeet fiber are generally believed to be the oxidation products of lipids, primarily linoleic acid (9,12-octadecadienoic acid) and linolenic acid (9,12,15-octadecatrienoic acid). These unsaturated fatty acids are generally oxidized by either enzymatic or nonenzymatic processes during storage and processing, to form compounds, including aldehydes, which contribute to the off-odor and off-flavor. There are a plurality of aldehyde compounds which contribute to the off-odor and off-flavor profile, in sugarbeet fiber.

Components that contribute to the musty/earthy odor and taste of sugarbeet fiber are believed to include those generally found present in a variety of root vegetables such as carrots, potatoes, and red beets. This is because these vegetables are normally grown in soil that can provide a possible source for these flavor components, although the soil is not considered to be the only source of the musty/earthy components. A likely source of soil volatiles, especially some of those that impart a musty/earthy flavor, are microbes, molds, and bacteria, such as Streptomyces and Pseudomonas. A notable musty/earthy component is 2-methoxy-3-sec-butylpyrazine. The compound exhibits an intense green-earthy flavor and aroma. Earthy components are believed to be among those that are the most offensive to humans. They also are known to have inherently very low odor thresholds of detection. That is, the odor can be detected even when the compound is present in a very small amount. The very low odor thresholds and the fact that some have a relatively high degree of hydrophobicity make the reduction or removal of such compounds particularly difficult.

Some Conventional Methods of Reducing Ingredients in Food Materials

Various methods are known in the art to remove undesirable ingredients from certain materials, including in some instances compounds that are responsible for adverse odor and flavor. These ingredients are typically removed using methods that are based on the physical properties, such as volatility and solubility, of the components. For example, extraction with organic solvents generally removes organic hydrophobic components and aqueous extraction typically removes water-soluble hydrophilic components. Vacuum and- /or heating methods have also been developed to remove highly volatile components. Generally, however, these latter techniques are only viable for those materials that have a relatively high economic value, because of the large capital equipment costs associated with vacuum techniques. Newer methods utilizing "supercritical extraction", i.e., gas extraction, are known for the removal of caffeine from coffee and cholesterol from eggs, for example. These methods, however, are relatively expensive.

No one conventional method has typically been desirable and sufficient, for application to the removal of the off-flavor and off-odor from a vegetable fiber material such as sugarbeet fiber. This may in part be due to the fact that a material such as sugarbeet fiber typically contains a wide variety of components, with a wide variety of properties, that are responsible for the adverse odor and flavor. Also, vegetable fiber material such as sugarbeet fiber, which can be characterized as having a gel matrix when combined with liquids, is not as conducive to extraction methods as compared to a more typical solid material, such as a grain. This is because the separation of a gel-like substance into its component phases is not as easily obtained as the separation of the phases in a simple solid/liquid extraction system. Furthermore, with known extraction methods, there are limitations to their use because of economic considerations, safety, environmental concerns, and the effects of residual components, especially if an organic solvent, such as alcohol, is used.

What has been needed is a method and system for effectively, and efficiently, reducing adverse flavor and odor constituents from vegetable material, without adding undesirable components. Preferably what is needed is such a method and system for treating root crops like sugarbeets. Also, a dietary fiber material that is relatively high in total dietary fiber, relatively high in soluble fiber, and preferably relatively low in caloric content, that possesses little or no offensive flavors and/or odors is desired. Thus, a need exists for a method and system for treating sugarbeet fiber (or similar fiber), which contains the above-listed dietary fiber characteristics, so that the offensive flavor and odor are improved so as to render it suitable for human consumption and thus provide a dietary fiber with benefits and advantages not already available from dietary fibers commonly consumed.

Summary of a Pilot Plant Process of the Present Invention

The dietary fiber material of the present invention is due, at least in part, to the discovery of a process for improving the flavor and odor of a vegetable fiber material, preferably sugarbeet fiber. This process includes the steps of: providing an aqueous slurry of the vegetable fiber material; treating this aqueous slurry at an effective temperature for an effective length of time to conduct heat treatment; and, removing the vegetable fiber material from the aqueous slurry after it has been subjected to the heat treatment. The process is preferably conducted such that the slurry is maintained at a temperature of at least about 95° C., and preferably at a temperature of at least about 98° C. In preferred applications the slurry is treated at a temperature no greater than about 110° C. More preferably, the aqueous slurry is treated at a temperature within a range of about 98° C to 105° C., and most preferably the treatment temperature is about 99–100° C. The desired effective temperature is typically and preferably continuously maintained for at least about 1.5 minutes. Preferably the effective temperature is maintained for about 1.5 to 8 minutes, and more preferably the temperature of the slurry is maintained continuously for about 1.5 to 3.5 minutes. If an interruption in maintenance of the temperature occurs, longer total treatment times may be needed.

Preferred processes according to the present invention include heat treating an aqueous slurry of vegetable fiber material containing at least about 92% moisture, by weight. Preferably the moisture content is within a range of about 92% to 97%, and more preferably the moisture content is within the range of about 92% to 94%.

The processing parameters described in the above paragraphs are those reported in parent application Ser. No. 07/406,954, which was filed on Sep. 11, 1989. These parameters provide a correct and proper description of the pilot plant operation in practice at the time of filing of the parent application. After filing the parent application, the operation was scaled up for commercialization. Using the temperature and time parameters developed during experiments performed in a pilot plant operation, the vegetable fiber material produced in a commercial-scale operation had a tendency to be "mushy" as if it were cooked. It generally no longer had the consistency of a solid fiber material such that it could be mechanically pressed to effectively remove water. As a result, new process parameters, i.e., temperature and time, were developed. The preferred temperature ranges and times of treatment for scaled-up systems, i.e., relatively large volume systems, are reported herein below.

Although the process is described in detail with reference to a pilot plant operation, as was done in parent application Ser. No. 07/405,954, part of the disclosure of this application is specifically directed to a larger scale process, such as would typically be referred to as a commercial-scale process. The system described in parent application Ser. No. 07/405,954 is generally the same as that used in a larger, commercial-scale, operation. Although the processing parameters were determined using a relatively small operation, such as that of a pilot plant, the sizes of the components of the system described in the parent application were for the components being built at the time for a commercial-scale operation. Although similar components were used in the pilot plant, they were of a much smaller size. Therefore, except for a few modifications described herein below for the commercial process, the system, the component parts, and the flow capacities described in the parent application are those which may be used in a large, commercial-scale, operation.

The vegetable fiber material is heated (in aqueous slurry) by any suitable means. If food grade steam is available, direct treatment in an injection cooker is generally preferred. If food grade steam is not available, an indirect heat exchanger arrangement such as a scraped-surface or swept-surface heat exchanger may be used. This type of heat exchanger constantly exposes new material to a surface at which the heat conduction occurs.

After initial heating, regardless of the method used, the fiber material is then preferably maintained at an effective temperature by any suitable means, such as for example a stainless steel transfer tube. Although the temperature at which the fiber slurry exits the heat exchanger is typically the temperature at which it is maintained, there is no requirement that this be so, provided both are at least about 95° C., and more preferably at least about 98° C. Temperatures below about 95° C. in small-scale operations, as in a pilot plant, are generally not very effective at removing the odor and flavor of the fiber. Furthermore, the minimum time at which the fiber is maintained at this temperature is important for effective improvement in the flavor and odor. If, however, the fiber can be maintained within a relatively constant and effective temperature range for a longer period of time, a lower temperature can be used. This is observed especially in larger scale operations, as for example in a commercial-scale process.

Herein, "commercial-scale" operations refer to those in which at least about 100 tons of sugarbeets are processed per hour. Typically, no greater than about 500 tons of sugarbeets are processed per hour in a commercial-scale process. In comparison, small-scale pilot plant operations are those in which about 60 to 100 pounds of sugarbeets are processed per hour. Although sufficient material can be produced in a pilot plant operation for commercial purposes, it is preferable to utilize a larger system to process the large number of sugarbeets typically produced in a year by Applicants' Assignee, American Crystal Sugar.

Once the aqueous slurry of the fiber material is subjected to heat treatment, the process of the present invention utilizes means for removing the vegetable fiber material from the aqueous slurry, i.e., from the water having the off-flavor and/or off-odor agents therein. Generally, this is accomplished through washing, i.e., through the use of a fiber washer arrangement. Although any of a variety of methods may be used, including batch washing or tank washing, an advantageous and effective method described below involves use of a continuous countercurrent flow of fresh water for continuous countercurrent extraction. If such an arrangement is used, the countercurrent washer is preferably U-shaped, for advantageous operation.

Summary of a Commercial Process of the Present Invention

Upon the scale up of the process of the present invention, defined above with respect to a pilot plant operation, to a commercial-sized process, several modifications of the process and system were learned to be particularly desirable. Commercial, i.e., scaled-up, versions of the process involves the same steps of: providing an aqueous slurry of the vegetable fiber material; treating this aqueous slurry at an effective temperature for an effective length of time to conduct heat treatment, without heating to an extent such that the fiber material is in a state that it cannot be mechanically pressed to at least about an 85% moisture content; and, removing the vegetable fiber material from the aqueous slurry after it has been subjected to the heat treatment. However, a commercial-scale process is preferably conducted such that the slurry is maintained at a temperature of at least about 70° C., and preferably at a temperature of at least about 74° C. In preferred applications of a commercial-scale process the slurry is treated at a temperature no greater than about 110° C. More preferably, the aqueous slurry is treated at a temperature within a range of about 74° C. to 93° C., and most preferably the treatment temperature is at about 75° C. or at least about 75° C. The desired effective temperature is typically and preferably continuously maintained for at least about one minute before the temperature is reduced in the washing stage of the operation. Preferably the effective temperature is maintained for about 1 to 8 minutes, and more preferably the temperature of the slurry is maintained continuously for about 1 to 3.5 minutes from the time the fiber material reaches the desired temperature to the time it enters a washer and the temperature of the fiber is reduced.

After initial heating the fiber material is then preferably maintained at an effective temperature by any suitable means, such as for example a stainless steel transfer tube, as in a pilot plant process. However, in a commercial-scale vegetable fiber processing plant, such a transfer tube is typically shorter than it is in a pilot plant. As in a pilot plant process such as that discussed above, although the temperature at which the fiber slurry exits the heat exchanger is typically the temperature at which it is maintained, there is no requirement that this be so. That is, there is no requirement that the temperature at which the fiber slurry exits the heat exchanger, and the temperature at which it is maintained in a commercial-scale process be the same, provided both are at least about 70° C., and more preferably at least about 74° C. The minimum time at which the fiber is maintained at this temperature is important for effective improvement in the flavor and odor.

Although in small-scale processes, as carried out in a pilot plant, temperatures below about 95° C. are generally not very effective at removing the odor and flavor of the fiber, the temperature can be lower in a larger scale process. This appears to be a result of the larger volume of the equipment, larger amounts of material flowing through the system, and a longer period of time required to reduce the temperature of the material after heat treatment. That is, in a larger scale process the material has a tendency to be maintained at the processing temperature for a longer period of time, at least due to slower heat transfer, i.e., longer cooling times, which can result in effective treatment of the vegetable fiber, and can result in degradation of the product if the temperature is too high and the period of time is too long.

Preferred commercial-scale processes according to the present invention include heat treating an aqueous slurry of vegetable fiber material containing at least about 92% moisture, by weight. Preferably the moisture content is within a range of about 92% to 98%, and more preferably the moisture content is within the range of about 94% to 97%. This slightly higher moisture content range used in the commercial-scale process, as opposed to the pilot plant process, provides advantage with respect to heat exchange. That is, an increased moisture content typically results in improved heat transfer while the fiber is in heat exchangers. This results in advantage, for example, at least with respect to reduced energy consumption by heat exchanger pumps.

Once the aqueous slurry of the fiber material is subjected to heat treatment, the commercial-scale process of the present invention utilizes means for removing the vegetable fiber material from the aqueous slurry, i.e., from the water having the off-flavor and/or off-odor agents therein, as in the pilot plant process. Although any of a variety of methods may be used, if a U-shaped washer is used as is used in the pilot plant, for advantageous operation and control of water flow, water is introduced at a lower point in the tube. That is, typically in a U-shaped washer used in the pilot plant process, water enters at or near the top of one arm of the U-shaped tube. This generally results in continuous countercurrent extraction of the vegetable fiber. However, in a commercial-scale process, water can be introduced at a lower point along the arm of the U-shaped tube for advantageous flow dynamics. This can result in only a portion of the fiber material undergoing a countercurrent wash while in the tube. This is further explained in the Detailed Discussion.

Summary of Products According to the Present Invention

A preferred, and unique, product according to the present invention contains at least about 75% and more preferably at least about 80% total dietary fiber (most preferably at least about 82% total dietary fiber) based upon the total dry weight of the fiber material. The soluble dietary fiber (SDF) content is at least about 10%, based upon the weight of the total dietary fiber (TDF). Preferably the soluble fiber portion is within the range of about 10% to 25%, and most preferably it is within the range of about 10% to 20%, of the TDF. The product preferably contains less than about 1% fat and less than about 1 calorie per gram, and more preferably less than about 0.6 calories per gram. The preferred dietary fiber material of the present invention is a non-soy product. That is, as defined herein, the non-soy dietary fiber material described is exclusive of soy fiber, i.e., the fiber material derived from the internal portion or cotyledons of the soybean. This does not mean, however, that material according to the present invention cannot be mixed with soy fiber, in use. Preferably, the dietary fiber material of the present invention with these attributes is derived from sugarbeets. Generally, the term "fiber" as used herein, in this context, refers to vegetable fiber material remaining after sugar substances have been substantially extracted from the natural vegetable material.

The unique vegetable fiber material of the present invention, e.g., sugarbeet fiber material, comprises a wet flavor and wet aroma profile as preferably characterized by: a wet earthy flavor of no greater than about 26 on a scale of 0 to 60 (weak to strong); and, a wet rancid flavor of no greater than about 7 on a scale of 0 to 60. The wet flavor profile may be further preferably characterized by: a wet beet flavor of no greater than about 25 on a scale of 0 to 60; a wet bitter flavor (also known as a wet bitter after taste) of no greater than about 12 on a scale of 0 to 60; and, a wet sour flavor of no greater than about 6 on a scale of 0 to 60. Finally, preferably the flavor profile is further characterized by a wet overall flavor of no greater than about 37 (0 to 60 scale).

The wet aroma profile of the unique fiber product is preferably characterized by: a wet earthy aroma of no greater than about 28 (0 to 60 scale); and, a wet rancid aroma of no greater than about 6 (0 to 60 scale). More preferably it is also characterized by a wet beet aroma of no greater than about 26 (0 to 60 scale). Most preferably a desirable fiber product for human consumption is not only characterized by all of the above wet aroma characteristics, but also a wet overall aroma of no greater than about 33 on a scale of 0 to 60.

According to the present invention, a unique fiber material for human consumption may also preferably be characterized by a dry aroma profile defined by: a dry beet aroma of no greater than about 15 (0 to 60 scale); and, a dry earthy aroma of no greater than about 19 (0 to 60 scale). The material also preferably has a dry overall aroma of no greater than about 33 (0 to 60 scale).

The preferred sugarbeet fiber material mad according to preferred specific processes described herein possesses 8 of the above flavor/odor characteristics. These include a wet earthy flavor, a wet rancid flavor, a wet beet flavor, a wet bitter flavor (i.e., wet bitter after taste), a wet sour flavor, a wet overall flavor, a wet overall aroma, and a dry overall aroma. More preferably, the sugarbeet fiber material possesses all 13 of the above flavor/odor characteristics and is storage stable, i.e., generally maintains a sensory profile within the appropriate/applicable limits for at least about 6 months during storage under ambient conditions.

Improved fiber products according to the present invention may alternatively be characterized in terms of the presence of certain agents responsible for off-flavor and off-odor being below a certain level, typically expressed as parts per billion, by weight, of the fiber material dried (i.e., ppb of fiber material having a moisture content of less than about 7%). That is, the materials may be characterized as fiber products of certain specific characteristics, with levels of certain off-odor and/or off-flavor agents being below specified levels. In addition, the process may be characterized as producing such a material, as a result of an effective reduction in the presence of certain identified off-odor and/or off-flavor agents. Also, a process of improving the off-odor and/or off-flavor of fiber material may be characterized in terms of relative reduction of such components by comparison to conventionally processed material. Finally, the product may be characterized by the process through which it is made.

Additionally, the improved fiber products according to the present invention are substantially free of any organic solvent, such as for example, an alcoholic solvent. By this it is meant that the fiber material of the invention is substantially free of any organic solvent that is not a natural component of the fiber material. That is, the fiber is substantially free of any residual organic solvents, such as, for example, methanol, ethanol, isopropanol, t-butyl alcohol, ethylene glycol, monomethyl ether, 2-methylethyl ether, or hexane, that may have been added at some time during processing. A reason for this is that no such solvents are used in processes according to the present invention. By "substantially free" it is meant that there is less than about 10 parts per million (ppm) by weight of an organic solvent in the dry fiber material (i.e., having a moisture content of less than about 7%). Preferably, there is less than about 1.0 ppm residual organic solvent, and more preferably there is less than about 0.1 ppm of residual organic solvent in the vegetable fiber of the invention.

The present invention also includes within its scope the provision of various unique and advantageous food compositions including fiber material, as characterized herein, within the compositions, at preferred levels. Further, the invention includes within its scope methods of producing toasted fiber food products including substantial levels of improved fiber material, as above defined.

The drawings constitute part of this specification and include exemplary embodiments. It will be understood that many variations from the systems shown in the drawings may be made while remaining within the spirit and scope of the invention. The spider web graphs, or star charts, that display the results of a sensory panel evaluation of various samples of sugarbeet fiber are not necessarily precisely to scale, although they are sufficiently to scale for adequate comparison.

BRIEF DESCRIPTION OF THE DRAWINGS

FIG. 2b is a simplified schematic of a preferred overall process of vegetable fiber treatment after a cleaning stage such as shown in FIG. 2a.

DETAILED DESCRIPTION OF THE INVENTION

As required, detailed descriptions of the present invention are provided herein. In general, the detailed descriptions are to be considered as exemplary only.

The presented process for improvement of dietary fiber materials, and in preferred applications specifically sugarbeet fiber, basically consists of removing or reducing, i.e., lowering the concentration of, adverse flavor and odor components. This is done through preferred heat treatment and washing steps. However, during sugarbeet fiber production, i.e., in the sugar diffusion process, certain compounds, such as sulfites, may be added for various reasons. Variations in the overall process herein described may be used to effect a reduction in the residual concentration of such additives. Furthermore, vegetable fiber such as sugarbeet fiber often contains foreign material, both free and adherent, that is advantageously removed, especially if the fiber is for human consumption. Preferred methods of the overall process described for the improvement of fiber (especially sugarbeet fiber) include steps directed to reducing the amount of the off-flavor and off-odor components of the fiber, steps directed to cleaning the fiber of any foreign material, and (optionally) steps directed to reducing residual sulfite concentration.

I. Process for the Improvement of Vegetable Fiber
Ia. Pilot Plant Process

Figure 1:
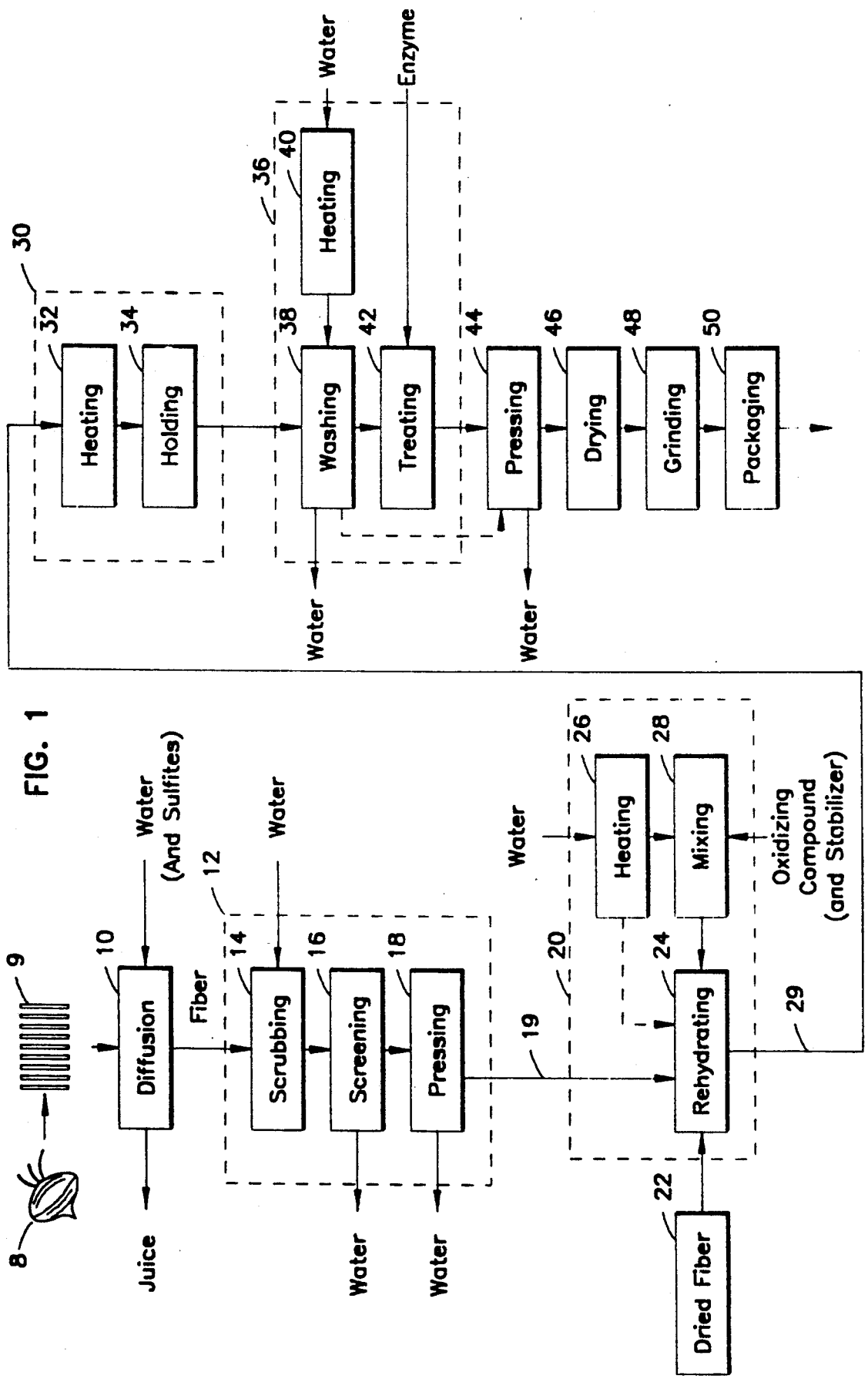
FIG. 1 is a flow chart of a preferred overall process of the present invention.

FIG. 1 is a flow diagram of a preferred overall process for the production of improved vegetable fiber. Specifically, FIG. 1 is described with reference to the processing of sugarbeet fiber, although the process is not limited thereto. Initially harvested beets 8 are generally cleaned of any extraneous material and adhering or clinging dirt, and are (typically) run through a beet slicer from which they emerge as pieces, typically long thin strips referred as cossettes 9. The beet material 8, e.g., pieces or cossettes 9, is then fed into a diffuser for a diffusion step, at 10, wherein a substantial portion of the sugar is extracted at an elevated temperature, typically about 50° C. to 70° C.

In some processes the extraction process is enhanced by the presence of added sulfite compounds. When this is done, later steps (described below) may be introduced to reduce any residual sulfite.

The solid product remaining after diffusion is referred to as pulp, or fiber. Generally, in conventional sugarbeet processing, wet solid product from the diffusion operation is directed to presses, which mechanically reduce the moisture content of the fiber. In some conventional processes, this fiber is cleaned through washing.

In preferred applications of the present process, the wet solid product, i.e., vegetable fiber, is directed from the diffusion operation 10 to a cleaning stage, at 12, wherein the fiber goes through a scrubbing operation 14, followed by a screening operation 16, before the moisture content is reduced in a pressing operation 18. The combination of the scrubbing and screening operations removes a substantial portion of any free or adherent foreign material associated with the processed cossettes or fiber. This stage of processing is discussed in more detail in U.S. Pat. No. 4,770,886, the disclosure of which is incorporated herein by reference.

As the beet fiber exits the dewatering screen it preferably has a moisture content within the range of about 92% to 97% by weight, and more preferably 92% to 94%. It is then directed to the pressing operation 18, where a press squeezes water from the fiber by mechanically forcing the fiber into continuously smaller volumes. The resulting pressed fiber typically preferably contains about 75% to 85% water, by weight. Often, however, fresh beets that have been properly diffused will yield a moisture content of about 75% to 80% when pressed. Although it is advantageous to remove as much water as possible, it is not necessary to press the fiber to much lower than about an 85% moisture content.

The beet fiber that exits the cleaning stage 12 of the processing system, at 19, is generally only acceptable for human consumable food products (after drying) in small quantities up to about approximately 2%. In particular, the fiber at this point is characterized by a taste and odor that hinders incorporation of this fiber into human food products in any amount significantly greater than this. The following recited steps according to the present invention facilitate improvement in odor and taste. Improvement in taste/odor results, at least in part, from reduction in the presence of those chemical components responsible for the undesirable taste and odor; that is, reduction relative to conventional processing described to this point.

As the fiber exits the first pressing operation 18, the material flows along path 19 into a rehydration stage 20 of the operation. Alternatively, or in addition, dry fiber product, indicated by reference 22, previously treated in a similar manner to material treated according to the description above, but with a moisture content of approximately 3% to 7%, i.e., 93% to 97% solids, may be introduced into this stage of the process for further treatment. In the rehydration stage 20, the fiber, either dry or recently pressed, is introduced into a rehydrating operation 24 wherein fresh water is added to rehydrate the fiber so as to form a flowable slurry. This fiber slurry may then be treated to improve the adverse flavor and odor. Also, if the fiber contains sulfite compounds from the diffusion process, the fiber may be additionally treated so as to reduce the sulfite content. In either instance, the water may be preheated before rehydration.

As is shown in the flow chart in FIG. 1, the particular process shown includes the optional addition of a substance at this stage that reduces the sulfite content. In the process, water is preferably heated in a heating operation 26 to within a range of about 30° C. to 60° C., more preferably to within a range of about 40° C. to 50° C. The water is then, in the variation of the process which includes residual sulfite reduction, mixed with an oxidizing compound and possibly other additives at 28. The oxidizing compound or agent, as for example, hydrogen peroxide, is sometimes mixed with a stabilizer, such as ethylenediaminetetraacetic acid (EDTA). Once the water (or aqueous mixture, if additives are used) and fiber are sufficiently mixed in the rehydrating operation 24, the resultant fiber slurry contains at least about 92% moisture, preferably 92% to 97% moisture, and more preferably about 92% to 94% moisture. It is generally believed that the concentration of sulfite compounds are effectively reduced during this stage of the process, or shortly thereafter, as a result of action by the oxidizing agent. Although the oxidizing agent is described as being added at this stage of the process, i.e., before the later heat treatment and washing, there is no requirement that the process be run in such a manner, in order to obtain some of the advantages of the present invention. The oxidizing compound, and any optional additives, do not appear to substantially contribute to the reduction, i.e., decrease in the amount, of the adverse flavor and odor components, which are typically reduced and/or removed in the heat treatment and washing stages of the operation that follow.

It will be understood that in some processes the residual sulfite concentration may be low enough after initial scrubbing/screening steps to not require follow-up treatment with oxidizing agents. Also, in some applications sulfites may not have been added in the first instance. In either of these cases, the water rehydrating operation would be as described except for the addition of the oxidizing agent and the stabilizer.

After rehydration, the fiber slurry is directed along path 29 to a heat treatment stage of the process, at 30, wherein the temperature of the fiber slurry is increased to an effective level for treatment. Such a level is one which does not physically degrade or chemically modify the vegetable fiber such that it can not be efficiently and effectively pressed mechanically to a moisture content of less than about 85% by weight. Although such a temperature might vary considerably, the specific processing temperature chosen is correlated with an appropriate processing time such that the odor and flavor are improved without physical degradation of the fiber as defined above. Typically, the temperature is increased to at least about 95° C., and more preferably to at least about 98° C. In many applications it is preferable to not heat the slurry above about 110° C. Preferably, treatment is conducted within a range of about 95° C. to 110° C., more preferably within a range of 98° C. to 105° C., and most preferably at about 99-100° C. Preferably, heating is conducted sufficiently long to achieve desirable flavor/odor characteristics without substantial fiber degradation, i.e., formation of mush that will not readily dewater. This requires a good control so as not to overheat, or heat for too long a period of time.

A heating operation 32 of this stage of the process may be undertaken by a variety of means. For example, if food grade steam is available an arrangement such as an injection cooker may be utilized, which involves direct heating of the fiber slurry with steam. If, on the other hand, food grade steam is not available then it may be desirable to utilize an indirect heat exchanger such as a Beuss extruder or a swept surface heat exchanger (sometimes referred to as a scraped surface heat exchanger). Generally, what is required is a heating arrangement sufficient to heat the fiber slurry to a temperature for effective improvement in the odor and taste of the sugarbeet fiber. The material is then, in some applications, directed into a holding operation 34, or transfer operation, wherein the material is held (i.e., retained) at an effective temperature for an appropriate length of time, typically for at least about 1.5 minutes and preferably for about 1.5 to 8 minutes. More preferably, the material is held at a desired and effective temperature for at least about 1.5 to 3.5 minutes for advantageous and effective improvement in the smell and taste of the final fiber product. Although the temperature at which the fiber slurry exits the heating operation is typically the temperature at which it is maintained for an effective amount of time, this is not necessarily required. That is, as long as the temperature of the slurry does not generally fall below 95° C. until after the appropriate heat treatment retention time, the temperature of the slurry may decrease somewhat during the holding operation. Drops in temperature to below 95° C. can (in some instances) even be tolerated, provided that, in the end, sufficient overall time of treatment at above about 95° C. is conducted.

The preferred temperature ranges and times of treatment for scaled-up systems, i.e , relatively large volume systems, are reported herein below. As stated above, after filing the parent application Ser. No. 07/406,954, which was filed on Sep. 11, 1989, the operation was scaled up for commercialization. Using the temperature and time parameters developed during the pilot plant operation, the vegetable fiber material produced in a larger system had a tendency to be "mushy" as if it were cooked, and no longer had the consistency of a solid fiber material such that it could be mechanically pressed to effectively remove water. As a result, new processing parameters were developed as disclosed herein below. The system described in parent application Ser. No. 07/405,954 is generally the same as that used in a commercial-scale operation. The sizes and capacities of the components described in the parent application are generally that of components used in a relatively large, i.e., commercial-scale, system. Although, these components were not used in the pilot plant operation, similar but smaller components were used. The commercial-scale components were described in parent application Ser. No. 07/405,954 because it was believed it would be a simple scale-up procedure in going from the small system of the pilot plant to a more commercially efficient scale. It was not believed that the processing parameters would significantly change. Therefore, except for a few modifications described herein below, the system described in the parent application is that which is used in a commercial-scale process.

After the heat treatment stage 30 of the process, the next stage of the process, at 36, is one in which the water in the aqueous phase of the slurry is removed and replaced by fresh water. That is, the fiber material is removed from the original slurry, after heat treatment. This stage of the process reduces the off-flavor and off-odor at least in part by removing certain agents responsible for them, thereby improving the smell and taste of the sugarbeet fiber. Furthermore, if an oxidizing compound and/or other additives were previously added to the fiber slurry, this stage of the process reduces, i.e., decreases, the concentration of the oxidizing compound in the fiber slurry. This stage involves a washing operation of the sugarbeet fiber, at 38. A variety of washing processes may be utilized, including dilution/separation processes (i.e., tank washing or batch washing) and continuous countercurrent washing processes. The washing operation preferably involves use of water heated to within a range of approximately 55° C. to 65° C. in a heating operation 40. Even though the washing water is warmed, it is preferably cool relative to the heat treatment temperature, and results in a cooling of the fiber to inhibit degradation. Preferably, a continuous countercurrent washing process is used.

The retention time, i.e., holding time, of the fiber in washing process 38, may be varied. Typically approximately 15 to 60 minutes, and preferably 30 to 60 minutes is sufficient, if a continuous countercurrent process is used. At the end of this step of the process, it is believed, the concentrations of a large portion of the components otherwise responsible for the off-flavor and off-odor in the fiber have been substantially reduced, i.e., decreased. Furthermore, any oxidizing agent and/or any additives that may (optionally) have been used in the rehydration stage 20 of the process will have been reduced in concentration through this washing step.

The material, thus effectively treated for the off-flavor and off-odor, can (optionally) be transferred to an enzyme treating operation 42, if the fiber slurry had been previously contacted with an oxidizing compound, and if the fiber contains an unacceptable residual amount of the oxidizing compound. In such an operation, the fiber can be treated with an enzyme, for example catalase, to effectively reduce, i.e., decrease, the concentration of any residual oxidizing agent.

The fiber that exits the system is therefore generally free from a substantial portion of the components responsible for the undesirable odor and taste (i.e., the off-odor and off-flavor have been effectively reduced). The resultant dietary fiber material is therefore suitable for incorporation into food products for human consumption at advantageous levels.

The fiber exits the treating operation 42 with a moisture content of between about 92% and 97%, preferably between about 92% and 94%. This fiber is then (typically) transferred to a second pressing operation 44 for reduction in the moisture content to approximately 75% to 85%, preferably 75% to 80%. The material then goes to a drying operation 46, wherein the material is heated at an effective temperature and for an effective length of time such that the moisture content is reduced to approximately 3% to 7%, i.e., 93% to 97% solids, by weight. Finally, the fiber may be transported to a grinding operation 48 (if desired) wherein the particle size is reduced, and then preferably to a packaging operation 50. Such a reduction in moisture content is generally obtainable only if overheating has not occurred in the heat treatment step, degrading the fiber to a point that it will not readily dewater.

Figure 2A:
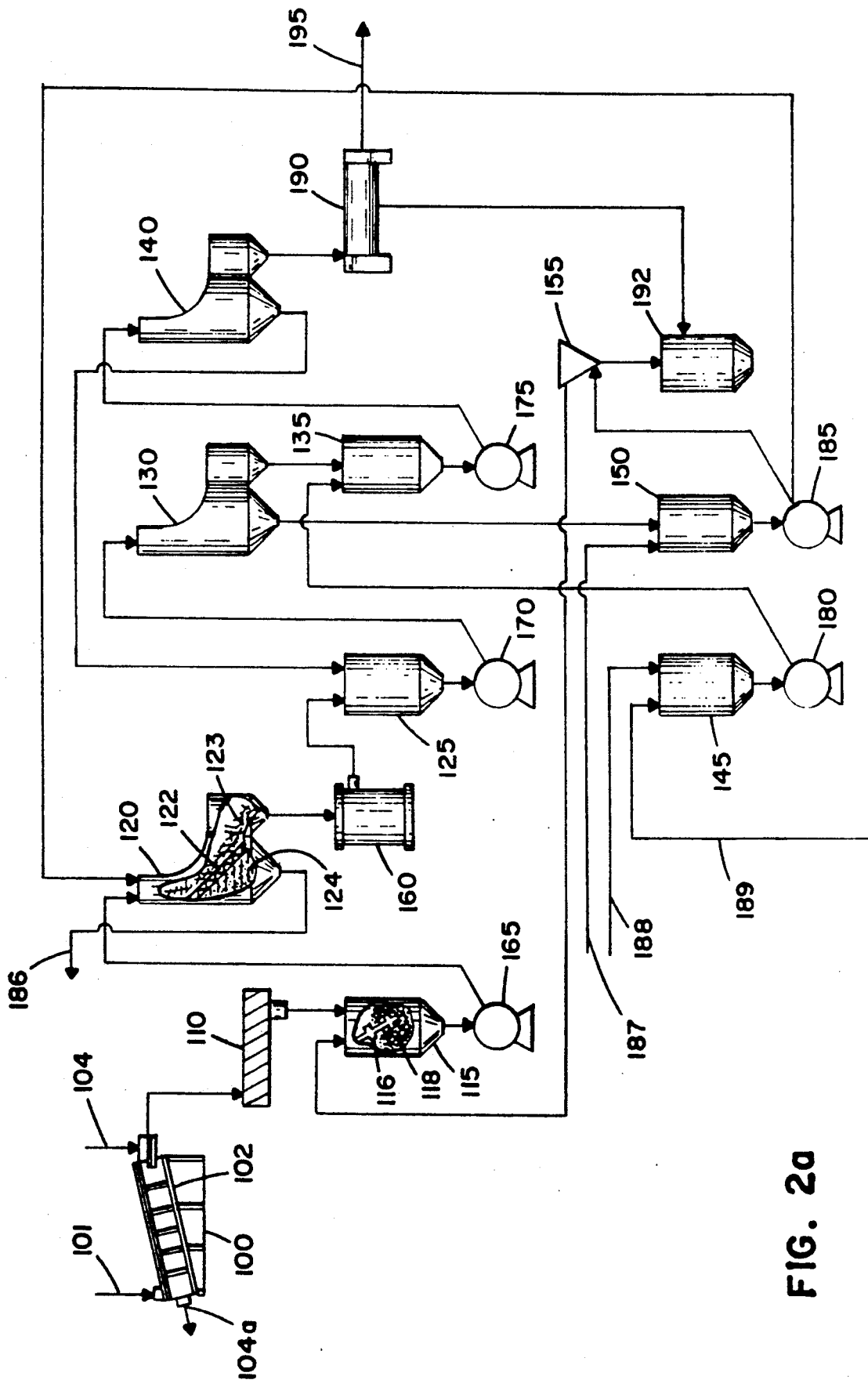
FIG. 2a is a simplified schematic of a preferred cleaning stage of an overall system for treating vegetable fiber as described herein.
Figure 2B:
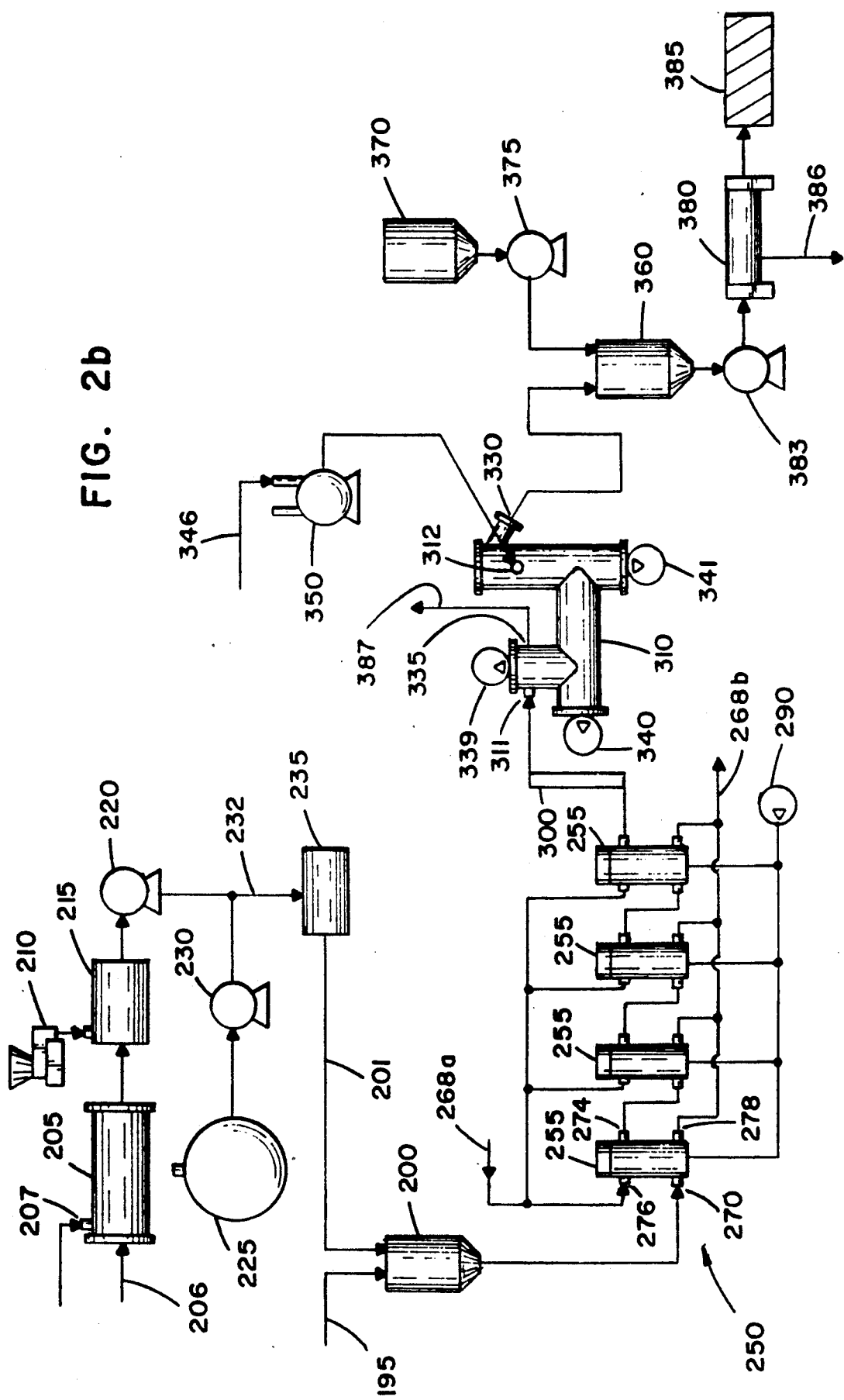

Methods and systems described herein may be advantageously used to treat other vegetable fiber materials that may also be adversely affected by an undesirable odor and taste. A schematic of a preferred overall system of the present invention (including optional steps) is shown in FIGS. 2a and 2b. These figures are referred to below, with respect to the sugar diffusion, cleaning, removal of undesirable smell and taste, pressing, and drying steps described. Specifically the discussion is directed to treating sugarbeet fiber. This is not, however, intended to be a limitation to the methods and systems of the present invention. A variety of vegetable fibers may be treated in an analogous manner to that described herein below to reduce adverse flavor and odor components that may be similar to those found in sugarbeet fiber.

A. Sugar Diffusion

A preferred process for the production of improved sugarbeet fiber generally begins with cleaning the sugarbeet fiber as it exits a diffuser, wherein the sugar component, e.g., sucrose, has been extracted. For a more complete understanding of the overall process, however, a brief discussion of the diffusion stage of sugarbeet processing is presented. Initially, the sugarbeet is washed with water to remove any foreign material, is sliced or broken into a plurality of pieces, i.e., cossettes, and is contacted with water under conditions sufficient to cause a mass transit of sugar from the sugarbeet cossettes to the water. The resultant products are a commercially valuable sugar-containing juice, and sugarbeet pulp (vegetable pulp), also referred to herein as sugarbeet fiber (vegetable fiber).

Referring to FIG. 2a, a preferred diffuser 100 is one that allows for continuous diffusion and is designed for effective countercurrent extraction of the sugar from sugarbeets, which are input at 101. The particular diffuser 100 referenced is a slope-type diffuser. In this embodiment, the diffuser 100 generally comprises a long trough 102 slanted or sloped upwards, means for propelling the cossettes up the sloped trough, and means for injecting water in the upper end 104 of the diffuser trough 102. The upwardly moving cossettes are therefore contacted with the extraction water, as the water percolates downward through the mass of cossettes under the force of gravity. In this manner, the diffuser water extracts the sugar. Outlet flow of extraction fluid from the diffuser 100 is indicated at 104a. The temperature of the diffusion process is generally and preferably maintained at approximately 50° C. to 70° C. for efficient extraction of the sugar from the beets.

In some processes, in order to aid and enhance the diffusion of sugar from the beets, a sulfite source is added to the diffusion water at a rate such that the diffusion water contains anywhere from 250 to 3,000 ppm $SO_2$, but preferably approximately 700 ppm $SO_2$. In such processes the sulfite source is sodium metabisulfite ($NaH_2SO_3$), but it may also be gaseous or liquid sulfur dioxide ($SO_2$), sodium sulfite ($NaSO_3$), sodium bisulfite ($NaHSO_3$), or other metabisulfite, sulfite, or bisulfite salts.

Sulfites are antioxidants having the useful ability to prevent the premature browning of vegetables treated therewith. Sulfites have been used at various stages and for various reasons in the processing of sugarbeets including: (i) in the sugar-rich juice to control juice color after purification and to reduce the pH profile during evaporation; (ii) in the diffuser water to inhibit microbiological growth by acting as a bacteriostatic agent or bactericide; and, (iii) in the diffuser water to control the color of the exhausted beet pulp. This latter function may be due to the inhibition of both enzymatic browning, which is generally believed to be caused by the action of polyphenoloxidase enzymes, and other nonenzymatic browning reactions.

Concerns over the possibility of adverse side effects created by the ingestion of sulfites has led to a dramatic decline in the use of sulfites on foods intended for human consumption. In the past, the utilization of sulfites in the processing of sugarbeets has not posed a problem as a portion of the sulfite employed during sugarbeet processing was absorbed by the sugarbeet pulp, which was either sold as livestock feed or otherwise disposed of, while the extracted sugar, which was typically intended for human consumption, was substantially sulfite-free. However, the level of sulfite typically present in the pulp can create a hindrance to its acceptance for widespread use as a human foodstuff. Accordingly, some embodiments of the present invention concern methods of producing substantially sulfite-free sugarbeet fiber that retain the beneficial effects of employing sulfite compounds during sugarbeet diffusion. Of course, in preferred applications the sulfites are not added in the first place, provided desirable sugar diffusion can be accomplished without them.

The diffusion stage of the process is typically controlled and optimized to produce an extracted fiber containing about 10% to 20% residual sugar, i.e., residual dry substance (RDS), based upon the dry weight of the exhausted fiber (which corresponds to about 1% to 2% residual sugar based upon the wet weight of the exhausted fiber). Generally, in sugarbeet processing, get fiber from the diffuser is directed to a fiber press, also commonly referred to as a pulp press, where the moisture content of the fiber is reduced. Because the improved fiber product of the present invention is intended for human consumption, however, it is often desirable to remove foreign material and to reduce the sulfite content of the fiber, in addition to reducing the off-flavor and off-odor. For preferred applications of the present invention fiber from the diffuser 100 is directed to a cleaning stage, which involves separating free and adherent foreign material from the fiber. Subsequently, the sulfite content (if sulfites were added) is typically reduced. It is not critical, however, that these steps be performed in this order. Furthermore, it is not a requirement that they be performed at this stage of the overall process for some advantage to be derived.

B. Cleaning of Vegetable Fiber

The cleaning stage of preferred overall processes for the production of the improved dietary vegetable fiber e.g., sugarbeet fiber, results in removal of foreign material such as dirt or grit, whether free or adherent, from the vegetable fiber. This is accomplished by: loosening at least a portion of the adherent foreign material from the fiber; obtaining an aqueous separation of the vegetable fiber and a portion of the free and/or loosened foreign material; and, physically separating the vegetable fiber from at least a portion of the free and/or loosened foreign material. Preferably scrubbing and screening operations are used in combination to achieve fiber cleaning. For further cleaning, a plurality of the scrubbing/screening combination operations may be used.

Referring to the preferred processes illustrated in FIG. 2a, fiber contaminated with free and adherent foreign material from the diffuser 100 is directed through a pulp feeder 110 to a first slurry tank 115, containing an impeller 116, wherein a first slurry 118 is formed. The fiber is subsequently transferred to a first screening apparatus 120, wherein the first slurry 118 is separated by a first screen 122 into a solids fraction 123 containing substantially all of the vegetable fiber and an underflow 124 containing substantially all of the water and a major portion of the free foreign material. The fiber is then preferably directed to a second slurry tank 125, a second screening apparatus 130, a third slurry tank 135, and a third screening apparatus 140. Water for each step of this process is either fresh or recycled water, and may be from a recycled water tank 145, or a holding water tank 150, which is preferably used in combination with separating means, such as a hydrocyclone 155. This cleaning stage of the process may also incorporate means for reducing the particle size of the pulp and/or foreign material and means for further loosening adherent foreign material. Certain of these processes may be accomplished through the use of a mill 160, although the slurry tanks may also accomplish certain of these processes during agitation, at least to some extent. The fiber slurries and/or water are transferred &throughout the system by suitable means, such as pumps 165, 170, 175, 180, and 185. Although in FIG. 2a specific water flow is shown for each step of the cleaning stage, there is of course no requirement that the water flow system be designed in such a manner.

For the preferred embodiment shown in FIG. 2a sufficient water from holding water tank 150, is directed through a hydrocyclone 155 (for purification, if desired) to the first slurry tank 155 to form a first slurry 118 containing about 0.1% to 4%, preferably about 1% to 4%, sugarbeet fiber. The first slurry 118 is then agitated within slurry tank 115 by suitable means, such as the impeller 116, to ensure a uniform slurry. The uniform first fiber slurry 118 is then conveyed by any suitable means, such as pump 165, to the first screening apparatus 120. As stated above, in the first screening apparatus 120, the first slurry 118 is separated by the first screen 122 into a solids fraction 123 containing substantially all of the vegetable fiber and an underflow 124 containing substantially all of the water and a majority of the free foreign material. The underflow 124 may be discarded; or, be directed back (along paths 186 and 187) to the holding water tank 150, separated from the foreign material, preferably using a hydrocyclone 155, and recycled. The solids fraction 123 is then combined with sufficient fresh and/or recycled water, preferably water from the holding tank 150, to form a flowable slurry, which is then conveyed to a mill 160. In the mill 160 the particle size of the fiber is reduced and a substantial portion of any remaining adherent foreign material is typically loosened from the vegetable fiber. The flowable slurry is then conveyed from the mill 160 into a second slurry tank 125 along with sufficient water, preferably recycled underflow water from a third screening apparatus 140, to form a second slurry containing about 0.1% to 4%, preferably about 0.5% to 2%, sugarbeet fiber. The second slurry is agitated within the second slurry tank 125 by suitable means, such as an impeller analogous to impeller 116, so as to loosen a substantial portion of any remaining adherent foreign material, still attached to the fiber after exiting the milling step, and to ensure a uniform slurry. The uniform second slurry is then conveyed by suitable means, such as a pump 170, to the second screening apparatus 130 wherein this second slurry is separated into a solids fraction containing substantially all of the reduced particle size, i.e., disintegrated vegetable fiber, and an underflow containing substantially all of the water and a major portion of previously adherent foreign material. Although not specifically shown in FIG. 2a, this separation may be accomplished in an analogous manner to that in the first screening apparatus 120; however, other screening methods may be used.

The underflow from the second screening apparatus 130 may be discarded or recycled and employed at some other stage in the vegetable processing plant. In the embodiment shown in FIG. 2a, the underflow is directed to the holding tank 150. The solids fraction of the fiber slurry from the second screening apparatus 130 is preferably conveyed from this second screening apparatus 130 into a third slurry tank 135 wherein sufficient water, recycled and/or fresh, e.g., from the recycled water tank 145 (which may be supplied with fresh city water along path 188 and/or may be recycled water from a later processing step directed along path 189), is added to form a third slurry containing about 0.1% to 4%, preferably about 0.5% to 2%, vegetable fiber. The third slurry is agitated, as were the previous slurries, by suitable means, such as an impeller, for uniformity. The uniform third slurry is then conveyed by the pump 175 to a third screening apparatus 140 wherein the fiber in the third slurry is substantially completely separated from the water and any remaining foreign material.

Although at least three scrubbing/screening operations are desired and advantageous, multiple steps are not required in this stage of the process. Depending upon the quality of the fiber material, i.e., the amount of dirt and/or grit contained therein, fewer (or more) steps may be carried out to remove foreign material therefrom.

In the above-listed steps involved in the cleaning of vegetable fiber, specifically sugarbeet fiber, after it has left the diffuser, the amount of foreign material loosened and/or separated in each step varies depending upon the equipment and parameters chosen. That is, the extent to which the fiber is free of foreign material after each scrubbing, i.e., agitating, and screening step depends upon the type of agitator used, the agitation rate, the dwell time in the agitator, the type of mill used, the dwell time in the mill, the type of screen used, e.g., static or vibrating, and the size of the screen openings, which may be different for each stage of the cleaning operation.

Generally, the scrubbing operation involves the formation of a slurry and agitation of this slurry. It also may, and preferably does, involve reducing the particle size of the vegetable fiber and/or the foreign material. Thus, the scrubbing operation provides means for loosening adherent foreign material from the fiber, and means for obtaining an aqueous separation of the fiber from the loosened foreign material and free foreign material. The screening operation provides means for physically separating the fiber from the foreign material, whether originally free or adherent.

The scrubbing operation preferably incorporates the use of a container, e.g., slurry tank, equipped to combine and agitate the fiber and the foreign material. The container, i.e., scrubber, preferably allows for concurrent flow of water and fiber, and preferably has 2 impellers for agitating the fiber slurry. The scrubbing operation may also incorporate means for reducing the particle size of the fiber and/or foreign material. Although the scrubber, i.e., slurry tank and agitator, may accomplish this, the particle-size reduction is preferably carried out by a mill. The preferred mill is an impact-type mill, such as a gorator, which chops and otherwise tears up long shreds of the fiber material. The mill preferably shreds the fiber material into particles of a size that will not plug any systems during further processing. This is generally accomplished by reducing the particle size of the material to no less than about a plus 10 mesh.

The screening operations preferably incorporate the use of static or vibrating screens. In a preferred embodiment, the first screening arrangement 120 uses a static parabolic high pressure screen, which uses a high pressure water spray to assist in the screening operation. The second and third screening operations 130 and 140 preferably incorporate an arrangement that vibrates as the material travels across the screen. Whether static or vibrating, the screening arrangement is preferably pitched, i.e., sloped.

The vegetable fiber, thus scrubbed, and with about a 92% to 97%, and preferably a 92% to 94%, moisture content, by weight, is then transferred to a first mechanical pulp press 190 for removal of a substantial portion of the water therefrom. Pulp presses, i.e., fiber presses, squeeze water from the fiber by mechanically forcing the fiber into continuously smaller volumes. The resultant pressed fiber may contain about 75% to 85% water, and if properly processed and pressed, the fiber preferably contains a moisture content of about 75% to 80%, i.e., 20% to 25% solids. This pressing operation is advantageous and preferred, before further processing, because it removes more contaminated water, i.e., dirt-and/or grit-containing water. It is sufficient, however, to reduce the moisture content during this operation to about 85%, since additional water will be added in the next stage of the process. Water from the first press 190 is preferably directed to a waste water tank 192. The fiber is directed along path 195 to further processing (see FIG. 2b).

A variety of fiber presses may be used. A convenient one is a twin screw, horizontal press, which is commonly used and available from various manufacturers. For a further discussion of the cleaning stage of the process, i.e., the scrubbing/screening/pressing operations, and equipment that may be used, see U.S. Pat. No.

4,770,886, the disclosure of which is incorporated herein by reference.

The cleaned, freshly pressed, rewatered material is subjected to further processing to reduce the concentration of, or otherwise alter, those components responsible for the adverse flavor and odor. Additionally, fiber material that has been previously treated as above-described and dried to a moisture content of about 3% to 7% may preferably be subjected to the same processing steps to reduce the unpleasant flavor and odor components.

C. Removal or Reduction of Undesirable Components

It will be understood that a variety of pretreatment processes may be utilized, in order to obtain vegetable fiber (for example sugarbeet fiber) to be treated in the later described stages for removal of undesirable flavor/odor characteristics, and the components associated therewith. The previously described processes and equipment are therefore to be interpreted as examples. However, a preferred overall process does result through utilization of these pretreatment steps, since they have been found to be efficient and effective as a means of obtaining the overall fiber product desired.

1. Rehydration

Vegetable fiber, whether freshly pressed or previously dried, is directed into a rehydration stage of the process. During this rehydration stage, the fiber is brought back up to a moisture content of at least about 92%, preferably about 92% to 97%, and most preferably to within a range of about 92% to 94%. This is accomplished with fresh water, which is preferably slightly preheated. By fresh water, it is meant that the water is either directly from a relatively clean city water source, or has been used in some other process but is appropriately purified of most chemical and physical contaminants. This is done so that a flowable slurry can be heated further in the process of improving the odor/flavor. Also, optionally, during this stage of the process, chemicals may be added to the fiber material so as to reduce the concentration of any sulfite compounds which may have been used in a diffusion operation involving the vegetable material, e.g., sugarbeets.

Referring to FIG. 2b, fiber is directed from the first fiber press 190 along path 195 (or alternatively from a storage location) to a rehydration tank 200. Preferably water is added to the rehydration tank 200 through line 201 at a slightly elevated temperature of approximately 30° C. to 60° C.; and, more preferably it is added at a temperature of about 40° C. to 50° C. There is no requirement, however, that the temperature of the water be elevated. Use of heated water at this stage reduces slightly the time required to raise the temperature of the fiber slurry in the next stage of the process.

If heated at all, the water may be conveniently heated by a heat exchanger 205. Preferably conditions are maintained such that the final pH of the slurry is about 5 to 7, and more preferably about 5.5 to 6.5. This can be readily accomplished through use of typical city water, and, if necessary, pH control by addition of appropriate materials. The fiber slurry produced in the rehydration tank 200 most preferably has a pH of no greater than about 6 to 7 so that the fiber is not adversely affected by decomposition of the pectic substances.

When sulfites are used in the diffusion/extraction process the benefits derived from such use of sulfites may be retained while the sulfite concentration in the resultant sugarbeet fiber product is reduced significantly (typically to less than about 50 ppm and often to less than about 10 ppm, based upon the dry weight of the fiber, resulting in a reduction of sulfite content by at least about 50% and often by at least about 75%) by contacting the sulfite-containing sugarbeet fiber with a stoichiometric excess, based upon the amount of sulfite in the sugarbeet fiber or added to the extraction water, of an oxidizing compound. Alternatively stated, the sulfite concentration may be reduced by at least about 50% and often by at least about 75% by treating the sulfite-containing sugarbeet fiber with an effective amount of an oxidizing compound. Typically, an effective amount is an amount such that the slurry contains about 200 to 4500 ppm of the oxidizing compound, preferably about 1500 to 3000 ppm, and more preferably about 250 to 1500 ppm.

Oxidizing agents or compounds useful for reducing sulfite content include the organic peroxides such as benzoyl peroxide, inorganic peroxides such as hydrogen peroxide, ozone, chlorine dioxide, and aqueous solutions thereof. Because of its low cost and ease of availability, the preferred oxidizing compound for this use is hydrogen peroxide ($H_2O_2$). Hydrogen peroxide is typically commercially available in aqueous solutions of concentrations ranging from about 3% to 90% hydrogen peroxide.

While the contact time necessary to ensure effective reduction of the sulfite content varies with reaction conditions such as concentration of hydrogen peroxide, size of cossettes or fiber particles, temperature, agitation rate, etc., generally about 2 to 10 minutes contact time at a contact temperature of about 20° C. to 95° C., and preferably about 30° C. to 60° C., is typically sufficient.

When an oxidizing agent is used to treat sulfites, typically another additive, such as a stabilizing agent, is also used. The stabilizing agent, i.e., stabilizer, is used in such a variation of the process to advantage for stabilization of the dilute solutions of the oxidizing compound, specifically hydrogen peroxide. Stabilizing agents and/or other additives may include ethylenediaminetetraacetic acid (EDTA), citric acid, and ascorbic acid. The preferred additive will typically be EDTA because less may have to be added relative to the other substances listed. Furthermore, care must be taken with the others listed to ensure that the pH of the slurry is not adversely affected.

Referring to FIG. 2b, the system shown provides for the optional addition of the EDTA and $H_2O_2$ to fresh water before combination with the fiber in the rehydration tank 200. This provides an advantage (when oxidizing agents and stabilizers are used at all) since concentrations may be more easily controlled in this manner. The water directed along path 206, preferably heated slightly by the heat exchanger 205 (with steam input at 207), is combined with EDTA by suitable means, if desired. For example, a volumetric feeder 210 and an eductor 215 are used in combination to provide an adequate supply of EDTA to the water. This system is an effective and advantageous way of metering and blending the EDTA and water; however, other means for achieving this are possible. The eductor 215 "pulls" the EDTA into the water, and the volumetric feeder 210 controls the amount of EDTA added to the water. The water and EDTA are then transferred by suitable means, such as pump 220, along line 232. They are then combined with an appropriate amount of $H_2O_2$, which is stored in storage tank 225, and conveyed by suitable means, such as pump 230, and combined with the $H_2O$ and EDTA in line 232. The water, EDTA, and $H_2O_2$ are then thoroughly mixed, preferably by static mixer 235, which resembles a nonmoving screw conveyor. This aqueous mixture is then conveyed to the rehydration tank 200 through line 201, wherein a slurry is formed. Again, the amount of water, EDTA, and $H_2O_2$ are controlled so as to form a slurry with at least about a 92% moisture content by weight (preferably about 92% to 97% moisture, and more preferably 92% to 94%), an effective concentration of $H_2O_2$, and an effective concentration of EDTA. These effective concentrations are generally within the range of about 200 to 4500 ppm $H_2O_2$, and about 50 to 600 ppm EDTA. Preferably, the slurry contains about 1500 to 3000 ppm $H_2O_2$ and 50 to 300 ppm EDTA, with the $H_2O_2$ concentration more preferably and advantageously within the range of 250 to 1500 ppm and the EDTA concentration more preferably within the range of 90 to 110 ppm. These concentrations are based upon the concentrations within the slurry.

The rehydration tank 200 is (for a typical operation) preferably (for efficiency) a continuous blender-type unit, and resembles a double-screw conveyor. However, a variety of types of equipment may be used. The slurry, preferably at a temperature of about 30° C. to 60° C. (more preferably at a temperature of about 40° C. to 50° C.) is then conveyed to the next stage of the process, i.e., the heat treatment stage, wherein the off-odor and off-flavor are reduced. The residence time of the slurry in the rehydration tank 200 can be very short.

Again, although the process shown in FIG. 2b displays vegetable fiber rehydrated with aqueous $H_2O_2$ and EDTA, this is not required. The fiber could be rehydrated with just water, either preheated or not, and then directed to the stage of the process wherein the odor and taste are improved. This may be preferred if the fiber material does not contain undesired levels of sulfites.

2. Heat Treatment

The material that exits the rehydration tank 200 is passed into a heat exchanger arrangement 250. This arrangement heats the slurry (which may initially have already been pretreated to be within a temperature range of about 30° C. to 60° C.) to a temperature of at least about 95° C. and more preferably to a temperature of at least 98° C. Also, in preferred operations the slurry is not heated above about 110° C. Preferably the temperature is raised to within a temperature range of about 98° C. to 105° C. Most preferably, the temperature is raised to 99°-100° C. The temperature of the fiber slurry is typically increased to the desired range within about 3 to 5 minutes. By keeping the temperature at about 99°-100° C., steam production is typically eliminated and the occurrence of mechanical handling problems with backpressure valves is reduced.

The slurry is then heat treated at a temperature of at least about 95° C. and preferably at least about 98° C. It is also generally preferred that the slurry temperature not exceed about 110° C. during this stage. Also, preferably the slurry is maintained within a temperature range of about 98° C. to 105° C. Most preferably, the slurry is maintained at about 99°-100° C., which is also the most preferred temperature range at which the fiber slurry exits the heat exchanger. The temperature at which the slurry is treated is generally the same as that at which it exits the heat exchanger; however, this is not necessarily required.

Again, these parameters were developed in a pilot plant operation and are disclosed in parent application Ser. No. 07/406,954. Upon scaling up to produce the vegetable fiber material of the invention more efficiently, these parameters were learned to produce a mushy fiber material that could not be efficiently mechanically pressed to remove excess water. Therefore, new parameters were developed, as is described herein below.

Typically, in the pilot plant the slurry was maintained within the desired temperature range for at least about 1.5 minutes, and preferably for about 1.5 to 8 minutes. More preferably, the slurry was maintained at the desired temperature for about 1.5 to 3.5 minutes. At the time the process was developed in the pilot plant, it was believed that the maximum length of time that the fiber slurry is maintained within the desired temperature range is not apparently critical to achievement of effective improvement in flavor and odor. Furthermore, it was believed that a longer period of time would not adversely affect the beneficial characteristics of the fiber. However, the use of significantly shorter holding times and/or holding at temperatures below about 95° C. was believed to typically result in a fiber product that would still possess unacceptable flavor and odor characteristics. Upon scaling up of the operation, it was surprising to learn that the product could become mushy, as if cooked, if the temperature is too high and/or the time of heat treatment is too long. Thus, treating at an appropriate temperature and for an appropriate length of time is what is generally required. This is further discussed below with respect to a commercial-scale process.

A variety of arrangements (i.e., reactors) may be utilized to conduct the heating of the slurry to appropriate treatment temperature. If food grade steam is available, the steam may be directly applied to the fiber slurry, for example through utilization of an injection cooker or the like. On the other hand, if food grade steam is not readily available, an indirect heat exchanger arrangement may be needed, for example a Beuss extruder or a swept surface heat exchanger. The heat exchanger or reactor arrangement is generally indicated in FIG. 2b at reference numeral 250. For the arrangement shown in FIG. 2b, a plurality of units (reactors) arranged in series operation are shown.

Figure 3A:
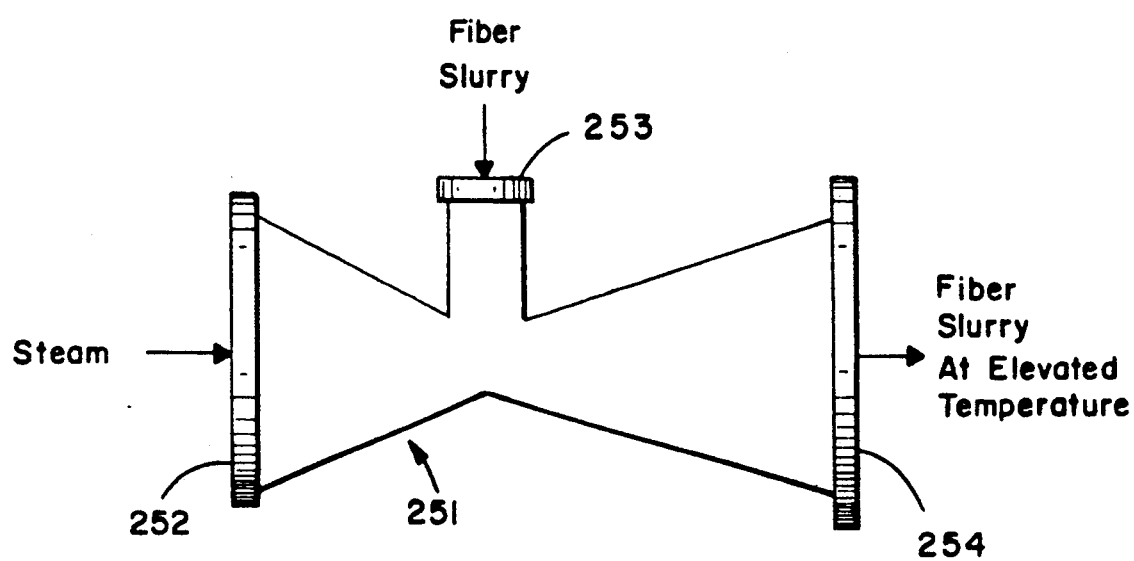
FIG. 3a is a simplified schematic representation of an injection cooker optionally usable for heat treatment in certain selected processes according to the present invention.

For specific details described herein with respect to FIG. 3a, it is assumed that food grade steam is available and an injection cooker is used. Referring to FIG. 3a, an injection cooker 251 is shown. The cooker includes a steam inlet port 252 and a fiber slurry inlet port 253. Within the interior of the cooker 251, the fiber slurry and steam are directly mixed, to result in a hot fiber slurry, which is ejected from port 254. It will be understood that injection cookers, such as injection cooker 251, may be utilized in the process of FIGS. 2a and 2b, where heating arrangement(s) 250 is shown. However, should an injection cooker such as cooker 251 be illustrated in arrangement 250, FIG. 2b, the steam lines would be represented differently.

Figure 3B:
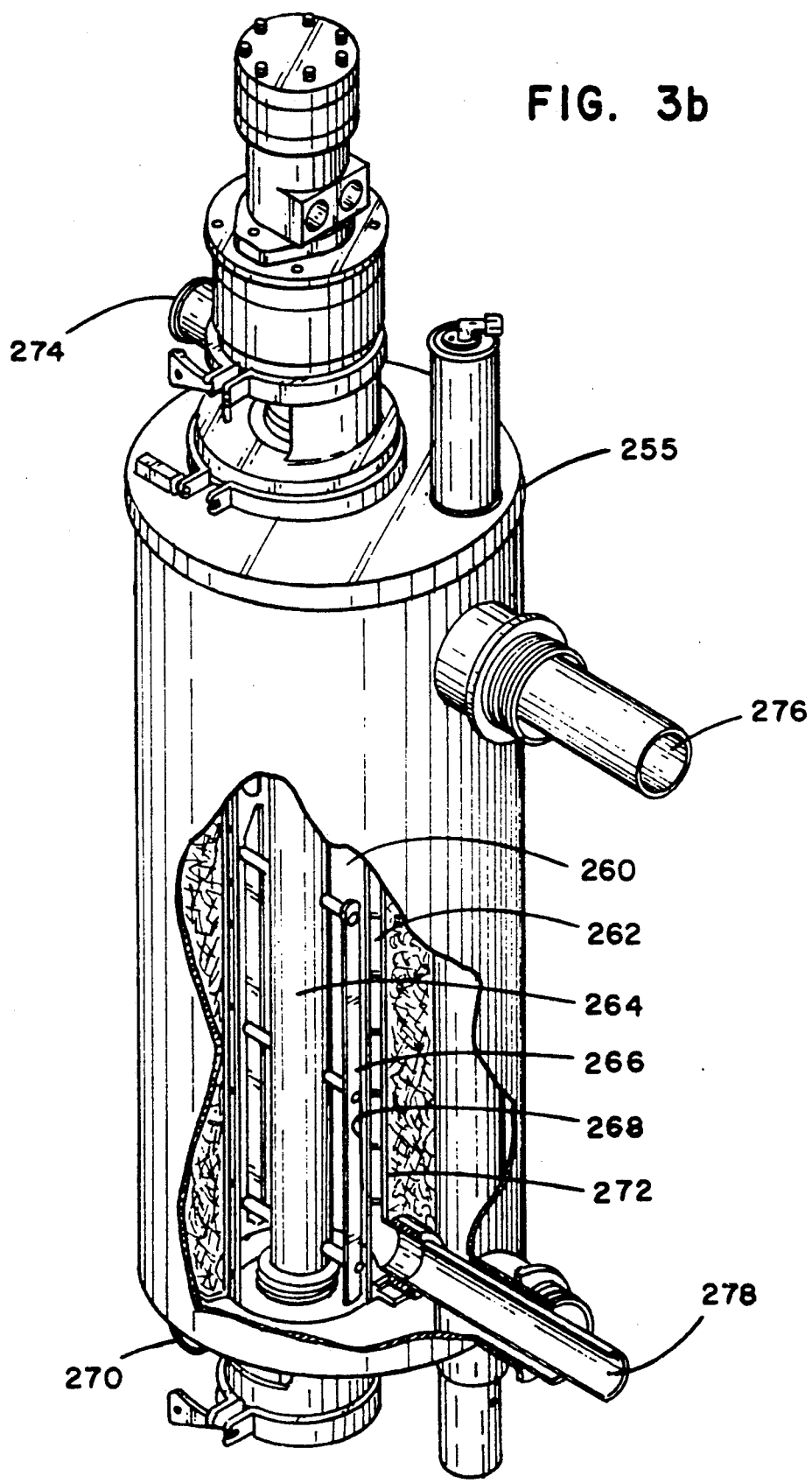
FIG. 3b is an enlarged fragmentary perspective view of a scraped surface heat exchanger optionally usable in certain selected processes according to the present invention; portions have been broken away to show internal detail.

For specific detail described herein with respect to FIGS. 2b and 3b, it is assumed that food grade steam is not available and an indirect heating arrangement is necessary. Of the available heating mechanisms, for illustration herein a scraped surface heat exchanger (SSHE) 255 is described. Scraped surface heat exchanger arrangements have been used for a variety of heating and cooling processes. Here, one is used for the unique purpose of facilitating reduction in off-odor and off-flavor constituents. Because of the efficiency and speed with which a SSHE increases the temperature of the fiber slurry, this type of heat exchanger offers some advantage, when food grade steam is not available. Again, this does not mean that the general system and process of improving the flavor and odor of vegetable fiber, e.g., sugarbeet fiber, described herein requires such an exchanger for some advantage to be achieved. For the remaining discussion of FIG. 2b, however, it will be assumed that a SSHE is employed.

Referring to FIGS. 2b and 3b (in FIG. 3b a preferred SSHE apparatus for heat treatment is shown in detail), each scraped surface (or swept surface) heat exchanger (SSHE) unit 255 consists of a jacketed internal cylinder 260, which creates an annular space 262 with sufficient volume for a flow of a heating or cooling media therethrough. This jacketed cylinder 260 is fitted with a rotating shaft 264 on which scraper blades 266 are mounted such that they are allowed to swing freely. In operation, the SSHE blades 266 are generally held in position by centrifugal force against the inside wall 268 of the cylinder 260. Thus, product is substantially continuously swept away from the inside wall 268, i.e., the heat transfer surface, and new product is exposed to treatment. This inhibits any localized overheating, and ensures against localized "cool" spots.

Referring to FIG. 2b, steam for heating arrangement 250 is fed in, via line 268a, and, if removed, is removed via line 268b. (If an injection cooker such as cooker 251, FIG. 3a, were used, then the "steam" would exit as part of the heated slurry.)

Again referring to FIG. 3b, during operation the aqueous fiber slurry, is pumped into the jacketed internal cylinder 260 through a product inlet port 270. The fiber slurry is preferably directed through the system at any acceptable flow rate for efficient and effective heating, for example of about 4200 pounds per hour (dry weight) (1900 kg/hr), as occurs in a typical commercial-scale operation. The slurry passes through the internal cylinder 260 while steam flows through the annular space 262 between the cylinder 260 and jacket 272. The slurry then exits product outlet port 274. Steam enters steam inlet port 276, flows through the annular space 262, and out the steam exit port 278.

The particular type heat exchanger 255 shown in FIG. 3b is not equipped to pump the product. Therefore, Preferably a positive displacement pump 290, shown in FIG. 2b, is advantageously used because of the nature of the product slurry. That is, although the fiber is at a moisture content of up to about 97%, the material is still somewhat thick, and difficult to handle with a simple centrifugal pump of the type usually used for transferring liquids. Suitable pumps for the purpose of transferring slurries of pulp include, for example, piston-type pumps.

The heating arrangement shown has several heat exchangers or reactors, each of which (if SSHE) functions independently, and each of which operates either vertically or horizontally. In the drawings such a plurality of SSHE units 255 is shown. However, a plurality of other reactors, such as injection cookers similar to cooker 251, FIG. 3a, may be used. Generally, the fiber slurry is pumped into one end of the heat exchanger. As it flows through the first internal cylinder it is heated by circulating heating media, preferably steam, that flows in the annular space between the heat transfer wall and the outside tube. The transfer of heat from the steam to the fiber slurry is accomplished by conduction and is aided by convection currents created by the scraping blades, which agitate and scrape the product from the walls of the heat exchanger. The product then exits the other end of the first cylinder and is directed to the second cylinder, continues through the remaining cylinders in the series, and exits the arrangement heated to the desired temperature. Flow through this type of unit is not plug flow, since mixing of the product is considerable during passage through the unit. As a result, the material is generally uniformly mixed and heated. Scraped surface heat exchanger arrangements adaptable for use as described are available from manufacturers such as APV Crepaco, Inc. and Alfa-Laval.

Regardless of the method of heating used, or the equipment used, the parameters should be adjusted so that the material leaves the heating operation (reactor) at a temperature of at least about 95° C., and preferably at a temperature of at least about 98° C. Also, preferably the temperature is no greater than about 110° C. More preferably it exists at a temperature of at least between about 98° C. and 105° C. Most preferably it is heated to a temperature of about 99°-100° C. The material is then directed to a temperature-retention or holder arrangement, for example a transfer tube 300. The transfer tube 300 is adapted to hold the slurry at a temperature of at least about 95° C., and preferably at no greater than about 110° C. More preferably, the transfer tube 300 is adapted to hold the temperature of the fiber slurry of a temperature of at least about 98° C. and preferably at a temperature within a range of about 98° C. to 105° C. Most preferably, the temperature of the slurry is maintained at about 99°-100° C. The fiber slurry is maintained within the desired temperature range for an appropriate length of time, typically at least about 1.5 minutes, preferably about 1.5 to 8 minutes, and more preferably for about 1.5 to 3.5 minutes. The preferred transfer tube 300 is preferably made of stainless steel for adequate heat retention. The entire residence time of the slurry from the time it enters the heat exchanger arrangement 250 until the time it exits the transfer tube 300 is preferably about 4.5 to 13 minutes, for overall efficiency and efficacy.

During this stage of the overall process, i.e., the heating/holding operations, it is theorized, the majority of the components responsible for the odor and taste of sugarbeet fiber are extracted from the fiber portion of the slurry into the aqueous phase. Alternatively, or in addition, it is thought that perhaps the addition of thermal energy in some manner possibly converts compounds for the odor/flavor into a form, e.g., an isomer or product, that does not possess such adverse flavor/odor characteristics or which can be readily removed.

It will be understood that if a direct steam application is used, for example injection cooker 251, the adjustments to parameters described may be made to achieve a final, preferred slurry concentration. After heat treatment, the slurry material is passed from the transfer tube 300 into a stage of the overall process wherein the compounds responsible for the off-odor and off-flavor are believed to be generally washed away.

3. Washing and Treating

The washing stage of the process involves the use of any of a variety of types of washing operations adapted to effectively remove the aqueous phase, i.e., the liquid fraction, from the heat treated fiber slurry. A simple pressing operation is typically not sufficient to remove the off-odor and off-flavor agents. Methods whereby the slurry is alternately decanted and washed numerous times (for example tank or batch washing) are viable methods of washing. A variety of systems that utilize a continuous flow of water countercurrent to the flow of fiber slurry are acceptable, and advantageous, because of the efficiency with which such systems can be operated. Therefore, a countercurrent washer (using a continuous wash) is preferred for continuously bringing fresh water into contact with the fiber to wash undesirable components away from the fiber. Several types of countercurrent washers, i.e., countercurrent extractors can be used, including a slope diffuser, a tower-type diffuser, a U-tube, or a Hildebrand diffuser.

Figure 4A:
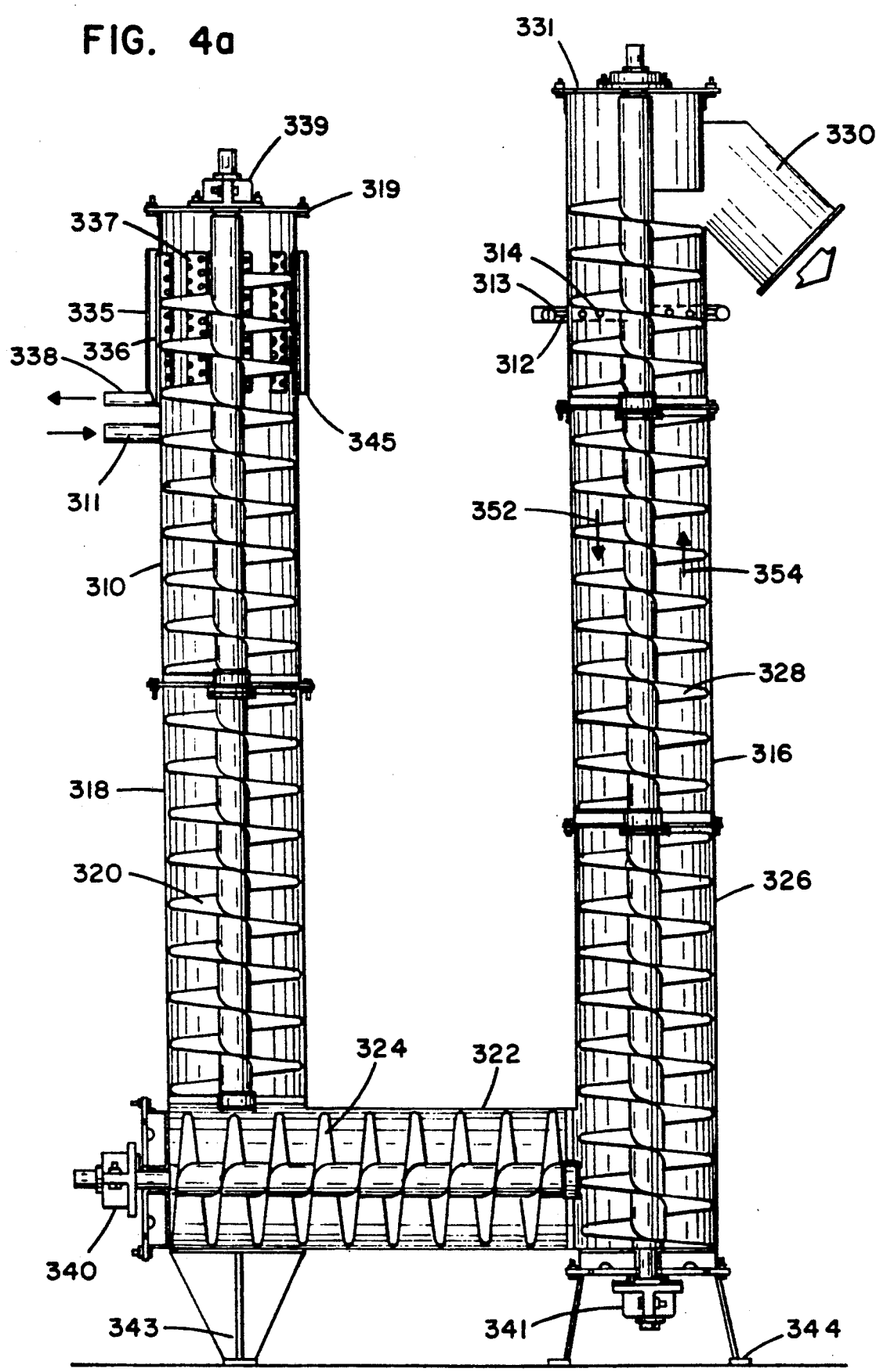
FIG. 4a is a schematic representation of a countercurrent washer optionally usable in certain selected processes according to the present invention.

Referring to FIGS. 2b and 4a (in FIG. 4a a preferred apparatus for countercurrent washing is represented in detail), in this stage of the process the hot fiber slurry exiting the heat arrangement or reactor 250 (and the holding arrangement, i.e., transfer tube 300) enters a washing arrangement comprising a countercurrent washer arrangement 310 at a fiber slurry inlet port 311 while water, for example fresh city water, enters water inlet arrangement 312 comprising a collar 313 with a plurality of water inlet ports 314 for even distribution of the water. This design of the water inlet arrangement 312 is advantageous for sufficiently even and complete contact of the fiber slurry with the countercurrent flow of fresh water.

The countercurrent extraction arrangement 310 comprises a U-shaped outer shell 316 with: a short vertical arm 318 having the fiber slurry inlet port 311 positioned near an upper end portion 319, wherein a first screw conveyor 320 directs the fiber material downward; a lower horizontal member 322, wherein a second screw conveyor 324 directs the fiber material horizontally from the short vertical arm 318 to a long vertical arm 326; and, the long vertical arm 326, wherein the fiber material is directed in an upward direction by a third screw conveyor 328 to a fiber slurry exit port 330 near an upper end portion 331. The long vertical arm 326 also contains the water inlet arrangement 312, also near the upper end portion 331.

The short vertical arm 318 of the U-shaped outer shell 316 contains a water outlet arrangement 335 at or near its upper end 319. The water outlet arrangement 335 consists of a jacket 336 and a screen 337. The screen 337 allows for the water to exit the washer without entrapping a substantial amount of fiber solids therein. The jacket 336 is attached to a water exit port 338. During operation, the water exiting the screen 337 collects in the jacket 336 and is directed to the exit port 338 and out of the countercurrent extraction arrangement 310. The screen 337 is generally kept free from plugging by the fiber solids due to the action of the screw conveyor 320.

Efficiency in operation is affected by providing a water outlet lower than the water inlet. Preferably an overall drop of about 1.5 to 2.5 feet, most preferably about 2 feet, (i.e., 0.5 to 0.8 meters, most preferably about 0.6 meters) is maintained, for desired fluid flow dynamics.

Each of the three screw conveyors 320, 324, and 328 is attached to a drive motor, 339, 340, and 341, respectively. The dimensions of the three screw conveyors 320, 324, and 328 and the U-shaped outer shell 316 (and operating speed of the conveyor and flow rate of wash water) are preferably such that the fiber slurry has an adequate residence time, i.e., holding time, within the countercurrent washer arrangement 310 for the undesirable off-flavor and/or off-odor components to be effectively removed. Although typically smaller in a pilot plant, for a preferred embodiment for use in a commercial-scale operation, the screw conveyors 320, 324, and 328 are 48 inch (122 cm) diameter screws, and the distance between the center of the two vertical conveyors, 320 and 328, is approximately 12 feet (4 meters). The short vertical arm 316 is about 33 feet (10 meters) in length between the upper end 319 and the base 343 and the long arm 326 is approximately 37 feet (11 meters) in length between the upper end 331 and the base 344. Furthermore, the level of the water inlet arrangement 312 is preferably about 2 feet (0.6 meters) above the bottom level 345 of the water outlet arrangement 335. Again, this latter dimension provides advantage for continuous flow dynamics.

Referring to FIG. 2b, during operation, water, preferably fresh city water (directed along line 346) heated approximately to within a range of 55° C. to 65° C. in heater 350 enters the water inlet arrangement 312 and travels in a countercurrent flow to that of the fiber. That is, the water generally flows in the direction of arrow 352, shown in FIG. 4a, and the fiber flows in the direction of arrow 354. The water is preferably added at a rate of about 2 to 6 gallons per pound (17 to 50 liters per kilogram) based on a calculation of dry substance fiber entering the system, to provide a continuous wash. The fiber slurry is preferably directed through the system at any acceptable flow rate for efficient and effective heating, for example about 4200 pounds per hour (dry weight) (1900 kg/hr) for a typical large-scale operation. The slurry has a preferred holding time, i.e., retention time, in the countercurrent washer arrangement 310 of about 30 to 60 minutes for optimum results, although about 15 to 60 minutes may be allowable. A holding time at or near 60 minutes is more preferred, with a holding time at or near 30 minutes most preferred. Due to heat exchange with the arrangement 310, the exit temperature of the water is typically at or near about 100° C., and the exit temperature of the fiber is typically within the range of about 55° C. to 65° C., which is preferred for the follow-up step of mechanical pressing, described below.

Again, a variety of arrangements for washing may be used. However, the illustrated design of the countercurrent washing equipment provides advantage when compared to other types of countercurrent washers, such as conventional vertical and slope-type diffusers, in part because of space requirements. To maintain the fiber slurry in a vertical and/or slope diffuser for the same amount of time at the same flow rate, much more space would typically be required. Also, conventional vertical and/or slope diffusers allow for lower density solids to float on the top of the water, thereby typically not having effective extraction contact with the water. In the present arrangement, the solids are forced downward by an auger, i.e., a screw conveyor, for a certain period of time and thus are more effectively contacted with the flow of countercurrent water.

The fiber material that exits the countercurrent washer 310 is generally acceptably free from the undesirable odor and flavor, that is, the off-flavor and off-odor are reduced to acceptable limits. Furthermore, the fiber will be generally free of a major amount of the oxidizing compound, $H_2O_2$, and any additives, such as EDTA, that may have been optionally added in previous steps. The fiber material is also substantially free of any organic solvent that is not a naturally occurring constituent therein. The fiber exits at approximately a 92% to 97%, preferably a 92% to 94% moisture content, by weight.

In some applications, the fiber slurry is transferred from the washer 310 to a mixing tank 360, wherein the fiber is combined with an enzyme, for example catalase, from holding tank 370. The enzyme is conveyed to the mixing tank 360 by suitable means, such as pump 375. The purpose of the enzyme is to reduce the concentration of any residual oxidizing compound that remains in the fiber after the washing stage of the operation. Typically, catalase would be a preferred enzyme because it effectively removes and/or reduces the amount of oxidizing compound, preferably hydrogen peroxide, and is considered acceptable for use in human consumable food products. The preferred rate of enzyme addition would be about 7.5 ml/hour. This supplies an excess of enzyme relative to the typical amount of $H_2O_2$ remaining in the fiber after washing. The temperature of the fiber is preferably less than about 65° C. so as to avoid deactivating the enzyme. Of course, if no oxidizing agents were used, no follow-up enzyme treatment would be desired.

4. Pressing and Drying

After the countercurrent washer 310, or after treatment in the mixing tank 360 for certain embodiments, the material is directed to any of a variety of arrangements for reducing the moisture content of the fiber. Preferably, the fiber is directed to a second mechanical fiber press 380 (FIG. 2b), for pressing, via pump 383 and then it is transferred to a dryer 385 where it is heated and dried. In the final pressing process, no additives are required and no temperature adjustment is needed. The temperature of the fiber slurry is generally within a range of about 55° C. to 65° C., which is how it exits the countercurrent washer 310. This is an advantageous temperature range for mechanically pressing. Temperatures much above or below this range generally cause functional problems with the pressing. The same type of press may be used in this pressing operation as was used in the previous pressing step of the process, e.g., a twin screw horizontal press. The second press 380 is preferably operated to reduce the moisture of the fiber to approximately 75% to 85%, preferably 75% to 80%. The water that is removed from each of these latter steps, i.e., washing and pressing, is transported to a waste water tank, a recycling tank, and/or a water treatment system along lines 386 and 387.

The dryer 385 used in the process preferably is operated for reduction of moisture content to about 3% to 7%, preferably to less than about 5% for advantageous storage and grinding. That is, with a moisture content above about 7% the fiber material is somewhat "rubbery", and therefore difficult to grind. Furthermore, fiber dried to a moisture content of about 3% to 5% can be stored for indefinite periods of time under ambient conditions without problems of substantial microbial growth.

A variety of dryers and methods of drying may be used. The dryer 385 preferably used in this process is an indirectly fired moving bed unit. Airflow is indirectly heated and is directed downward through the bed of fiber. Maximum air temperature of the dryer is approximately 125° C. Actual maximum temperature of the fiber during this process is approximately 100° C. under normal operating conditions.

The dried fiber solids are conveyed from the dryer to storage or day holding tanks. The product may be packaged as is, ground, and/or classified prior to packaging. The product will typically at least be ground to a minus 40 mesh material, for later use. When the product is from sugarbeet fiber, it typically has a slightly tan appearance.

Alternatively, the fiber may be conveyed from the second press 380 to another location for the addition of additives, such as flavorings, food dyes, minerals, etc. These additives are typically stable at the temperature at which the fiber is dried.

Ib. Commercial-Scale Process

FIGS. 1-3 also apply to a scaled-up version of the process and plant of the present invention. There are, however, slight variations in certain processing conditions for advantageous large scale production, which can be explained in reference to these figures. Many of these variations result from a change in the flow mechanics of the system upon scale up to a commercially viable level. For example, as the beet fiber exits the dewatering screen (see FIG. 1, screening operation 16) it preferably has a moisture content within the range of about 92% to 98% by weight, and more preferably 94% to 97%. This does not necessarily result in any advantage over the moisture content of material at this stage in a smaller-scale process. It is just a result of the flow mechanics.

As is shown in the flow chart in FIG. 1, the particular process shown includes the optional addition of a substance at the rehydration stage 20 that reduces the sulfite content. In a commercial-scale process, water is preferably heated in a heating operation 26 to within a range of about 20° C. to 65° C., more preferably to within a range of about 50° C. to 60° C. This preferred temperature range is slightly higher than that used in a process carried out on a relatively smaller scale in order to obtain advantage. It is desirable to increase the temperature of the fiber material before it passes into the heat exchangers in the heat treatment stage 30 of the process because of a resultant improvement in the heating efficiency of the fiber once in the heat exchangers.

Once the water (or aqueous mixture, if additives are used) and fiber are sufficiently mixed in the rehydrating operation 24, the resultant fiber slurry contains at least about 92% moisture, preferably 92% to 98% moisture, and more preferably about 94% to 97% moisture. It is advantageous to increase the moisture content of the fiber slurry as the scale of the operation is increased because of advantage realized with respect to efficient heat transfer to the fiber material in the heat exchangers, and reduced energy costs.

After rehydration, the fiber slurry is directed along path 29 (FIG. 1) to a heat treatment stage of the process, at 30, wherein the temperature of the fiber slurry is increased to an effective level for treatment. As stated above, the processing temperature and time are chosen for effective reduction or removal of the off-flavor and off-odor of vegetable pulp such that the fiber is not physically or chemically degraded so that it can not be mechanically pressed to a moisture content of less than about 85% by weight.

Although, in small-scale processes, as carried out in the pilot plant, temperatures below about 95° C. are generally not very effective at removing the odor and flavor of the fiber, the temperature can be lower in a larger scale process. This appears to be a result of the larger equipment and larger amounts of material flowing through the system. That is, with larger equipment, as is used in a commercial-scale operation, the temperature is maintained for a longer period of time. Not only is the fiber maintained at or near the processing temperature while in the holding tube, but once the fiber enters the washing stage of the operation, the temperature generally continues to be maintained at or near that temperature for an additional period of time. Therefore, if a temperature of 95° C. is used as the processing temperature in a commercial-scale plant, the fiber material could be maintained at that temperature for a longer period of time than desired. As a result of being held at a higher temperature for a longer period of time than desired for effective reduction of the off-flavor and off-odor, the fiber material has a tendency to become "mushy" as if it were cooked. It no longer is the consistency of a solid fiber material such that it can be mechanically pressed to effectively remove water.

Whatever the scale of the process of the present invention, the specific processing temperature chosen is correlated with an appropriate processing time such that the odor and flavor are improved without physical degradation of the fiber as defined above. In a commercial-scale process, typically, the temperature is increased to at least about 70° C., and more preferably to at least about 74° C. In many applications it is preferable to not heat the slurry above about 110° C. Preferably, treatment is conducted within a range of about 70° C. to 110° C., more preferably within a range of 74° C. to 93° C., and most preferably at a temperature of about 75° C. and no lower.

As in the pilot plant, a variety of arrangements (i.e., reactors) may be utilized to conduct the heating of the slurry to an appropriate treatment temperature. Typically, a plurality of units arranged in series are utilized. In the commercial-scale operation described herein fewer units are required because of the generally lower temperature used. Preferably, only four heat exchangers are used. Although not intended to be limited thereby, typically in a commercial-scale operation, the flow rate of the fiber slurry through the system is about 4200 pounds per hour (dry weight, 1900 kg/hr), as compared to a pilot plant operation, which has a fiber slurry through-put of about 16 pounds per hour (dry weight, 7 kg/hr).

Once the temperature of the material is increased to the desired level, it is then preferably directed into a holding operation 34, or transfer operation, wherein the material is held (i.e., retained) at an effective temperature for an appropriate length of time, typically for at least about 1 minute and preferably for about 1 to 8 minutes. More preferably, the material is held at a desired and effective temperature for at least about 1 to 3.5 minutes for advantageous and effective improvement in the smell and taste of the final fiber product. The transfer tube is significantly shorter in commercial-scale operations. For example, in treating volumes of fiber at a level of typical pilot plant operations, the transfer tube can be about 120 feet. However, with the larger volumes associated with typical commercial processes, the transfer tube is preferably about 10 to 15 feet. Because larger volumes of material generally hold heat, i.e., thermal energy, for a longer period of time, this allows for a faster transfer to the washer wherein the temperature of the fiber is decreased before it is detrimentally affected.

Although the temperature at which the fiber slurry exits the heating operation is typically the temperature at which it is maintained for an effective amount of time, this is not necessarily required. That is, as long as the temperature of the slurry does not generally fall below 70° C. until after the appropriate heat treatment retention time, the temperature of the slurry may decrease somewhat during the holding operation. Drops in temperature to below 70° C. may (in some instances) even be tolerated, provided that, in the end, sufficient overall time of treatment at above about 70° C. is conducted.

As in the pilot plant, the next stage of the process, at 36 (FIG. 1), is one in which the water in the aqueous phase of the slurry is removed and replaced by fresh water. The washing operation preferably involves use of water heated to within a range of approximately 20° C. to 65° C. in a heating operation 40. A lower temperature range is used in the commercial-scale process than in a process treating smaller volumes to allow for greater latitude to obtain efficient reduction of the temperature of the large volume of material once it enters the washer. For most effective pressing, the temperature of the fiber is advantageously 60° C. Therefore, the temperature of the wash water is adjusted such that the fiber exits the washing arrangement at a temperature within a range of about 55° C. to 65° C. Under certain conditions, the temperature of the water may need to be as low as 20° C. Typically, however, wash water will be within a range of about 50° C. to 65° C. as it enters the washing operation.

As in a small-scale operation, a typical commercial-scale operation can use any of a variety of systems for washing the vegetable fiber. Preferably a continuous flow of water countercurrent to the flow of fiber slurry is used. A U-tube as described above and shown in FIG. 4a can be used. Preferably, however, a modified version of a U-tube, as shown in FIG. 4b, is used for advantageous control of water flow.

Figure 4B:
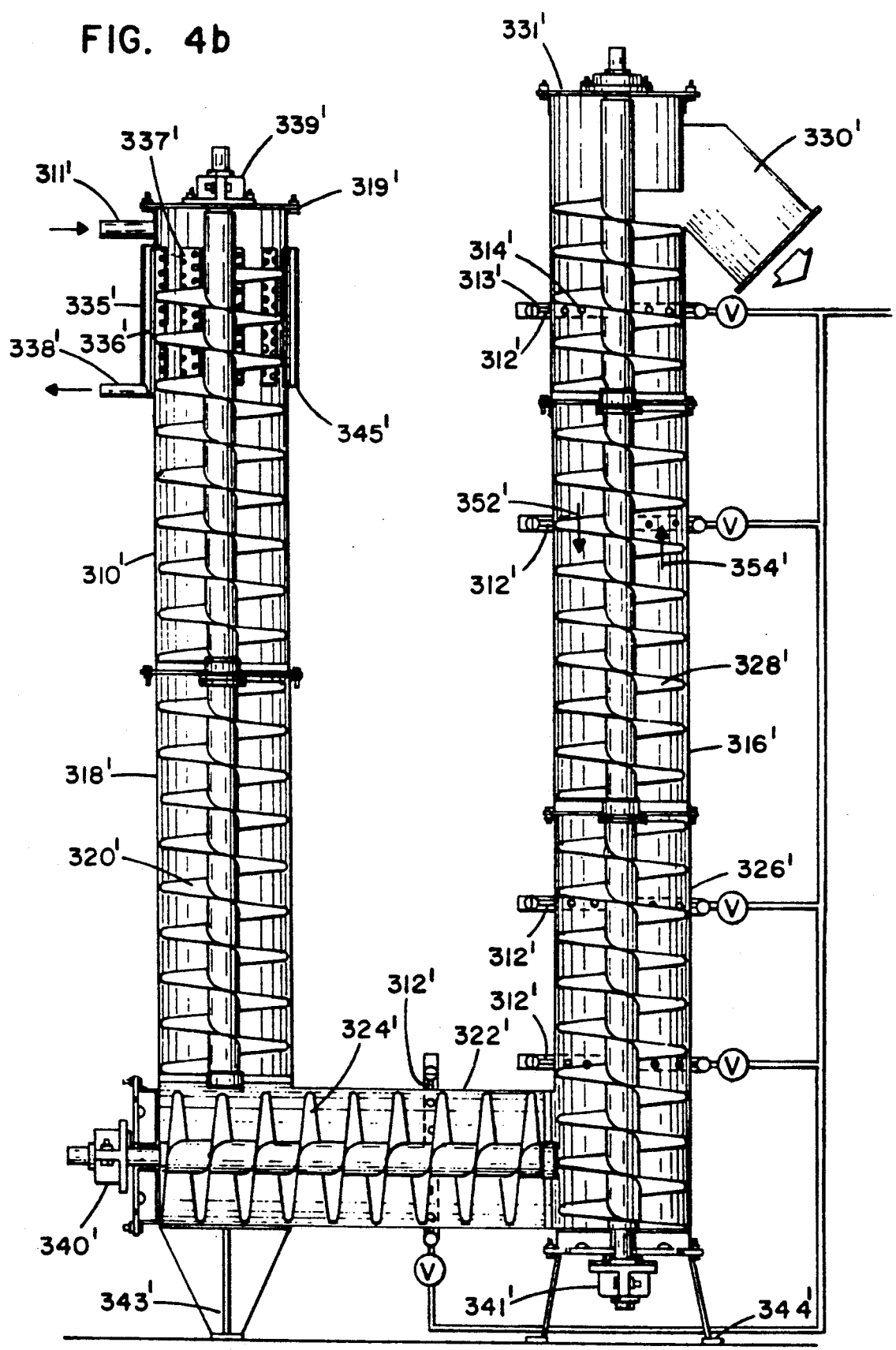
FIG. 4b is a schematic representation of a U-shaped washer with multiple water inlets optionally usable in certain selected processes according to the present invention.

Referring to FIG. 4b, the washing arrangement 310, comprises a U-shaped outer shell 316' with: a short vertical arm 318' having the fiber slurry inlet port 311' positioned near an upper end portion 319', wherein a first screw conveyor 320' directs the fiber material downward; a lower horizontal member 322', wherein a second screw conveyor 324' directs the fiber material horizontally from the short vertical arm 318' to a long vertical arm 326'; and, the long vertical arm 326', wherein the fiber material is directed in an upward direction by a third screw conveyor 328' to a fiber slurry exit port 330' near an upper end portion 331'. The long vertical arm 326', and optionally also the lower horizontal member 322', contains a plurality of water inlet arrangements 312'. Depending on the operating conditions, any of these water inlet arrangements 312', or a multiplicity of them, can be used to advantage.

The choice of water inlet arrangement 312' for a countercurrent flow of water depends, at least in part, on the flow rate of the fiber material. Under certain conditions, if the uppermost inlet 312' is used as the inlet for wash water, the water flows out the fiber slurry exit port 330', rather than down the long vertical arm 326', through the lower horizontal member 322', up the short vertical arm 326', and out the water exit port 338'. Therefore, one of the lower inlet arrangements 312' can be chosen such that the water flows in a countercurrent direction to at least a portion of the fiber material. There is no requirement, however, for effective washing of the fiber material that all of the material contact wash water in a countercurrent flow pattern.

The remainder of the washing arrangement 310' can be understood by referring to the discussion of FIG. 4a above, with each of the reference numbers being replaced by the same number with a prime (') associated therewith. In comparing the U-tube in FIG. 4a with that in FIG. 4b, the washing arrangement 310' comprises a U-shaped outer shell 316' with a short vertical arm 318' having the fiber slurry inlet port 311' positioned near an upper end portion 319'. However, for more efficient flow dynamics in certain situations, it is advantageous to place the fiber slurry inlet port 311' above the water outlet arrangement 335', as is shown in FIG. 4b.

Except for the location of the water and fiber inlet ports used during operation, the washer arrangement 310' functions in much the same way as the countercurrent washer arrangement 310 shown in FIG. 4a. The temperature of the water (preferably fresh city water) as it enters the washer 310' is within the range of about 20° C. to 65° C. The wash water is added at a rate such that the fiber material exiting the washer arrangement is effectively treated to reduce, i.e., decrease the concentration of, the off-odor and off-flavor and produce an acceptable product. Preferably, it is added at a rate of about 1 to 6 gallons per pound (8 to 50 liters per kilogram) based on a calculation of dry substance fiber entering the system, or 70 to 420 gallons per minute, to provide a substantially continuous wash. The fiber slurry is preferably directed through the system at any acceptable flow rate for efficient and effective heating, for example about 4200 pounds per hour (dry weight) (1900 kg/hr). Due to heat exchange with the washer arrangement 310', the exit temperature of the water is typically at or near about 70° C. to 110° C., usually about 74° C. to 93° C., and the exit temperature of the fiber is typically within the range of about 55° C. to 65° C., which is preferred for the follow-up step of mechanical pressing. The fiber exits at approximately a 92% to 98% moisture content, by weight. If an enzyme, such as catalaze, is used it is added in an amount such that there is an excess of the enzyme relative to the typical amount of $H_2O_2$ remaining in the fiber after washing.

II. Sugarbeet Fiber Material

A. Fiber Components

The product (dried) of the present invention is a unique dietary fiber material containing at least about 75%, typically at least about 80% total dietary fiber, and preferably at least about 82% total dietary fiber, based upon the total dry weight of the fiber material. As stated previously, total dietary fiber may be defined as plant material that is resistent to digestion, e.g., hydrolysis, by human gastrointestinal secretions and enzymes in the digestive system. This would generally include components of plant tissue cell walls, intracellular cement, and seeds. These components typically are cellulose, hemicelluloses, lignin, lignin-containing material, pectic substances, gums, as well as various other complex carbohydrates, i.e., polysaccharides. The dietary fiber material of the present invention contains certain of these components. Typically, the dietary fiber of the present invention (when from sugarbeets) contains about 28% to 32% hemicelluloses; about 24% to 26% pectin; about 20% to 24% cellulose; about 4% to 5% lignin; about 8% to 11% protein; about 0.1% to 0.3% fat; and, moisture, residual sugar, and mineral substances. The fiber components, as stated above may be classified as either soluble or insoluble.

The soluble fiber content of the preferred dietary fiber material of the present invention is at least about 10%, based upon the total dietary fiber. If the soluble fiber component is reported as a percentage of the total dry weight of the fiber material, then the fiber material of the present invention contains at least about 8% soluble fiber. Preferably the soluble fiber portion is within the range of about 10% to 25% (i.e., 8% to 23% if based on the total dry weight of the material), and most preferably it is within the range of about 10% to 20%. It is noted that a soluble fiber content of greater than about 25% may cause functional and processing problems in handling food compositions made from the product. That is, if the soluble fiber content of the dietary fiber material is too large, i.e., greater than about 25% based upon the weight of the total dietary fiber content, the incorporation of substantial amounts of this material into, and processing of, the food product may become difficult due to an increased viscosity of the product as a result of the gelling properties of the soluble fiber. The unique dietary fiber material of the present invention also preferably contains less than about 1% fat and less than about 1 calorie per gram, preferably less than about 0.6 calories per gram. Herein, again, the percentages referred to are weight percentages unless otherwise noted. Again, the total dietary fiber is based upon the total weight of the material, and the soluble fiber content is reported as a percentage of the total dietary fiber.

A preferred dietary fiber material of the present invention, as described or characterized by the above-listed attributes, is a non-soy fiber. That is, the preferred dietary fiber material of the present invention does generally not include soy fiber, i.e., the fiber material derived from the internal portion or cotyledons of the soybean. However, in some applications to form food products, dietary fiber according to the present invention may be mixed with soy fiber or other fibers. Preferably, the dietary fiber material of the present invention with the above-listed attributes is derived from sugarbeets. It is produced from the insoluble portion of the root of the sugarbeet from which about 98 to 99 wt % of the soluble material has been removed. It is the dried vegetable fiber remaining after substantially all the sugar has been extracted from sugarbeets, with residual amounts of only about 1% to 2% remaining, on a wet weight basis.

A dietary fiber material (for human consumption) with at least about 75% and preferably at least about 80% total dietary fiber, at least about 10% soluble fiber, and less than one calorie per gram has certain benefits and advantages over other dietary fiber materials commonly consumed, such as wheat bran, oat bran, and corn bran. This is based on the fact that, at least in part, the dietary fiber materials typically consumed do not generally have such an advantageous ratio of soluble to insoluble fiber in addition to a relatively low fat and caloric content.

Typically, a dietary fiber material with greater than about 75% total dietary fiber is advantageous and provides benefit because the amount that is needed to incorporate into a food product for good "fiber load" is reduced. Therefore, the more total dietary fiber, the less material required for incorporation to produce an advantageous food product. Thus, a dietary fiber material with at least about 82% total dietary fiber provides additional advantage. The higher the total dietary fiber content, the more valuable is the material because of a greater overall utility. Generally, however, the dietary fiber material of the present invention will not have more than about an 85% total dietary fiber content, unless the chemical composition of the material were changed by removing protein, fat, etc. The process of the present invention does not generally chemically modify the material in such a manner.

Because of its acceptable odor and taste, relatively high total dietary fiber content, relatively high soluble fiber content, and relatively low fat and caloric content, the preferred fiber material of the present invention potentially offers good dietary and physiological benefits to consumers. Furthermore, in part because of this advantageous composition, the product of the present invention generally offers manufacturing and functional advantages to food processors.

There is medical evidence that suggests that foods containing dietary fiber provide physiological benefit with respect to numerous human diseases and disorders. As discussed above in the Background Section, persons whose diets are high in fiber-containing foods generally have a lower occurrence of intestinal disorders, cardiovascular diseases, and certain cancers. Furthermore, these health effects and benefits appear to be dependent upon the type of fiber, i.e., soluble or insoluble. Therefore, at least because soluble and insoluble fibers provide different physiological functions, a dietary fiber material with a high total dietary fiber composition and with a combination of both soluble and insoluble fiber components is advantageous.

Furthermore, because soluble and insoluble fiber components have different handling characteristics, it is advantageous to have a dietary fiber material with a combination of the two fiber types, i.e., soluble and insoluble. For example, a material with a high concentration of soluble fiber components, and very little insoluble components, tends to present functional problems in the incorporation of the material into food products. As stated previously, this is generally because the physical properties of the material, such as viscosity, present processing difficulties. That is, materials that are high in soluble fiber typically do not generally flow well through extruders, and do not typically enhance the expansion properties of grains well. Thus, dietary fiber materials that are very high in soluble fiber components may have functional properties that are less than adequate, and limit the amount of the fiber material that can be incorporated into a food product. For example, food additives such as gums, which are mostly soluble fiber, are limited to about a 10% incorporation level. A dietary fiber material high in insoluble fiber does not typically have such limitations with respect to processing and functional characteristics and the amount incorporated.

The dietary fiber product of the present invention, i.e., sugarbeet fiber, generally has excellent functional properties, in part because of the advantageous ratio of the types of fiber components. It has excellent moisture retention, good texture and mouth feel, and can be produced in a variety of particle sizes for easy blending with other ingredients. It generally enhances the expansion properties of grains in cereals, whereas many other fiber materials generally reduce the expansion properties of grains at comparable use levels. It can act with other grains to enhance their properties. In comparison to other fiber materials at comparable use levels, the product of the present invention has good flow properties, as evidenced by use in extruders. Furthermore, it is generally compatible with most other fiber, flour and/or bran materials upon incorporation into food products.

The preferred fiber material of the present invention, i.e., sugarbeet fiber, may replace other fiber materials commonly used in foods, especially human-consumable foods, like cereal or snack products, to advantage. See Example IV herein below. For example, in certain wheat snack products in which the product of the present invention replaces wheat bran (wherein the product contains the dietary fiber at a level of up to about 28%), the resultant food product is crisper, expanded more, lower in caloric content, higher in fiber content, and possesses fewer fine particles. In a cereal product, a combination of corn, wheat, and oat flour is reduced and replaced with a proportionate amount of a dietary fiber material of the present invention at a level of about 10% in the final product. This finished product results in one that does not display a reduced density or any apparent change in the product attributes. In the same type of product containing the fiber of the present invention, in an amount of about 15%, by weight (with a slight increase in starch content and decrease in process water used), the product has good taste, and excellent color that is generally lighter than the control.

In an oat bran cereal product, the partial removal of oat bran and replacement by the dietary fiber of the present results in positive effects observed with respect to ease of processing, expansion, texture, color, and taste. Furthermore, the dietary fiber of the present invention is compatible with many other fiber sources. For example, when in combination with oat bran, the product of the present invention does not distract from the finished product attributes with respect to color, taste, and bowl life.

The preferred dietary fiber material of the present invention provides advantage because it is relatively high in total dietary fiber, relatively high in soluble fiber, but not so high as to adversely effect the handling and processing characteristics of food products, and relatively low in fat and caloric content. When prepared from sugarbeet fiber, the dietary fiber material is advantageously obtained, because a by-product of the sugar industry, which formerly had little value, is utilized.

Sugarbeet fiber (in general) has been shown to have excellent functional characteristics as described above. Furthermore, sugarbeet fiber has been shown to have advantageous health benefits. When added to a moderate serum cholesterol-lowering diet, it has been shown to reduce LDL-cholesterol (low density lipoproteins, i.e., "the bad cholesterol") while the HDL-cholesterol (high density lipoproteins, i.e., "the good cholesterol") remains unchanged, and in some instances has been shown to increase slightly. This is advantageous when compared to the effects many other dietary fiber materials have on serum cholesterol levels. It is believed that it is not only the amount of soluble fiber that is important in the lowering of serum cholesterol, but also the type of soluble fiber is important. The soluble portion of sugarbeet fiber is composed primarily of pectin. This is not to say, however, that other soluble fiber components may not benefit cholesterol levels.

B. Chemical Composition

Sugarbeet fiber (conventionally processed), although having advantageous nutritional and functional characteristics, contains chemical compounds that provide an undesirable smell and taste, which can be generally categorized, for example, as musty/earthy and/or rancid/rotten. That is, the flavor and aroma of sugarbeet fiber can be described as exhibiting a pronounced earthy/musty aroma and flavor modified by the presence of a distinct rancid, e.g., oxidized lipid, aroma and flavor.

As stated previously, components contributing to the rancid/rotten odor and taste are believed to be the oxidation products of lipids, specifically the oxidation products of the lipids linoleic acid (9,12-octadecadienoic acid) and linolenic acid (9,12,15-octadecatrienoic acid). The aroma and flavor of these constituents may be described as exhibiting a "green", "grassy", "painty", or "grainy" character, similar to rancid fats.

The unsaturated fatty acids referred to above are generally known to be oxidized by either enzymatic or nonenzymatic means during storage and processing. Enzymatic oxidation is believed generally to be a result of the action of the enzyme lipoxygenase, which has a specificity for oxidation at the C-9 and C-13 positions of the carbon chain. Generally, both linoleic acid and linolenic acid are known to be catalyzed by lipoxygenase under certain aerobic conditions to hydroperoxide compounds. It is believed that the rancid off-flavors may be generally due to the decomposition products of the hydroperoxide compounds. These hydroperoxide compounds may decompose by any of several pathways, as for example: (1) reduction by lipoperoxidase or oxidoreductase; (2) isomerization by linoleic acid-hydroperoxide isomerase; (3) lipoxygenase-catalyzed reactions under anaerobic conditions; and, (4) nonenzymatic or auto-oxidation to volatile aldehydes. Nonenzymatic or auto-oxidation decomposition pathways of lipid hydroperoxide compounds during food storage are believed to be more significant than enzymatic pathways. Catalysts and/or conditions that promote such decompositions typically include heat, light, and metal ions and/or their complexes.

Although there is little information available concerning the formation of volatile compounds from pure lipid hydroperoxide compounds, there is extensive information available concerning the production of volatile components by the auto-oxidation of triglycerides and other fatty acids. These auto-oxidation products are believed to include the volatile aldehydes: 2-pentenal; hexanal; 2-hexenal; 2-heptenal; 2-octenal; nonanal; 2,4-nonadienal; 2,4-decadienal; and, 2,4-heptadienal. At least some of these same materials (regardless of their source) are partially responsible for the off-flavor and off-odor of sugarbeet fiber.

As stated previously, there are several compounds that contribute to the earthy/musty odor and taste of sugarbeet fiber. One of these components is 2-methoxy-3-sec-butylpyrazine. This latter compound exhibits an intense green-earthy flavor and aroma. It is these earthy components that are thought to be the ones that are typically very offensive to consumers.

Sugarbeet fiber may also have a perceived unpleasant, sour-like aroma and flavor. This is believed to be largely due to the presence of 3-methylbutanoic acid (isovaleric acid). Isovaleric acid exhibits a sweaty, sour-type aroma and flavor, which has been described as smelling like "sweat-socks".

Not all of these compounds are known to be naturally occurring in sugarbeets; however, some of these compounds are generally present in root crops, such as the vegetables carrots, potatoes, and other types of beets. The most likely sources of these compounds are microbes, molds, and bacteria, such as Streptomyces and Pseudomonas, found in the soil. Furthermore, the processing of the sugarbeets may produce some of these compounds. For example, isovolaric acid apparently occurs as a by-product of the sugar extraction process.

Many of these compounds also have inherently very low odor thresholds of detection, typically less than about 0.1 ppb (part per billion). The odor character of a chemical compound may also depend on its concentration. For example, the aldehydes heptanal and hexanal exhibit very powerful pungent green-like odors, but at low levels exhibit more warm, nutty, fruity, or mild grassy odors. The very low odor thresholds and/or the fact that many of the compounds that contribute to the off-odor/flavor have a relatively high degree of hydrophobicity have, in the past, made the reduction of the off-odor/flavor particularly difficult.

The improved vegetable fiber materials according to the present invention are substantially free of any organic solvent, such as for example, an alcoholic solvent, that is not known to be naturally occurring therein. This is because the process of the present invention does not utilize organic solvents, like methanol, ethanol, isopropanol, t-butyl alcohol, ethylene glycol, monomethyl ether, 2-methylethyl ether, or hexane. By "substantially free" it is meant that there is less than about 10 parts per million (ppm) by weight of an organic solvent in the dry fiber material (i.e., having a moisture content of less than about 7%). Preferably, there is less than about 1.0 ppm residual organic solvent, and more organic solvent in the vegetable fiber of the invention. This is preferred and advantageous because of the hazards and expense associated with using organic solvents, such as alcohol, in such a process, especially at elevated temperatures and on a commercially acceptable level. Furthermore, the product of the invention is free from any organic solvents, which results in a more desirable product for human consumption.

C. Gas Chromatographic Analysis

Figure 5:
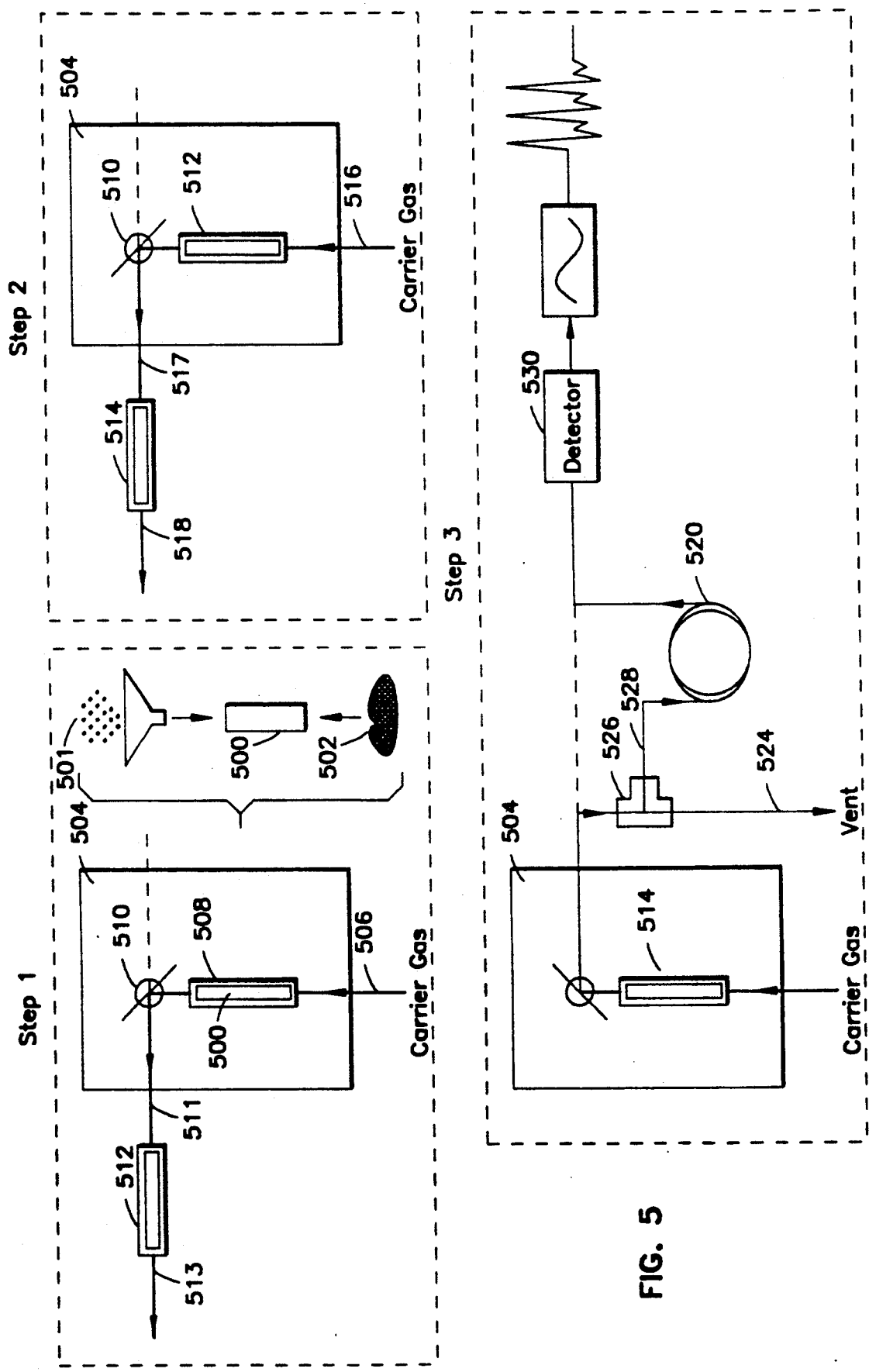
FIG. 5 is a schematic of a thermal desorption and gas chromatograph arrangement usable in analysis of the volatile components of the product of the present invention (described in Example I).

The volatile components of sugarbeet fiber can be evaluated and identified using gas chromatographic analysis. A system and method may be used to obtain the gas chromatogram of the volatile components whereby the volatiles are first purged and collected from a sample of dry fiber. Referring to the schematic diagram in FIG. 5, in the first step of the process a glass tube 500, preferably made of pyrex, is filled with dry fiber 501 and plugged at both ends with glass wool 502. The tube is then inserted into a thermal tube desorber instrument 504 whereby the gases are thermally desorbed and purged from the fiber using a stream of a dry carrier gas, such as helium, directed along the direction of arrow 506, while the fiber is heated using a heater jacket 508. The purged volatiles and carrier gas are then directed by way of a valve arrangement 510 along the direction of arrow 511 to a primary adsorbent tube 512, which is a glass tube packed with adsorbent material. The adsorbent material adsorbs at least a portion of the volatiles and allows the carrier gas to pass through, which is represented by arrow 513. The adsorbent material is any finely divided solid material that would adsorb the volatile gases, such as silica gel, carbon molecular sieve, and the like. The adsorbent material is generally preheated to remove any water from the adsorbent so as to enhance adsorption.

In a second step of the method, volatiles from this primary adsorption tube 512 are then preferably thermally desorbed using the thermal tube desorber 504 that was used in the first step to desorb the volatiles from the dry fiber. A secondary adsorption tube 514 packed with adsorbent material is used to collect at least a portion of the volatiles directed there by valve arrangement 510 using a flow of a dry carrier gas directed along the direction of arrows 516, 517, and 518. The volatile transfer or focusing operation serves to remove residual water and increases desorption efficiency of the sample to permit a more rapid sample delivery of the volatile gases to the gas chromatography column. Due to this more rapid delivery, use of this secondary tube has been shown to eliminate the necessity of cryogenic focusing of the sample. Cryogenic focusing is a process that uses either liquid carbon dioxide or liquid nitrogen to freeze a portion of a chromatography column so as to collect and concentrate the volatiles purged from the trapping supports into a very narrow band.

In a third step of the method, the volatile components are then thermally desorbed, again using the thermal desorber 504, from the secondary desorber tube 514 using a flow of a dry carrier gas. The volatiles and carrier gas, preferably helium, are then directed to a chromatography column 520, which is preferably a capillary column. Part of the sample is also typically vented to the atmosphere along the direction of arrow 524 so as not to exceed the capacity of the capillary column. This is done using a variable splitter 526. The remainder of the sample is transferred to the capillary column preferably by a heated nickel transfer line 528. This transfer line generally prevents condensation or adsorption of the volatile components in the sample. The material was then dried to a moisture content of less than 7% and ground. The preferred detection system includes a flame ionization detector 530, the output of which is transferred to a recording system. For a more detailed discussion of this method see Experimental Example I, herein below.

Figure 6:
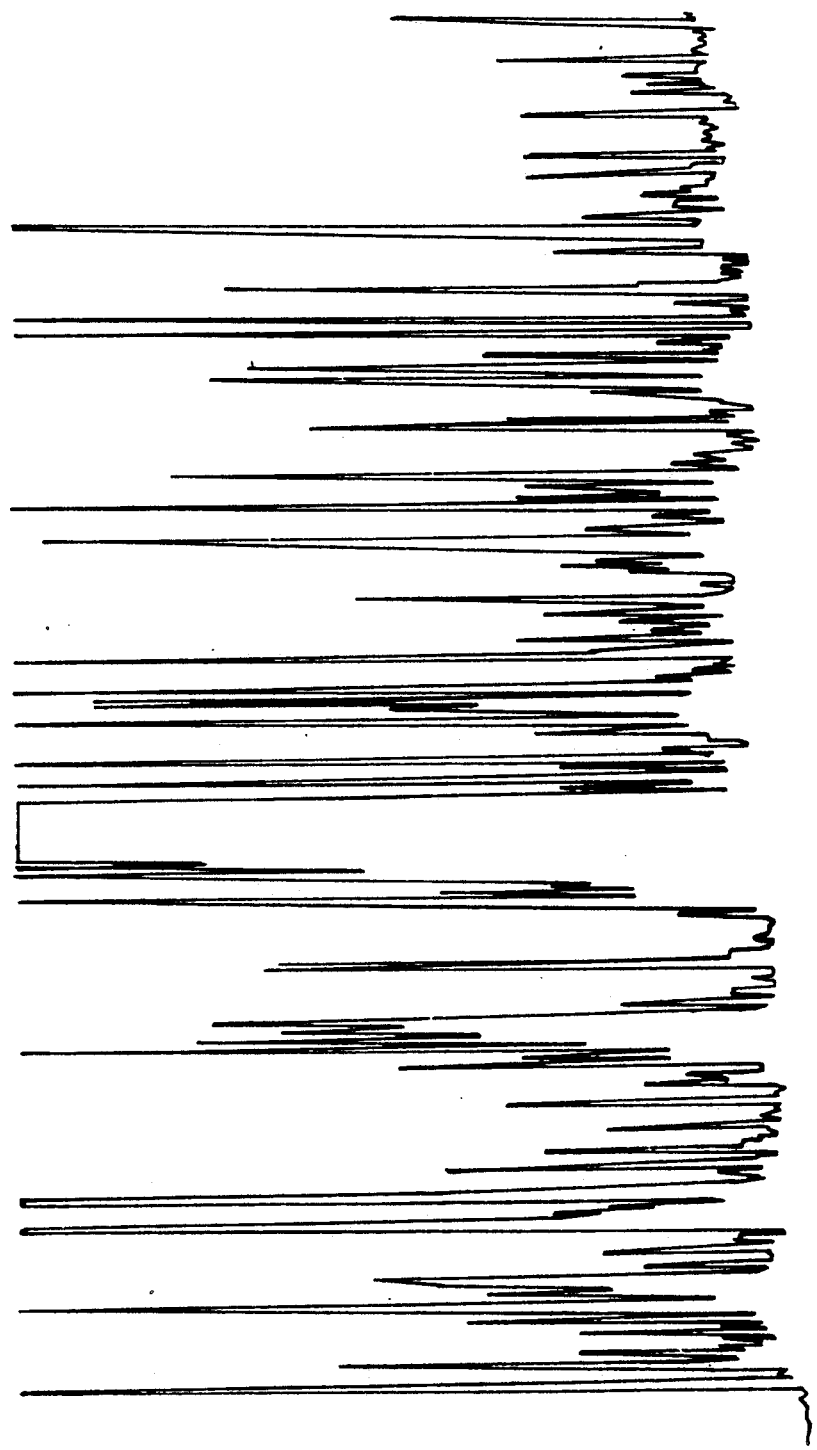
FIG. 6 is a Gas Chromatograph of the volatile components of sugarbeet fiber before a process of treatment according to the present invention.
Figure 7:
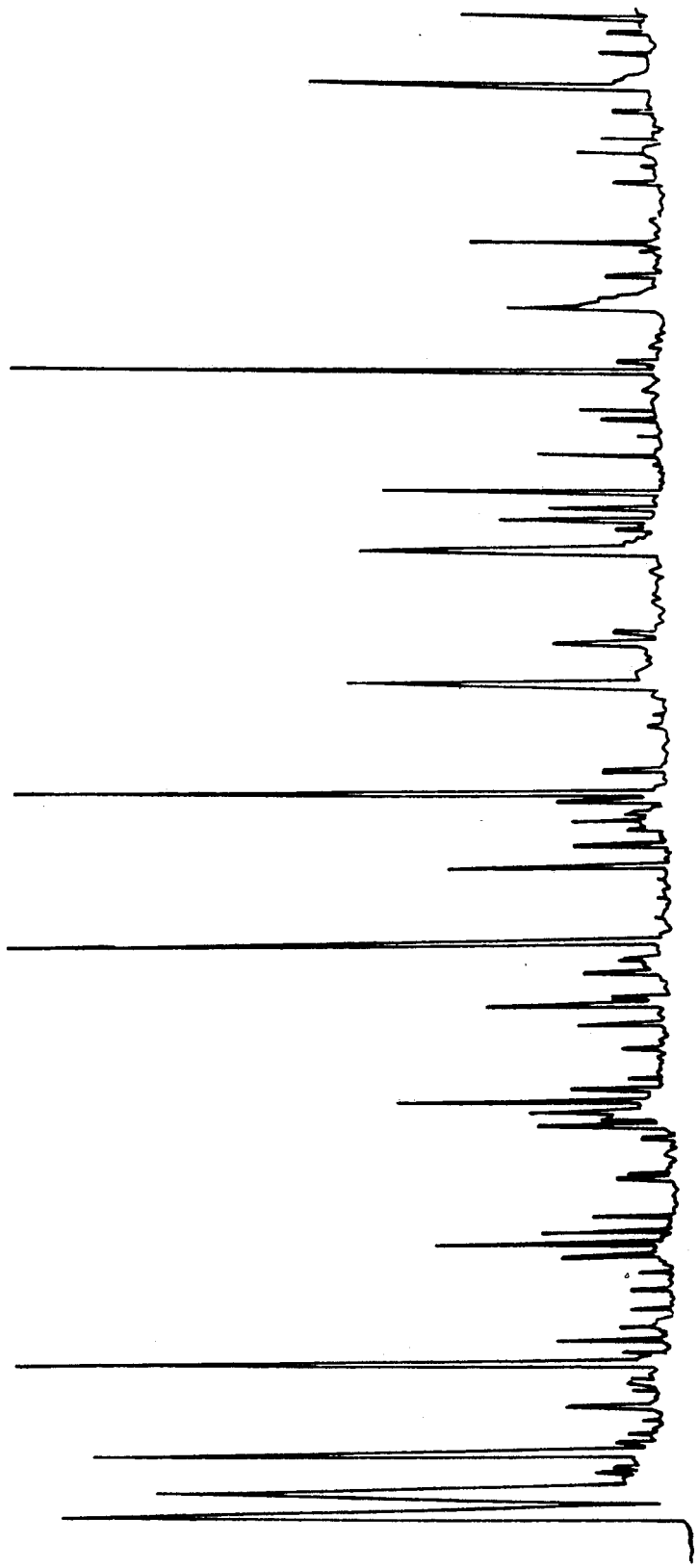
FIG. 7 is a Gas Chromatograph of the volatile components of the sugarbeet fiber after a process of treatment according to the present invention.

Representative chromatograms of: (1) a feed sugarbeet fiber material prior to processing according to the present invention; and, (2) the processed product fiber according to the present invention, are shown in FIGS. 6 and 7, respectively. The material in FIG. 6 was processed only through the initial cleaning stage of the overall process, i.e., the scrubbing/screening/pressing steps. The material was then dried to a moisture content of less than 7% and ground. The material in FIG. 7 was fresh sugarbeet fiber that was directed from the diffuser through the cleaning stage, to the rehydrator, and then processed through the preferred heat treatment and countercurrent washing stages of the operation. The primary treatment parameters were as follows: 94% moisture in the slurry upon rehydration; the slurry temperature was about 100° C.; and the holding time was about 5 minutes. At least some of these flavor/odor components have been identified by mass spectroscopic analysis, wherein the components can be identified based upon their masses and characteristic fragmentation products. Alternatively, or additionally, the components can be identified by comparison of their gas chromatographic retention times to that of known substances. Although FIGS. 6 and 7 are not precisely to scale and the labeling of the peaks is only approximate, a meaningful comparison can be made, especially upon review of the data in Table 2.

Numerous compounds have been identified as volatiles in sugarbeet fiber (see Table 2). Among the compounds found and identifiable as contributors to the sugarbeet off-odor and off-flavor are: trans,trans-2,4-decadienal; 2-methoxy-3-sec-butylpyrazine;2,3-butanediol;cis-3-hexenol;pentanal; hexanal; trans-2-hexenal; heptanal; trans-2-heptenal; trans,cis-2,6-nonadienal; trans-2-nonenal; trans-2-decenal; trans,trans-2,4-heptadienal; trans-2-octenal; 3-methylbutanol; and, 3-octen-2-one.

In general, the fiber material will have improved flavor and aroma characteristics if the concentrations of each of trans,trans-2,4-decadienal and 2-methoxy-3-sec-butylpyrazine are reduced by at least about 40%, and preferably by at least about 75%, relative to concentrations that would be present if the material was merely processed by conventional methods involving washing but not heat treatment as described. The methods described herein may have been applied to reduce the concentration of trans,trans-2,4-decadienal by as much as about 82% and that of 2-methoxy-3-sec-butylpyrazine by as much as about 88%. These two compounds are particularly unacceptable because they impart a musty and/or rancid flavor and/or aroma to the fiber material.

Further improvement in flavor and odor will result if, in addition to the above-recited reductions in the concentrations of trans,trans-2,4-decadienal and 2-methoxy-3-sec-butylpyrazine, there is a reduction in the concentrations of: cis-3-hexenol; trans-2-heptenal; trans,cis-2,6-nonadienal; trans-2-nonenal; and trans,trans-2,4-heptadienal each by at least about 30%. Preferably the cis-3-hexenol is reduced by at least about 50% (the process described has achieved up to about 56%); trans-2-heptenal is reduced by at least about 75% (up to about 79% has been achieved by processes described herein); trans,cis-2,6-nonadienal is reduced by at least about 85% (the described process has achieved up to about 90%); trans-2-nonenal is reduced by at least about 45% (the described process has achieved up to about 54%); and trans,trans-2,4-heptadienal is reduced by at least about 90% (the described process has achieved up to about 100%). These compounds generally impart a particularly strong and offensive "green" flavor and/or aroma to the fiber material.

Further improvement in flavor and odor will result if, in addition to the reductions in the concentrations of the above-recited compounds, there is a reduction in the concentrations of: 2,3-butanediol; pentanal; hexanal; and trans-2-hexenal each by at least about 30%. Preferably the 2,3-butanediol is reduced by at least about 90% (the process described has achieved up to about 98%); pentanal is reduced by at least about 75% (the process described has achieved up to about 82%); hexanal is reduced by at least about 65% (the process described has achieved up to about 74%); and trans-2-hexenal is reduced by at least about 55% (the described process has achieved up to about 63%). These compounds generally impart a less offensive, but still undesirable, "green" attribute to the fiber material.

More preferably, to prepare a preferred fiber material there is a reduction in the concentrations of all of the above compounds (at least by the lowest value recited) and a reduction in the concentrations of: heptanal; trans-2-decenal; and trans-2-octenal, by at least about 30%. More preferably the heptanal is reduced by at least about 35% (up to about 40% has been achieved by the methods described herein); trans-2-decenal is reduced by at least about 85% (the described process has achieved up to about 91%); and the trans-2-octenal is reduced by at least about 85% (the described process has achieved up to about 93%). These latter three compounds are less offensive than the previously mentioned constituents; however, improvement does occur if they are reduced.

Also, the process is preferably conducted such that sugarbeet fiber material with an improved flavor and odor is produced by additionally, similarly, reducing any 3-methylbutanol, isovaleric acid, hexanoic acid, 2-furfural, benzaldehyde, and hydroxymethyl furfural present by at least about 30%. Although these compounds are not apparently in a high enough concentration (or have a low enough odor threshold) to contribute significantly to the off-odor and off-flavor in typical sugarbeet fiber material, they are reduced by the present process. These compounds may be reduced by about 35% to 90%, depending upon the compound. The described process has been applied to reduce the concentration of: 3-methylbutanol by up to about 58%; isovaleric acid by up to about 74%; hexanoic acid by up to about 97%; 2-furfural by up to about 65%; benzaldehyde by up to about 73%; and, hydroxymethyl furfural by up to about 38%.

Another compound that is preferably reduced by processes of the present invention, to yield improved product, is 3-octen-2-one, which is preferably reduced by at least about 30%, more preferably by at least about 85%. The process has been applied to reduce the amount of this component up to about 92%.

Herein when it is said that flavor and/or odor are "improved" by a suggested reduction in the amount of a component relative to washed but not heat treated fiber material, it is not necessarily meant that the resulting product is fully acceptable for use in human foods. That is, while improvement will have occurred, acceptability for a particular human food or food process may require reduction in most, or all, of the components to the higher degrees stated.

The fiber material of the present invention does, however, have an improved flavor and odor. Improved material typically is achieved upon obtaining a concentration no more than about 234 ppb (parts per billion of dry fiber material, i.e., less than about 7% moisture content) of trans,trans-2,4-decadienal, and a concentration of no more than about 48 ppb of 2-methoxy-3-sec-butylpyrazine. Preferably, for improvement, the material is processed to a concentration of about 98 ppb or less of trans,trans-2,4-decadienal, and a concentration of less than about 20 ppb of 2-methoxy-3-sec-butylpyrazine.

Preferably, the material is processed to contain no more than about: 35 ppb of cis-3-hexenol; 98 ppb of trans-2-heptenal; 35 ppb of trans,cis-2,6-nonadienal; 98 ppb of trans-2-nonenal; and 434 ppb of trans,trans-2,4-heptadienal. With respect to these compounds, more preferably the material is processed to contain no more than about: 25 ppb of cis-3-hexenol; 35 ppb of trans-2-heptenal; 8 ppb of trans,cis-2,6-nonadienal; 77 ppb of trans-2-nonenal; and 62 ppb of trans,trans-2,4-heptadienal.

Preferably, the material is processed to contain no more than about: 945 ppb of 2,3-butanediol; 1169 ppb of pentanal; 3654 ppb of hexanal; and, 49 ppb of trans-2-hexenal. With respect to these compounds, more preferably the material is processed to contain no more than about: 135 ppb of 2,3-butanediol; 418 ppb of pentanal; and, 1827 ppb of hexanal.

Preferably, the material is processed to contain no more than about: 147 ppb of heptanal; 245 ppb of trans-2-octenal; and, 60 ppb of trans-2-decenal. With respect to these compounds, more preferably the material is processed to contain no more than about: 137 ppb of heptanal; 53 ppb of trans-2-octenal; and, 13 ppb of trans-2-decenal.

Another compound that is typically present in sugarbeet fiber is 3-octen-2-one. Preferably, processing is conducted until this material is present in a concentration of no more than about 210 ppb, and more preferably until it is present in a concentration of no more than about 45 ppb.

There are numerous other odor causing compounds that are present in sugarbeet fiber material. The concentrations of these compounds are either only slightly reduced, not observed to be reduced at all, or it is not clearly apparent that they are reduced, when processes described herein are applied. These include (retention index using SPB-1; odor threshold (T) if available; and, sensory descriptor, in parentheses): trans,trans-2,4-hexadienal (5.00; T 0.5; cucumber, astringent); octanal (6.02; T=0.7; sharp, fatty, fruity); nonanal (7.05; 1; strong, fatty, citrus-like); decanal (8.08; T=2; strong, orange-rose); trans,cis-2,4-dodecadienal (10.48; green, citrus-like); trans,trans-2,4-nonadienal (8.12; 0.07; green, cucumber); 3-keto-4-decenal (10.12; rancid, musty); trans,trans-2,4-dodecadienal (11.26; green, citrus-like); 2-pentyl furan (5.98; T=10; fruity); and geosmin (10.20; T=0.02; musty, earthy, soil-like). In spite of the presence of these compounds, materials processed by the preferred methods described herein yield fully acceptable products for human consumption. Threshold indices for the other and above-listed compounds are reported in Table 1. See Fazzalari, F. A. in "Compilation of Odor and Taste Threshold Values Data", *American Society for Testing and Materials*, DS 48A, 1978; and, Guandagni, D. G., Buttery, R. G., Harris, J., "Odor Intensities of Hop Oil Components", *Journal of Science Food Agriculture*, 1966, 17, 143–144.

D. Sensory Evaluation

As is well known, and as discussed above, identification of the components that contribute to sensory characteristics such as odor, can be used by correlating gas chromatographic profiles of volatile components purged from the sample of interest with the smell of a specific component of the material as it exits an olfactory sniffer port. As the retention time of the component is recorded, a trained individual identifies the smell. Once the components contributing to the odor are identified, they can be correlated to the taste by trained sensory panelists. However, even without knowing exactly which components contribute to the taste and odor of a material, certain methods are known and used to evaluate and rate the flavor and odor of products.

As discussed above, techniques are known that describe the sensory characteristics of a product in mathematical terms. One such technique is known as the Quantitative Descriptive Analysis (QDA). This technique has been used to statistically measure variability and to compare and/or contrast one product with another. QDA may be used to evaluate sugarbeet fiber before and after processing by preferred methods of the present invention.

Trained individuals, i.e., individuals who are highly perceptive to differences in the sugarbeet fiber and its characteristic odor and flavor ingredients and who are trained for evaluating the sugarbeet fiber both before and after processing, identify and quantify a variety of sensory properties. These sensory properties may include at least some of the following: dry overall aroma (DRYOA); dry earthy aroma (DRYEA); dry beet aroma (DRYBA); wet overall aroma (WETOA); wet earthy aroma (WETEA); wet beet aroma (WETBA); wet rancid aroma (WETRA); wet overall flavor (WETOF); wet earthy flavor (WETEF); wet beet flavor (WETBF); wet sour flavor (WTSRF); wet rancid flavor (WETRF); and, wet bitter flavor (WTBTF), which is also known as wet bitter after taste (WTBAT).

Certain products of the present invention are identified or characterized by a sensory profile preferably comprising a preferred level of wet earthy flavor and wet rancid flavor. More preferably, the products are also characterized by a wet flavor profile further defined by preferred levels of wet beet flavor, wet bitter flavor, and wet sour flavor. Also, the products may preferably be further characterized by preferred levels of wet overall flavor. Most preferably, the products are characterized by a profile defined by all of the above-listed wet flavor attributes, each of which have been quantified for acceptable limits through statistical analysis.

As to aroma attributes, preferably the products are characterized by a preferred level of wet earthy aroma and wet rancid aroma. Preferably they are also characterized by a preferred wet beet aroma. More preferably the products are characterized by all these wet aroma characteristics in addition to a preferred level of wet overall aroma. Most preferably, the product is characterized by acceptable levels of all of the wet aroma and flavor attributes described above.

The products of the present invention are also preferably characterized by a dry aroma profile defined by a preferred level of dry beet aroma and a preferred level of dry earthy aroma. More preferably, the products are characterized by a preferred level of dry overall aroma.

Figure 8:
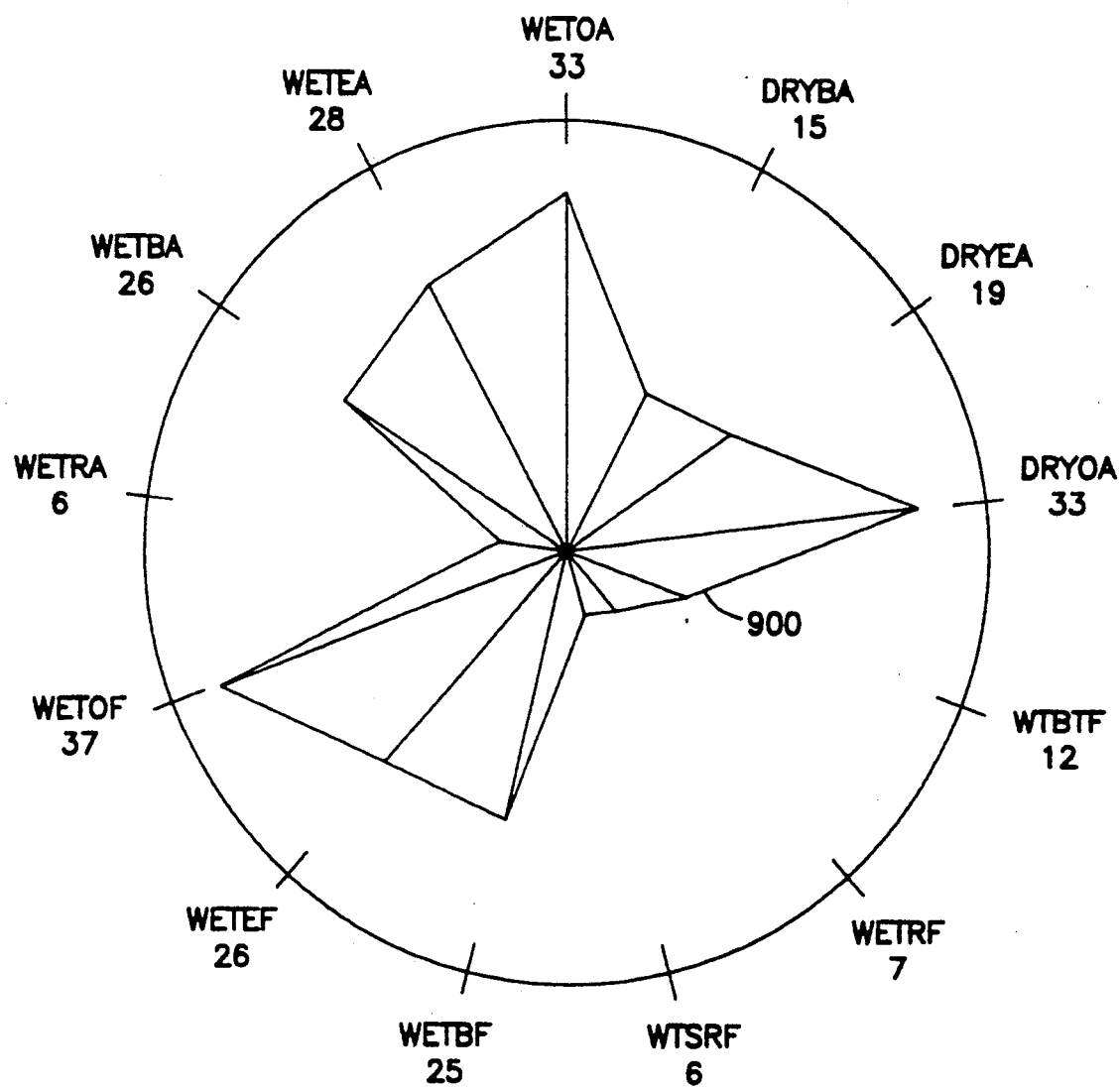
FIG. 8 is a spider web graph, or star chart, of the acceptable limits for 13 selected attributes set by a sensory panel evaluation for processed sugarbeet fiber (as described in Example II).
Figure 11:
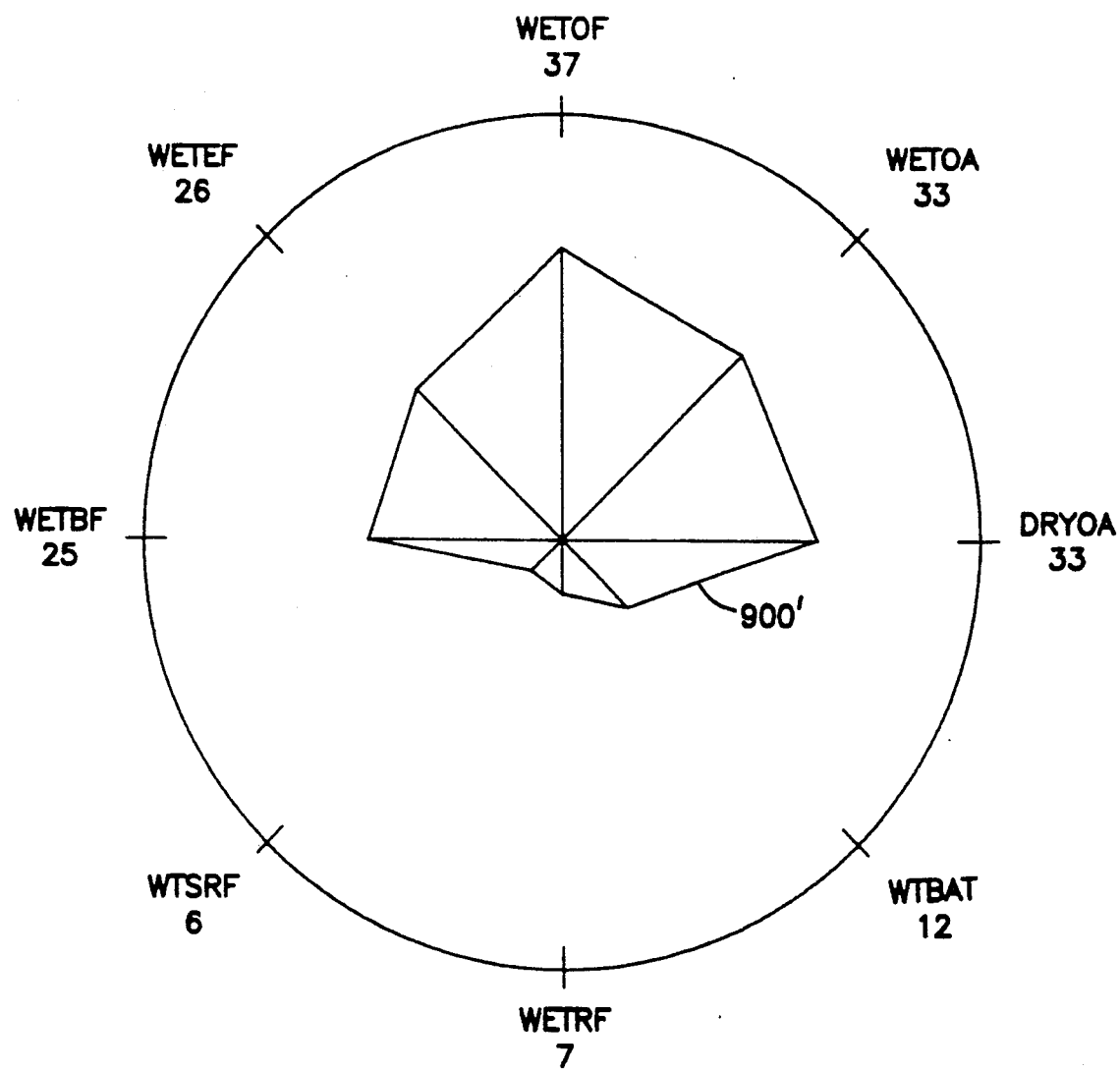
FIG. 11 is a spider web graph, or star chart, of the acceptable limits for 8 selected attributes set by a sensory panel evaluation for processed sugarbeet fiber.
Figure 12:
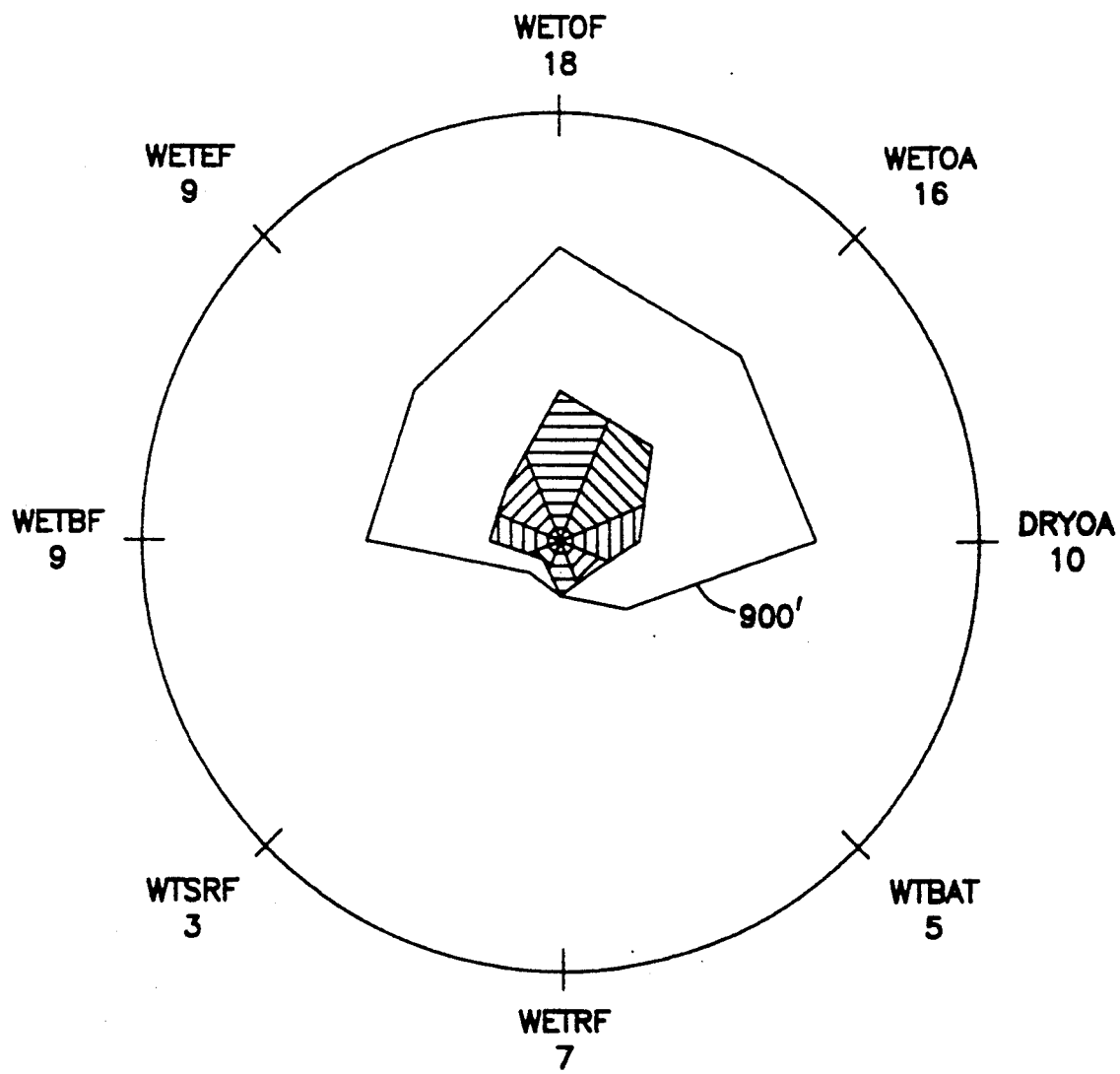
FIGS. 12-19 are spider web graphs, or star charts, of a sensory panel evaluation of various samples of sugarbeet fiber prepared according to variations of a commercial-scale process according to the present invention.
Figure 13:
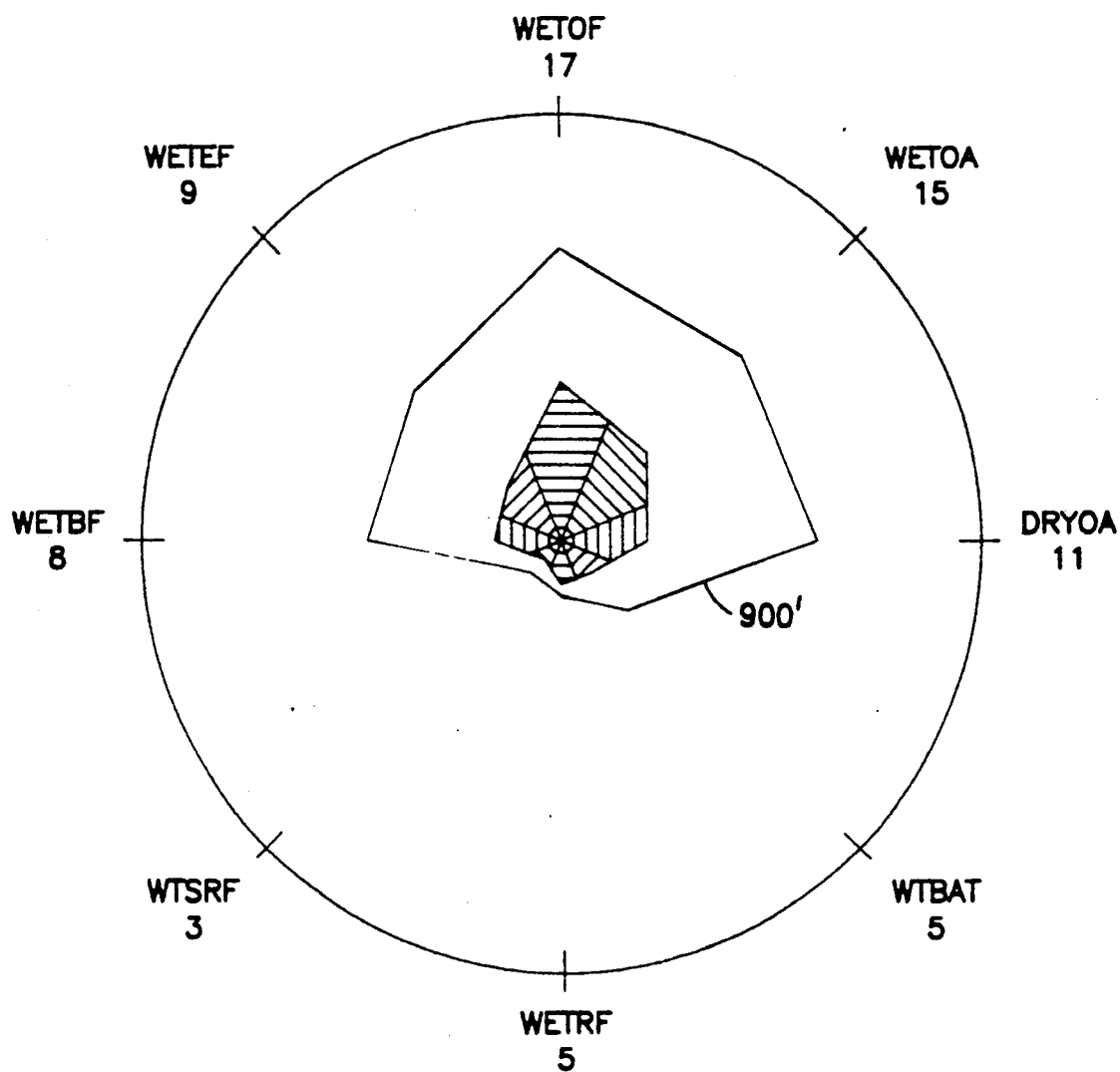
Figure 14:
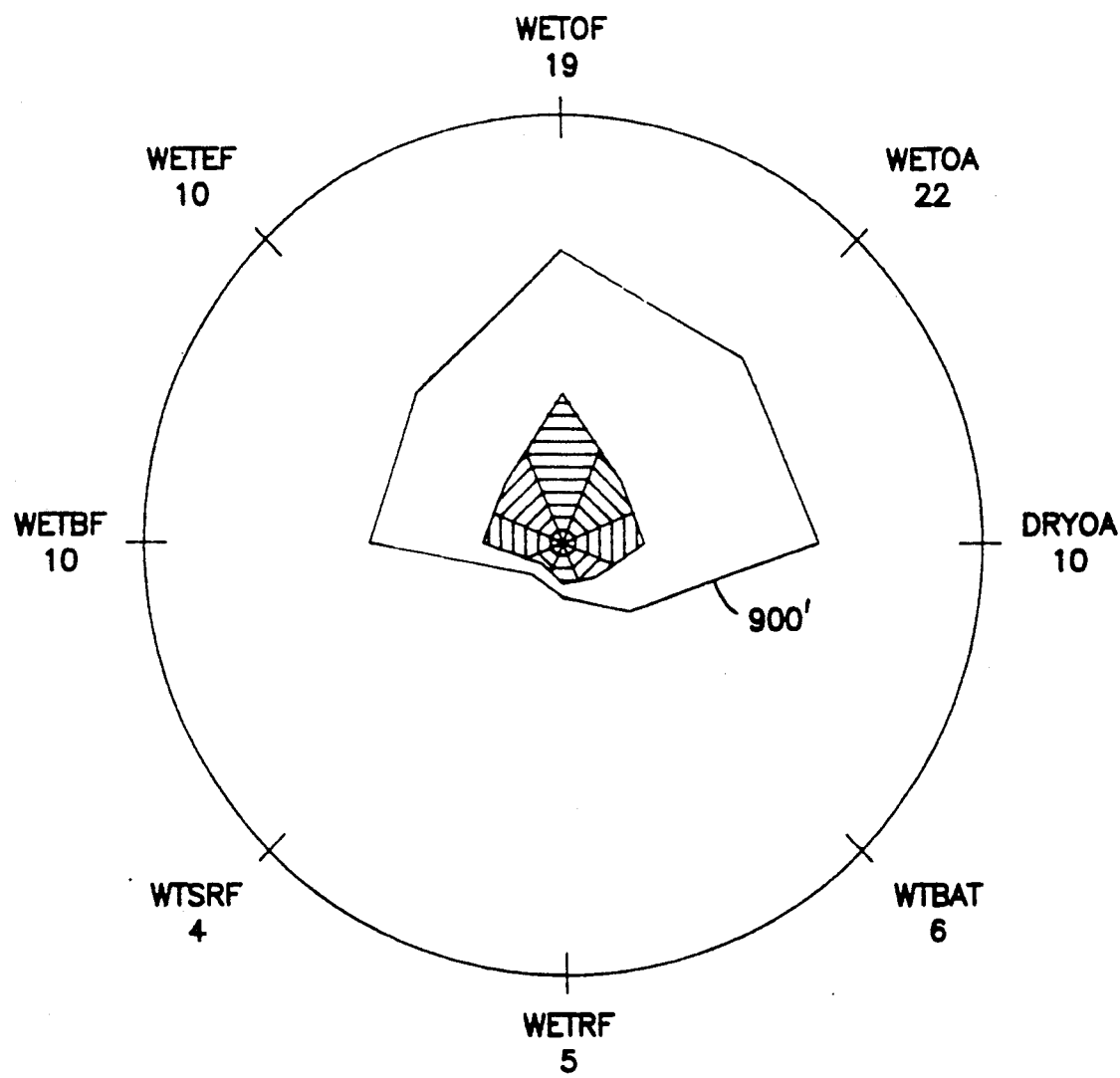
Figure 15:
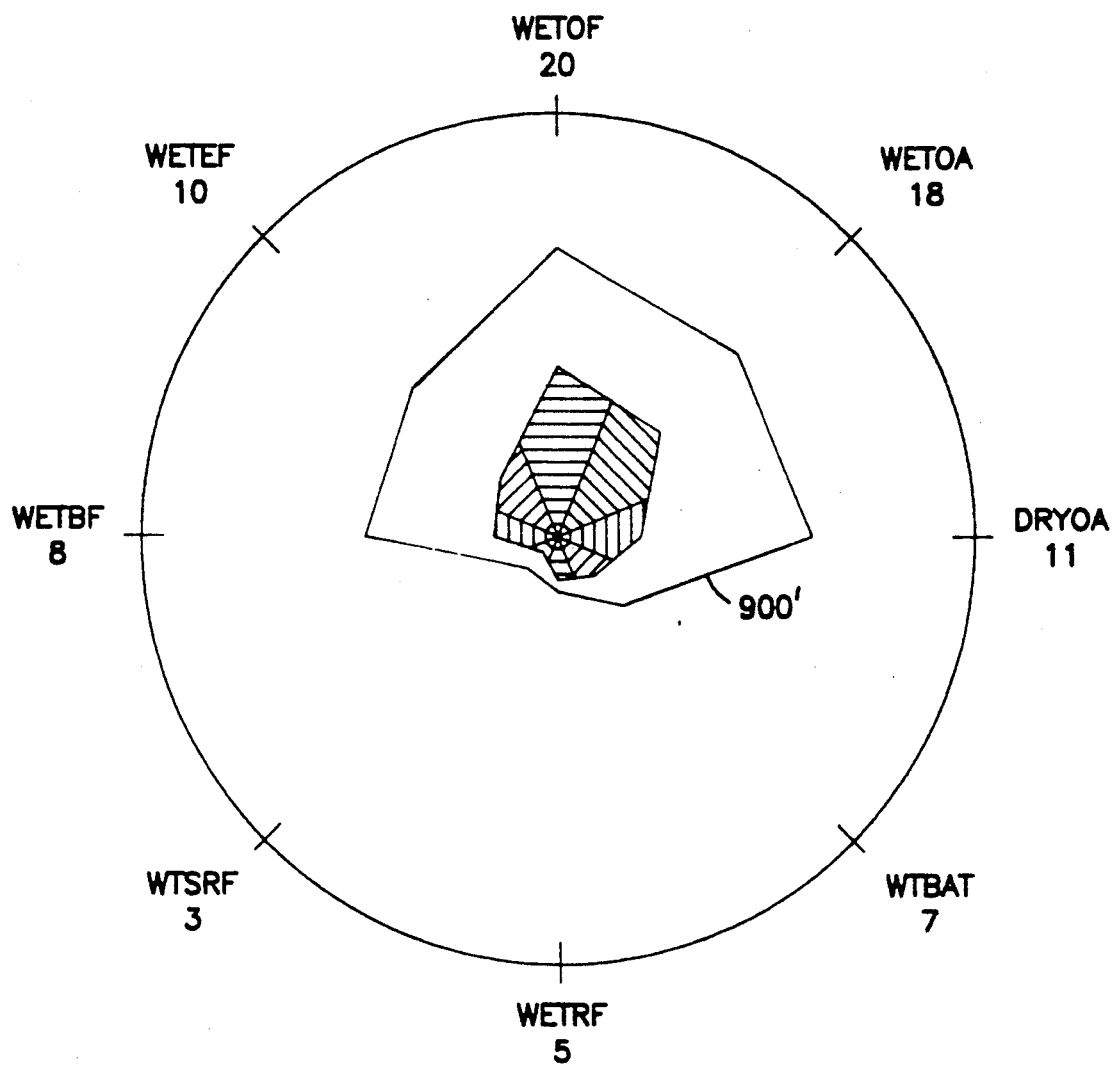
Figure 16:
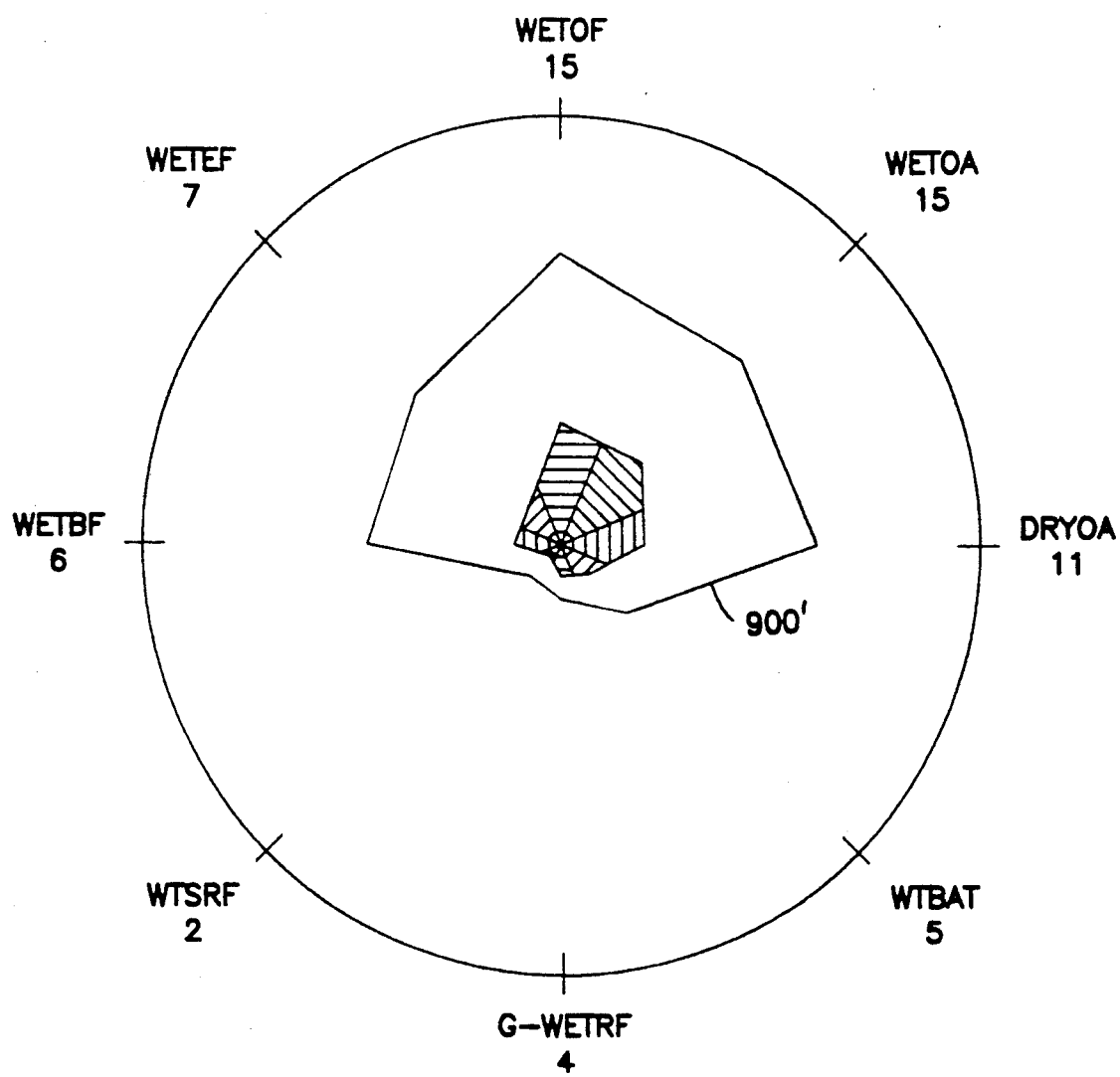
Figure 17:
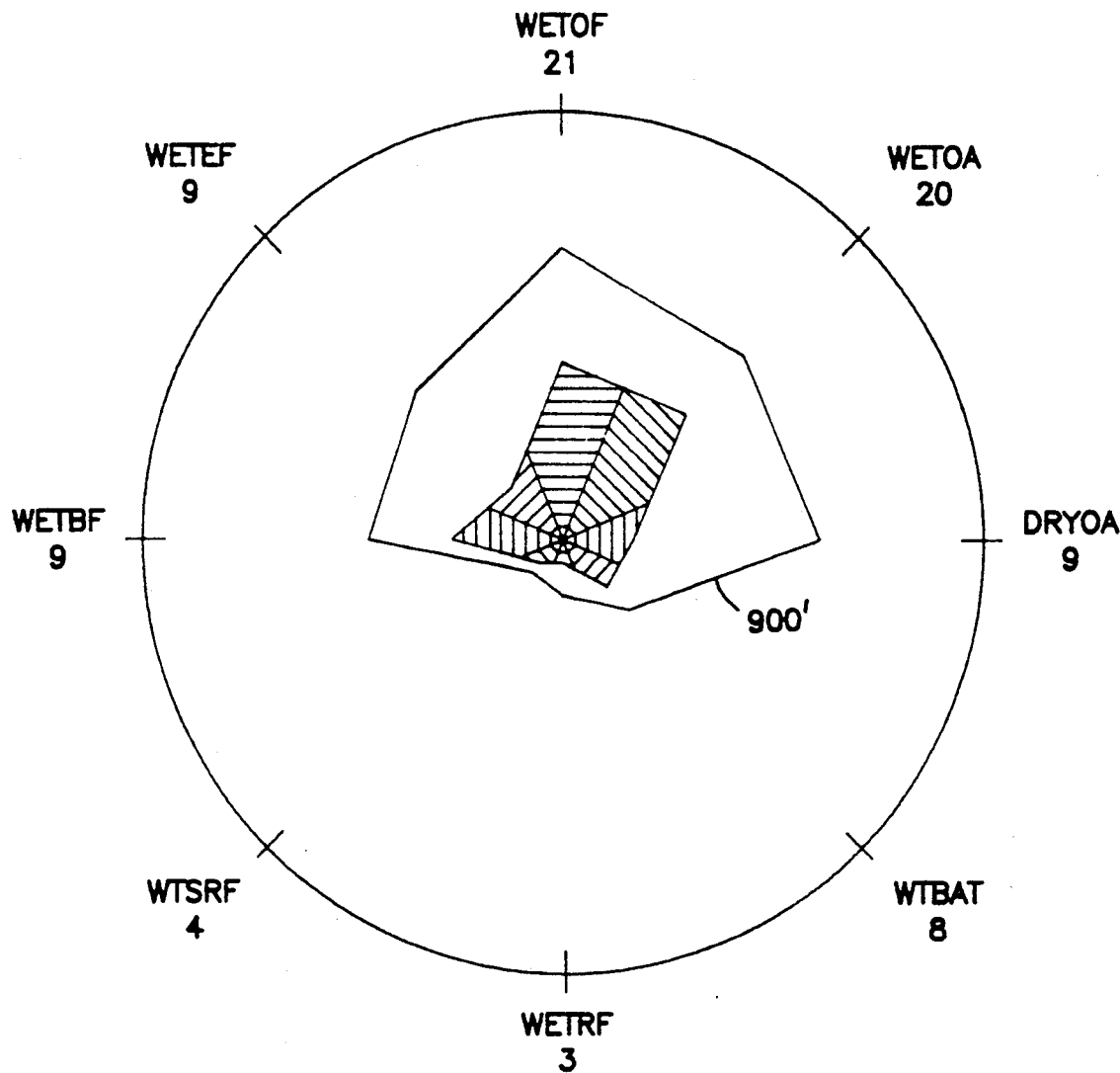
Figure 18:
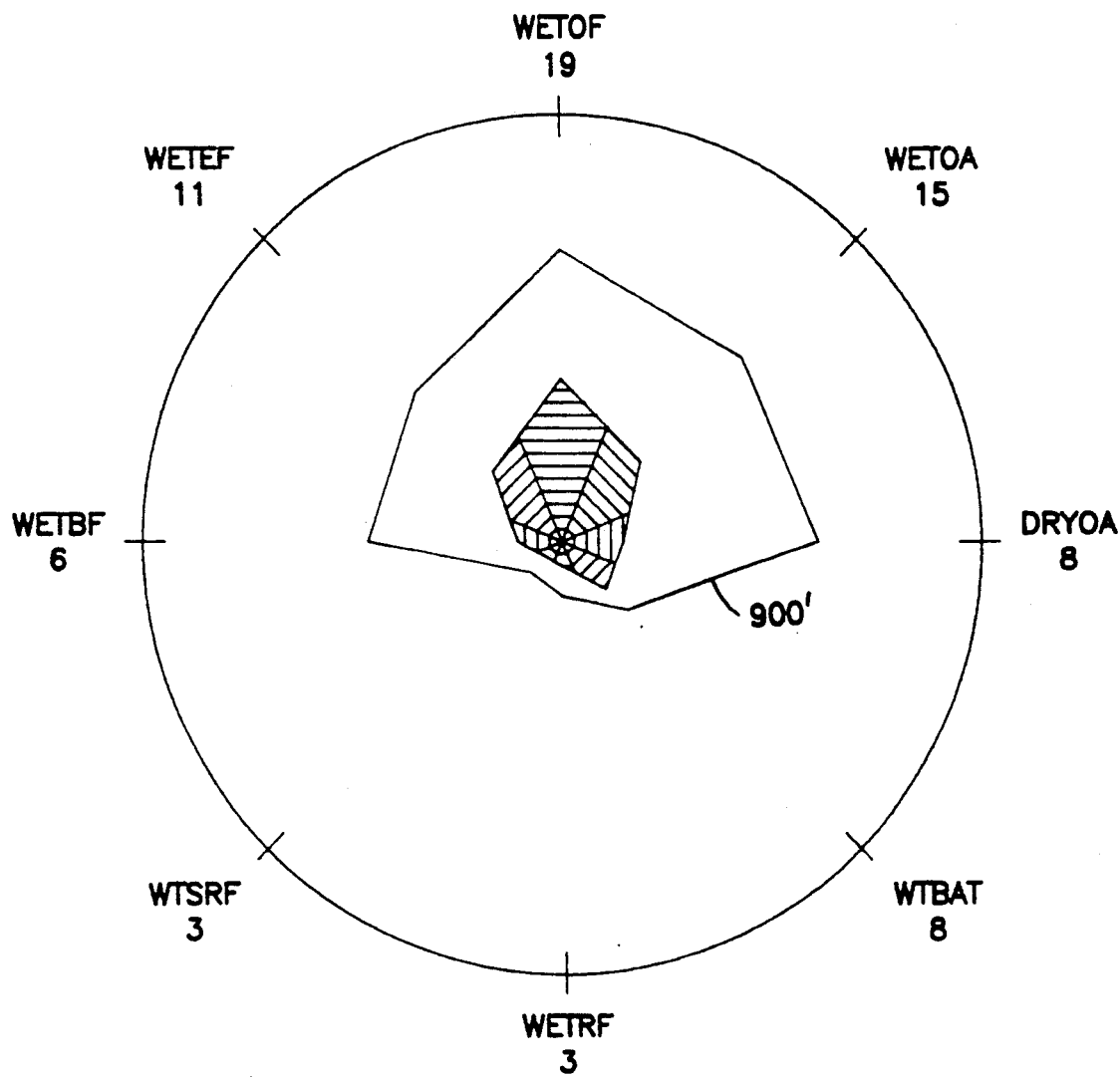
Figure 19:
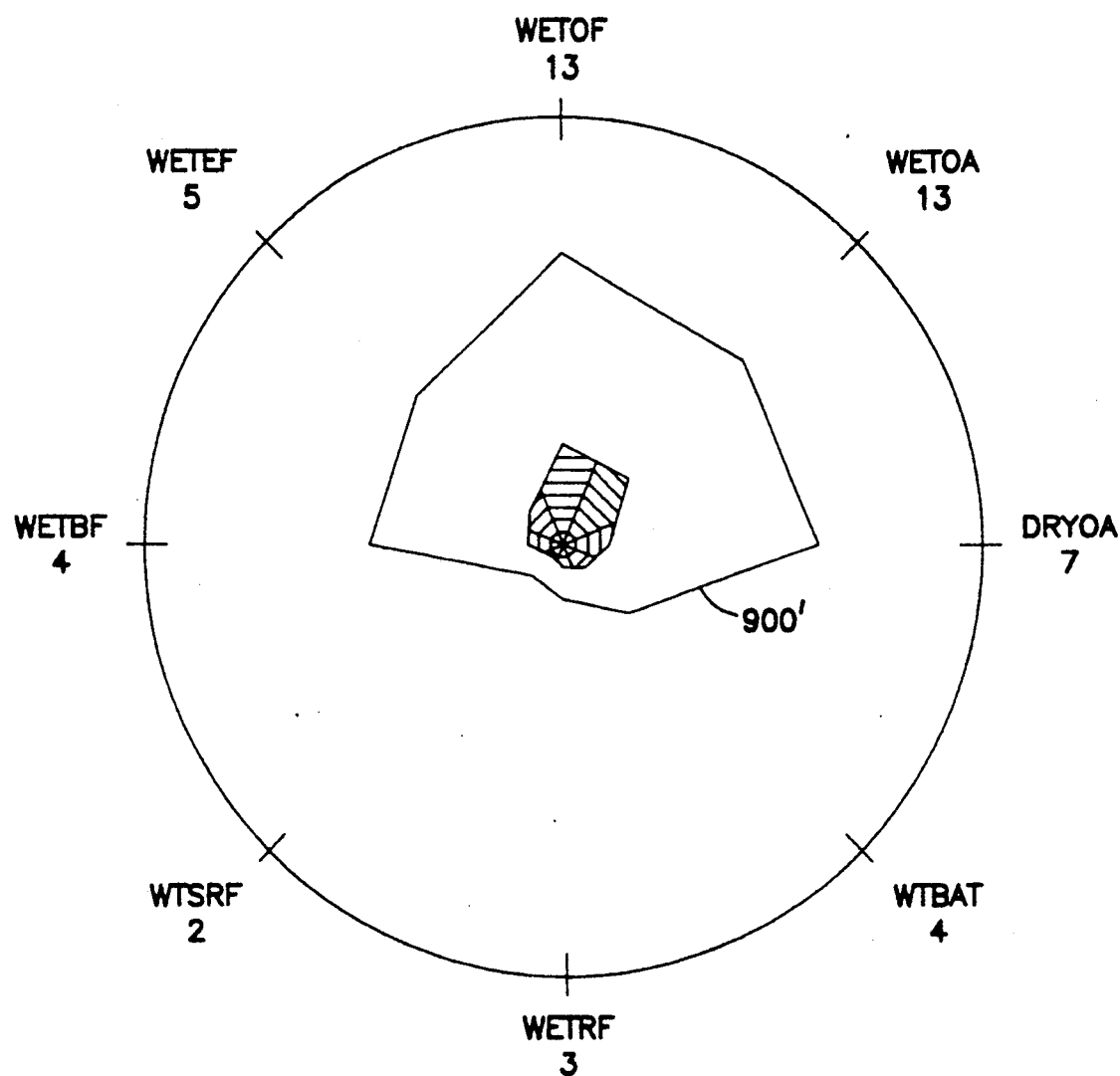

Limits have been determined as to what identifies and characterizes the preferred dietary fiber products of the present invention with respect to an acceptable odor and flavor. For example, with respect to dry odor attributes, i.e., a dry aroma profile, the preferred product of the present invention has a dry overall aroma of no greater than about a value of 33; a dry earthy aroma of no greater than about 19; and, a dry beet aroma of no greater than about 15. (All profile values reported herein are on a scale of from 0 to 60, wherein 0 represents a "weak" attribute and 60 represents a "strong" attribute.) With respect to the wet odor attributes described above, i.e., wet aroma profile, the preferred products of the present invention have a wet overall aroma of no greater than about 33; a wet earthy aroma of no greater than about 28; a wet beet aroma of no greater than about 26; and, a wet rancid aroma of no greater than about 6. Furthermore, with respect to wet flavor attributes, i.e., wet flavor profile, the products of the present invention preferably have a wet overall flavor of no greater than about 37; a wet earthy flavor of no greater than about 26; a wet beet flavor of no greater than about 25; a wet sour flavor of no greater than about 6; a wet rancid flavor of no greater than about 7; and, a wet bitter flavor, i.e., after taste, of no greater than about 12. These limits are graphically represented in the "spider web" graph or "star" chart as seen in FIGS. 8 and 11. The method by which these values were obtained is discussed in more detail in Experimental Example II below. All the wet/dry flavor/aroma attributes are graphically displayed, although not all are required to effectively evaluate a fiber material.

There is no requirement that every one of the 13 attributes described be absolutely within the limits defined, for the characterized fiber product to be acceptable in human foods. This is because for some applications a product may be defined as acceptable if a few of the attributes are a little outside the most preferred range. In fact, for simplification of the analysis, many sugarbeet pulp samples have been evaluated using only 8 of the above flavor/odor characteristics. These include a wet earthy flavor, a wet rancid flavor, a wet beet flavor, a wet bitter after taste, a wet sour flavor, a wet overall flavor, a wet overall aroma, and a dry overall aroma. With respect to the present invention, the more important attributes are those which concern wet rancid and earthy flavor/odor.

To determine if a product is at or below the above-listed acceptable limits, a product may be evaluated by trained individuals on the basis of this series of characterizing descriptive attributes. Each judge evaluates the intensity of each attribute qualitatively with respect to its strength, i.e., "strong" or "weak". The qualitative intensity is then converted into a numerical score of from 0 (weak) to 60 (strong). These scores can be averaged, statistically evaluated for significance, and graphically displayed by the use of a "spider web" graph or "star" chart as seen in FIGS. 9, 10, and 12-19.

Figure 9:
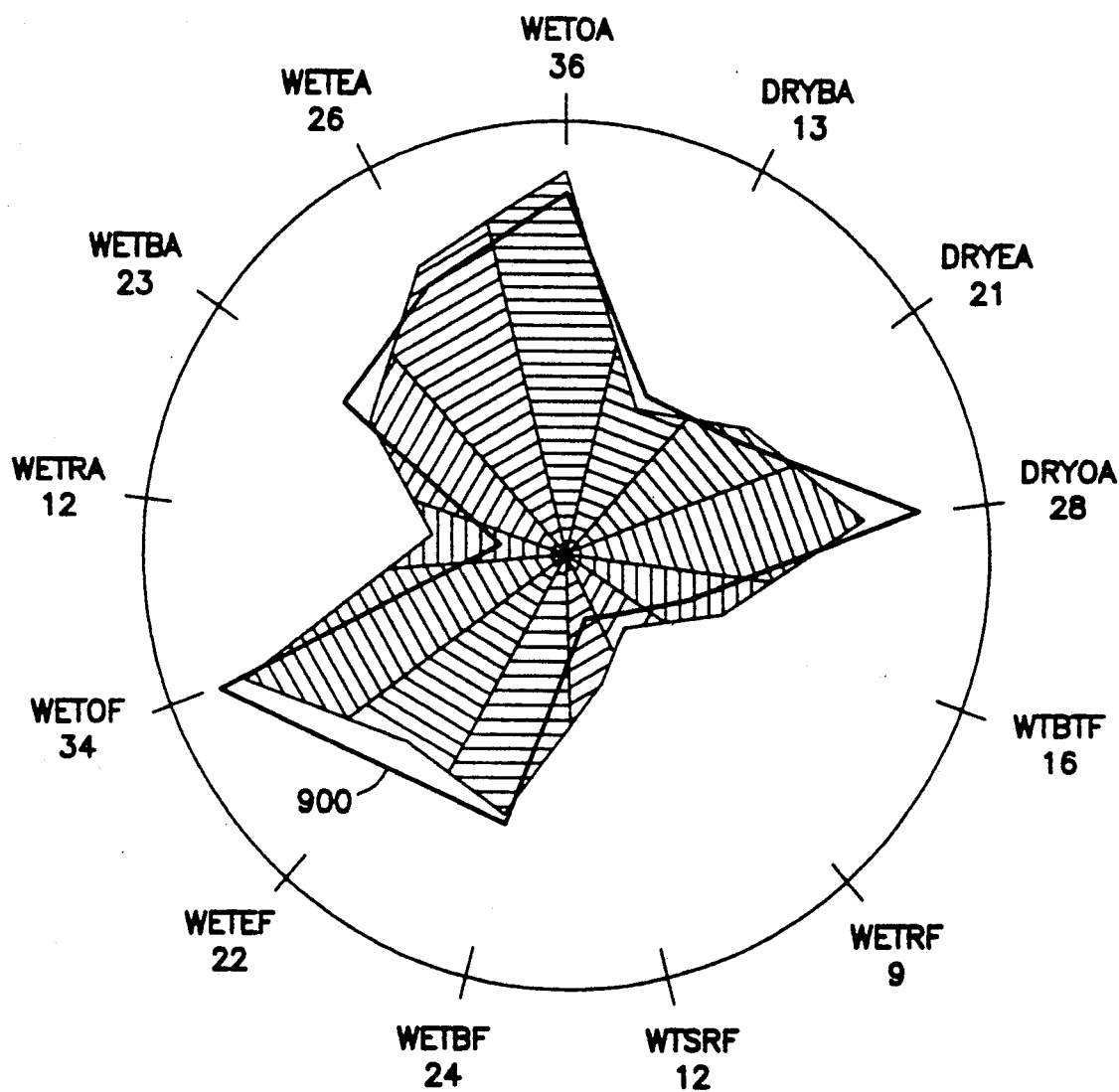
FIG. 9 is a spider web graph, or star chart, of a sensory panel evaluation of a sample of sugarbeet fiber before a process of treatment according to the present invention.

FIG. 9 is representative of sugarbeet fiber before it is subjected to the overall process of the present invention including heat treatment and washing for removal and/or reduction of the adverse flavor and odor characteristics. That is, the fiber material identified by the graph in FIG. 9 was subjected to the cleaning stage of the overall process which includes scrubbing, screening, and pressing, then was dried to a moisture content of between about 3% and 7%, and ground. All the wet/dry flavor/aroma attributes were evaluated and are presented graphically. The labels on the outside of the circle are identified above, and the numbers are the statistically determined means, i.e., averages, for each attribute. The center of the "spider web" is at 0, and the end of each line within the spider web is graphically representative of the mean value for that particular attribute. That mean valve, or score, is indicated on the graph next to an abbreviation for the attribute involved.

Figure 10:
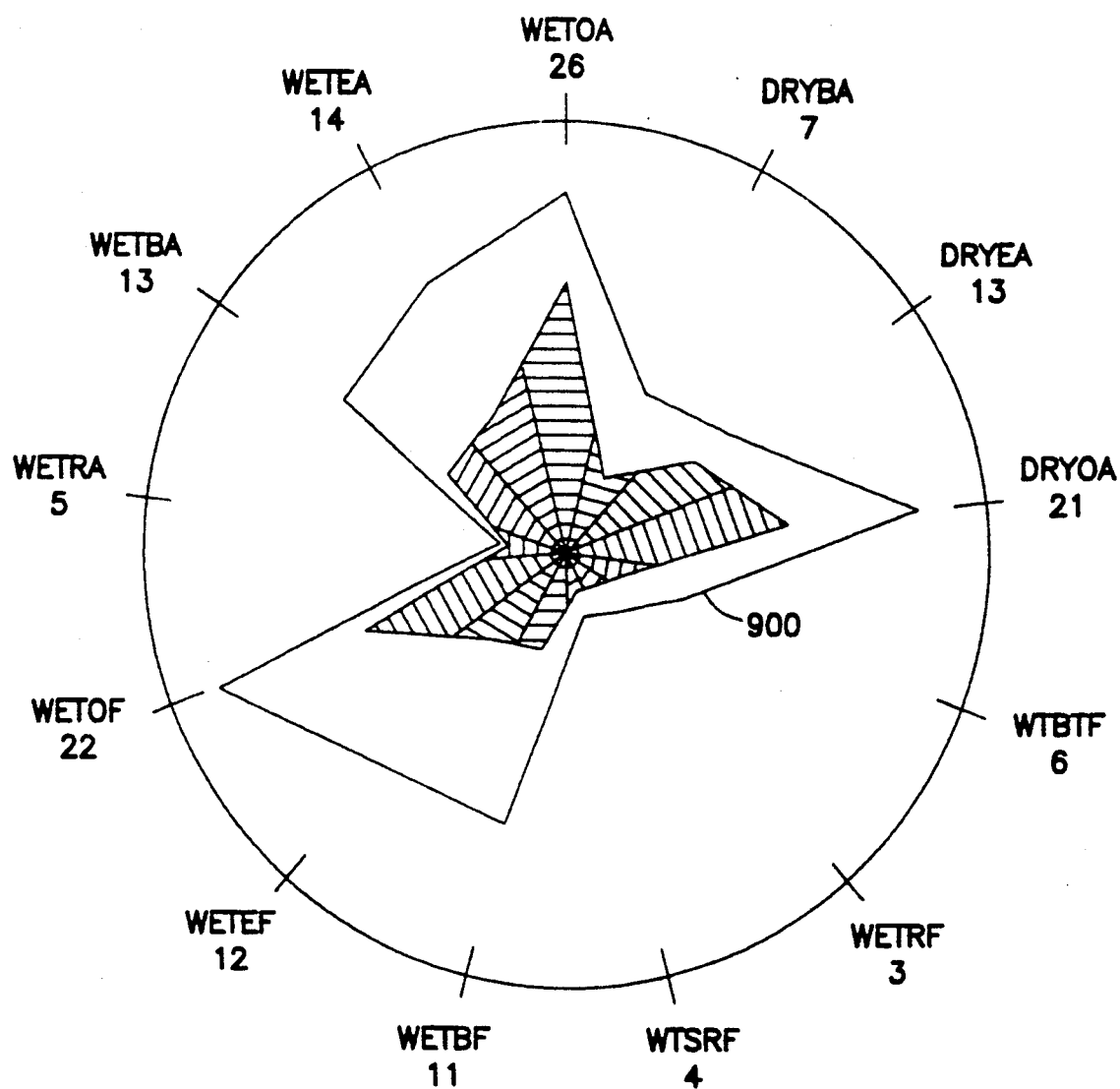
FIG. 10 is a spider web graph, or star chart, of a sensory panel evaluation of a sample of sugarbeet fiber after a pilot plant process of treatment according to the present invention.

FIG. 10 is representative of sugarbeet fiber after is has gone through the processing system of the present invention (including heating and washing), as described above with respect to a pilot plant operation, to reduce the concentration of the adverse flavor and odor compounds. That is, the fiber material was directed from the diffuser through the cleaning stage, to the rehydrator, and then the material was heat treated and countercurrent washed according to the process described above. The parameters this particular material was processed at are as follows: 94% moisture after rehydration; temperature = 100° C.; holding time = 5 minutes. FIGS. 9 and 10 contain an overlay of the graph presented in FIG. 8 for ease of comparison. Each graph is on the same scale and provides an indication of the levels to which the characteristic adverse flavor and odor attributes were reduced, in the particular example involved.

FIGS. 12-19 are representative of sugarbeet fiber after it has gone through the processing system of the present invention (including heating and washing), as described above with respect to a commercial-scale operation. FIGS. 12-19 contain an overlay of the graph presented in FIG. 11. FIG. 11 represents the same limits that are represented by FIG. 8; however, only 8 of the 13 wet/dry flavor/aroma attributes are graphically displayed in FIG. 11. Also note that the characteristic in FIG. 8 referred to as WTBTF is referred to as WTBAT in FIG. 11. Each graph in FIGS. 11-19 is on the same scale and provides an indication of the levels to which the characteristic adverse flavor and odor attributes were reduced, in the particular example involved. The results shown in FIGS. 12-19 appear to be better than that shown in FIG. 10, however, there is no indication that this difference is significant. The parameters under which these particular materials were processed are presented in Table 1. The washer temperature listed is that of the fiber and water mixture as measured at a point in the washer near the fiber entrance or water exit of the U-tube shown in FIG. 4b. The wash rate is in gallons per minute of wash water. Parameters common to all runs are as follows: 94% moisture after rehydration; temperature of heat treatment 75° C.; holding time in transfer tube = 1.25 minutes.

TABLE 1

| Run | Washer Temp. (°C.) | Wash Rate | $H_2O_2$ (ppm) | Time in Washer (min) |
| --- | --- | --- | --- | --- |
| 1 | 90 | 80 | 500 | 30 |
| 2 | 75 | 120 | 500 | 30 |
| 3 | 75 | 80 | 1500 | 30 |
| 4 | 90 | 120 | 1500 | 30 |
| 5 | 75 | 160 | 500 | 60 |
| 6 | 90 | 160 | 1500 | 60 |
| 7 | 75 | 240 | 1500 | 60 |
| 8 | 90 | 240 | 500 | 60 |

A dietary fiber material of the present invention contains at least about 75% and preferably about 80% total dietary fiber (more preferably at least about 82% total dietary fiber) based upon the total dry weight of the fiber material; at least about 10% soluble fiber, preferably within the range of about 10% to 25% soluble fiber, and most preferably within the range of about 10% to 20%, based upon the total dietary fiber content. The preferred dietary fiber also preferably has less than about 1 calorie per gram, and preferably less than about 0.6 calorie per gram. Also, a dietary fiber material of the present invention, preferably sugarbeet fiber, has a sensory profile comprising a dry aroma profile, a wet aroma profile, and a wet flavor profile, as defined above. The material, if prepared as described herein, is storage stable, i.e., it generally maintains a sensory profile within the limits defined above for at least about 6 months under ambient conditions.

III. Other Vegetable Fiber Materials

As has been stated previously, vegetable fibers other than sugarbeet fiber may contain similar adverse flavor and odor components. These vegetable materials may therefore be advantageously treated by the process of the present invention. That is, fiber materials containing a musty/earthy flavor and/or aroma, as for example other root crops, such as other types of beets, and/or containing a rancid/rotten flavor and/or aroma may possess an improved taste and smell upon treatment according to the invention herein described. The same evaluation and characterization techniques could be used on these materials as is described above for sugarbeet fiber. For example, the smell and taste could be evaluated using the QDA technique with analogous sensory attributes characterized.

IV. Food Products Utilizing the Fiber Material and Methods for Production

In general, dietary fiber materials, including sugarbeet fiber materials, made according to the processes of the present invention described above and/or characterized as described above may be utilized in food products, in a variety of manners. A typical food composition utilizing the fiber material of the present invention would include about 1% to 50% by weight of the fiber material and about 50% to 90% by weight of additional material selected from the group consisting of other fibers, cereal grain flour, bran, and mixtures thereof. More preferably such compositions would include about 1% to 20% by weight of the preferred dietary fiber of the present invention, and about 60% to 90% by weight of the material selected from the group consisting of other fibers, cereal grain flour, bran, and mixtures thereof. As indicated above, it is an advantage to the present invention that substantial amounts of material such as sugarbeet fiber, due to improvement with respect to flavor and aroma (to acceptable levels for humans), can be incorporated in substantial amounts, i.e., at least about 4% to 5%, by weight, in such food composition mixtures.

Typically, the food composition mixtures indicated above may include a variety of other materials including added salt and added sugar. Typical added salt concentrations will be in the amount of about 0.5% to 3.0% by weight; and, typical added sugar amounts will be in about 2% to 15%, by weight.

The dietary fiber products, including sugarbeet materials, prepared according to the processes of the present invention and/or characterized as described above with respect to flavor and aroma may be utilized to prepare desirable fiber food products, including toasted products, for humans. A typical method for producing such a fiber food product includes steps of preparing a food composition, such as those described above; cooking the composition; and, drying the cooked composition. Typically, cooking is conducted by means of extrusion, with added water, at temperatures on the order of about 110° C. to 160° C. Typical moisture levels out of an extruder are within the range of about 8% to 16%. The product exiting the extruder is preferably dried to moisture levels below about 4%.

Alternate methods include cooking a batch of the composition including about 25% to 35% moisture, at a sufficient temperature for cooking of the grain, bran or fiber materials involved; drying, for example at about 190° F. (87° C.) to about 17% water; and, flaking and toasting the material with a final toasting being at about 400° F. to 450° F. (204° C. to 232° C.) to 2% water.

The dietary fiber of the present invention can be used in a variety of other food products to advantage. For example, it can be incorporated into breads, cakes, cookies, puddings, confections, pastas, noodles, jams, toppings, sauces, soups, processed meats, yogurts, and dressings. The amount of the vegetable fiber that can be incorporated into such food products can be readily determined, and standard manufacturing procedures can be applied to their production. Furthermore, the dietary fiber of the present invention can be used in medically related food products such as laxatives and dietetic powders.

It will be understood that the above recited descriptions for compositions and processes are exemplary only, but do represent manners in which the advantageous materials according to the present invention may be utilized.

EXPERIMENTAL EXAMPLES

Example I

Gas Chromatography Determination of Volatile Compounds in Sugarbeet Fiber Using a Dynamic Thermal Desorption Technique Pyrex glass tubes (4.0 mm ID×6 mm OD×11.5 cm long) were filled with 400 mg of −40/+60 mesh dry fiber and plugged at both ends with prepurged glass wool. The tubes were then inserted into an Envirochem Thermal Tube Desorber Model 850. The volatiles were purged from the dry fiber at 110° C. for 4 minutes using a stream of dry helium at 30 mL/min. The purged volatiles were trapped on a pyrex glass tube of the size listed above; which was packed with (60/80 mesh) Tenax-TA, Carbopack-B, and Carbosieve S-III (carbon molecular sieve)in a ratio of 80:15:5 by weight. This packed column had been previously conditioned by heating with an external heater jacket at 65° C. to ensure the elimination of water, which binds and blocks active sites on the trap and interferes with the analysis. Volatiles from this primary absorption tube were then thermally desorbed or transferred at 250° C. for 5 minutes onto a secondary absorption tube or focusing tube (2.0 mm ID×6.0 mm OD×11.5 cm long) was packed with Tenax-TA, silica gel, and Carbosieve S-III in the same weight ratio as the primary tube. The volatile transfer or focusing operation serves to remove residual water and increases desorption efficiency of the sample to permit a more rapid sample delivery for volatile determinations. Due to this more rapid delivery, use of this secondary tube has shown to eliminate the necessity of cryogenic focusing of the sample, which is a process that uses either liquid carbon dioxide or liquid nitrogen to freeze a portion of a chromatographic column or tube to collect volatiles purged from trapping supports into a very narrow band.

The volatiles were thermally desorbed from the secondary trap at 300° C. for 5 minutes. Part of the sample was vented to the atmosphere so as not to exceed the capillary column's capacity. The remainder of the sample was transferred to the capillary column by a heated nickel transfer line. This transfer line prevents condensation or adsorption of the sample's volatiles.

The capillary column separations were done using a 1.0-μm film thickness SPB-1 (100% bonded methyl silicone phase) 30-M×0.32-mm ID column and a Varian Model 3700 gas chromatograph. The nickel transfer line was inserted through the injector port into the column oven and was heated to 220° C. The flame ionization detector (FID) was held at 260° C. The following temperature program was used: initial temperature of 35° C. ramped at 2° C./min to 245° C., no hold. The carrier gas was high-purity helium at 20 cm/s heated to 200° C. The FID makeup gas was high-purity nitrogen at 30 mL/min. The FID electrometer attenuation was held at 1×8 and acquisition carried out for 110 minutes. A flow schematic for the separation of volatiles is included as part of the schematic for the total volatiles analysis illustrated in FIG. 5.

Representative chromatograms of an unprocessed sugarbeet fiber material and a processed product fiber are shown in FIGS. 6 and 7, respectively. Identification of the isolated compounds was based on computer matching of the full mass spectra or mass spectral fragmentation patterns of the various compounds published in "EPA/NIH Mass Spectral Data Base" (Heller and Milne, 1975, 1980). Mass spectra from compounds isolated from sugarbeet fiber were also compared to that obtained from the authentic compounds. Further confirmation was obtained by coincidence for retention indices (see Vam Dool, Hand Dratz, P. D. "A Generalization of the Retention Index System Including Linear Temperature Programed Gas-Liquid Partitian Chromatography", *Journal of Chromatography*, 11:463, 1963, and from odor evaluation of the vapors that exited from an olfactory sniffer port on the gas chromatograph, as each compound eluted from the capillary column.

Results of quantitative gas chromatographic analysis of different sample lots were averaged to obtain representative data for each of the processed and unprocessed sugarbeet fiber. The components identified are listed in Table 2 together with values for their concentrations in the materials (based on GC peak area measurements as calculated from comparison to a standard known amount of 9-ethylnonanoate injected into the fiber before volatilization of the vapors) and a descriptor from the olfactory sniffer evaluation. The concentrations are reported in parts per billion (ppb) based upon the dry weight (i.e. moisture of between about 3% and 7%) of the fiber.

Product #1 is sugarbeet fiber that was processed only through the scrubbing/screening/pressing steps discussed above. That is, this material only went through the initial stages of the overall process and was then dried to a moisture content of less than 7% and ground. The material was not subjected to any heat treatment. Product #2 is the same material as represented by Product #1 that was rehydrated and subjected to heat treatment by increasing the temperature of the slurry to about 100° C., holding it at this temperature for a period of time, and then subjecting it to batch-washing Product #3 was sugarbeet fiber that had come directly from the diffuser and was subjected to the overall process, including heat treatment and countercurrent washing. The material was scrubbed, cleaned, pressed, and rehydrated to a 94% moisture level. The temperature of the slurry was increased to 100° C. The slurry was held at or very near this temperature for about 5 minutes. The slurry was then subjected to countercurrent washing. Products #1 and #2 are represented by the chromatograms in FIGS. 6 and 7, respectively.

TABLE 2

| | | Volatiles Identified in Sugarbeet Fiber | | | | | |
|---|---|---|---|---|---|---|---|
| | | Estimated Concentration (ppb)[b] Fiber Material | | | Retention | Odor Threshold | Sensory |
| Peak No. | Compound[a] | #1 | #2 | #3 | Indices[c] | (ppb)[d] | Description[e] |
| | | Aliphatic Alcohols | | | | | |
| 2 | 3-methylbutanol | 80 | 155 | 34 | 3.24 | 300 | mild fruity green |
| 3 | 2,3-butanediol | 1350 | 123 | 21 | 3.72 | — | sweet, green |
| 7 | c-3-hexenol | 50 | 16 | 22 | 4.53 | — | heavy green leaves |
| | | Aliphatic Aldehydes | | | | | |

TABLE 2-continued

Volatiles Identified in Sugarbeet Fiber

| Peak No. | Compound[a] | Estimated Concentration (ppb)[b] Fiber Material | | | Retention Indices[c] | Odor Threshold (ppb)[d] | Sensory Description[e] |
|---|---|---|---|---|---|---|---|
| | | #1 | #2 | #3 | | | |
| 1 | pentanal | 1670 | 407 | 294 | 2.81 | 12 | grassy, green |
| 4 | hexanal | 5220 | 1910 | 1400 | 3.96 | 5 | heavy green-grassy |
| 6 | t-2-hexenal | 70 | 28 | 26 | 4.31 | 17 | green leaf |
| 10 | heptanal | 210 | 200 | 127 | 4.94 | 3 | strong, fatty, harsh |
| 12 | t-2-heptenal | 140 | 34 | 29 | 5.51 | 13 | pungent, green |
| 14 | t,t-2,4-heptadienal | 620 | 144 | 0 | 6.03 | 0.5 | spicy, green, pungent, vegetable |
| 15 | t-2-octenal | 350 | 40 | 25 | 6.54 | 2 | citrus, green, leafy |
| 16 | t,c-2,6-nonadienal | 50 | 21 | 5 | 7.50 | 0.01 | green, cucumber, pungent, vegetable |
| 17 | t-2-nonenal | 140 | 33 | 65 | 7.59 | 0.08 | waxy, cardboard-like, astringent |
| 20 | t-2-decenal | 85 | 14 | 8 | 8.60 | 0.4 | orange-like |
| 21 | t,t-2,4-decadienal | 390 | 30 | 69 | 9.17 | 0.07 | powerful green, fatty, rancid, musty |
| Aliphatic Acids | | | | | | | |
| 9 | isovaleric acid | 39 | 11 | 10 | 4.63 | 70 | sweat-socks |
| 13 | hexanoic acid | 2220 | 288 | 66 | 6.00 | 3,000 | copra oil |
| Aromatics | | | | | | | |
| 5 | 2-furfural | 100 | 51 | 35 | 4.19 | 23,000 | penetrating burnt |
| 11 | benzaldehyde | 150 | 52 | 40 | 5.46 | 350 | almond, nutty |
| 19 | hydroxymethyl furfural | 55 | 29 | 34 | 8.03 | 200,000 | pungent, burnt |
| Nitrogen Compounds | | | | | | | |
| 18 | 2-methoxy-3-sec-butylpyrazine | 80 | 10 | 10 | 7.780 | 0.002 | beety, green, earthy |
| Others | | | | | | | |
| 22 | 3-octen-2-one | 300 | 31 | 23 | 9.24 | 1.5 | — |

[a]GC Van den Dool and Kratz retention indices are consistent with those of authentic sample.
[b]Parts (mL) of compound per billion parts (mL) of water (values based on dry weight of fiber).
[c]Retention indices (Ie: Van den Dool and Kratz. 1963) on SPB-1.
[d]Threshold values (T) are reported as ppb of the compound in water.
[e]Based on sensory evaluation from sniffer port at GC column exit.
Fiber Material
1 Unprocessed sugarbeet fiber (scrubbed/screened/pressed, dried to <7% moisture, ground)
2 Processed sugarbeet fiber (rehydrated fiber material #1, subjected to heat treating and batch washing in pilot plant operation)
3 Processed sugarbeet fiber (fresh sugarbeet fiber subjected to heat treating and countercurrent washing in pilot plant operation)

Example II

Sugarbeet Fiber Sensory Evaluation

The upper limit of the sensory evaluation, as shown as a black solid line on the star chart, i.e., spider web graph, shown in FIG. 8 was determined in the following manner. Nine trained and statistically consistent panelists determined the attributes and acceptable limits by which the processed sugarbeet fiber could be defined. Sugarbeet fiber was treated according to an analogous process to that of the present invention. During the early development of the process, i.e., before all parameters were optimized, processed sugarbeet fiber was produced with commercially acceptable odor and flavor. The sugarbeet fiber used for this evaluation was scrubbed, screened, pressed and dried to less than about 7% moisture. It was then rehydrated, heat treated, and washed using a tank or batch washing method. This sugarbeet fiber, with acceptable odor and flavor, was collected from a process run of the factory operation for a period of 12 hours. After the 12 hour period, the process was discontinued and the equipment was cleaned. Processed sugarbeet fiber from run number 5, i.e., Lot No. 5, was chosen as the standard. Each time samples of the fiber were tested from various lots, samples from Lot No. 5 was also tested. During each test, the judges were each given four samples of Lot No. 5, and four samples from each of three other lots for analysis. As the tests progressed, the number of samples from each lot was reduced to three, and then to two. These samples were unlabelled and presented to the judges in random order. Each sealed sample container contained 1 tablespoon (14.8 ml) of minus 40 mesh processed sugarbeet fiber. The results from the nine panelists, whose evaluations were statistically shown to be consistent and credible, were analyzed for statistical variance including average ratings, standard deviations, and probabilities of significance. The statistical analysis of the results obtained from the evaluation of Lot No. 5 resulted in the values for the upper limit (or border) of the proposed Sensory Specification because this material was characterized as being representative of what would be commercially acceptable. The black line is a graph of the average, i.e., mean, values of the panelists' ratings for all the wet/dry attributes for this material. Any product within the black line or border would be considered commercially acceptable. The definitions of each attribute and the procedures followed by each of the judges are listed below. The numerical value indicating or defining the acceptable value for each attribute (on a scale of 0 to 60) is indicated next to each variable.

FIGS. 9 and 10 show the results of analyses of unprocessed sugarbeet fiber, and processed sugarbeet fiber treated according to a preferred process of the present invention as defined above for the pilot plant operation, respectively. The black line indicates the acceptable limit for the processed sugarbeet fiber, i.e., fiber with no "off-flavor" and no "off-odor". The actual values for unprocessed material, i.e., material only subjected to the cleaning operation of the overall process, and not the heat treatment, are defined by the shaded region in FIG.

9, and generally extend outside the range of acceptable limits (indicated by heavy line 900, which corresponds to the star chart in FIG. 8). The actual values for the processed material are defined by the shaded region in FIG. 10, and are generally well within the acceptable values (indicated by border 900). The numbers listed on each chart are the average values for each attribute.

FIGS. 12-19 show the results of analyses of processed sugarbeet fiber treated according to a preferred process of the present invention as defined above for the commercial-scale operation. The black line 900' indicates the acceptable limit for the processed sugarbeet fiber, i.e., fiber with no "off-flavor" and no "off-odor". The actual values for the processed material are defined by the shaded region in FIGS. 12-19, and are generally well within the acceptable values (indicated by border 900', which is also shown in FIG. 11). Again, it is noted that FIG. 11 represents the same acceptable limits as does FIG. 8, with only 8 of the 13 characteristics represented. The numbers listed on each chart are the average values for each attribute.

Definition of Terms

| Variable | Acceptable Level (FIGS. 8 & 11) (on a scale of 0-60) | Description |
| --- | --- | --- |
| DRYOA | 33 | Dry Overall Aroma |
| DRYEA | 19 | Dry Earthy Aroma |
| DRYBA | 15 | Dry Beet Aroma |
| WETOA | 33 | Wet Overall Aroma |
| WETEA | 28 | Wet Earthy Aroma |
| WETBA | 26 | Wet Beet Aroma |
| WETRA | 6 | Wet Rancid Aroma |
| WETOF | 37 | Wet Overall Flavor |
| WETEF | 26 | Wet Earthy Flavor |
| WETBF | 25 | Wet Beet Flavor |
| WTSRF | 6 | Wet Sour Flavor |
| WETRF | 7 | Wet Rancid Flavor |
| WTBTF | 12 | Wet Bitter Flavor |
| WTBAT | 12 | Wet Bitter After Taste (same as WTBTF) |

Procedure for Judges' Evaluations

I. Dry Evaluation

AROMA A sealed container of a sample of 1 tablespoon of minus 40 mesh material was shaken gently for 2 or 3 times. The cap was removed and the material evaluated for aroma on the basis of a weak/strong score sheet. The container was recapped and shaken as needed before each attribute was evaluated. The results of the analyses were recorded on a score sheet with a weak/strong scale (0 to 60) for each attribute.

For the evaluation of the vegetable fiber produced according to a commercial-scale process, the score sheet contained horizontal lines for each attribute that were enumerated by ones, unlike the material used for the evaluation of the product produced in the pilot plant.

OVERALL The overall intensity of the aroma of any kind perceived in the fiber was measured on the basis of a weak/strong rating system.

EARTHY The earthy, muddy, dusty, dirt- or clay-like aroma; "barny" aroma; musty aroma perceived in the fiber was measured.

BEET The beet aroma perceived in the fiber was measured on the basis of a weak/strong scale.

II. Wet Evaluation

A. AROMA To a 1 tablespoon sample of minus 40 mesh material was added ¼ cup (59 ml) warm water. The sample was mixed thoroughly and allowed to stand for 30 seconds. The sample was again stirred immediately before each evaluation. The results of the analyses were recorded on a score sheet with a weak/strong scale (0 to 60) for each attribute.

For the evaluation of the vegetable fiber produced according to a commercial-scale process, 5 grams of fiber were used with 100 grams of hot water. The score sheet contained horizontal lines for each attribute that were enumerated by ones, unlike the material used for the evaluation of the product produced in the pilot plant.

OVERALL The overall intensity of the aroma of any kind perceived was measured.

EARTHY The intensity of the earthy, muddy, dirt- or clay-like aroma; musty aroma perceived in the fiber was measured.

BEET The intensity of the beet and/or vegetable aroma perceived in the fiber was measured.

RANCID The intensity of the rancid or "painty" aroma (similar to old oil or butter; chemical like turpentine; petroleum; or old grease) perceived was measured.

B. FLAVOR To a 1 tablespoon sample of minus 40 mesh material was added ¼ cup (59 ml) warm water. The sample was mixed thoroughly and allowed to stand for 30 seconds. The sample was again stirred immediately before each evaluation. A sample of ¼ to ½ teaspoon (1.2 to 2.5 ml) was tasted for each attribute as needed to complete the evaluation. The results of the analyses were recorded on a score sheet with a weak/strong scale (0 to 60) for each attribute.

For the evaluation of the vegetable fiber produced according to a commercial-scale process, 5 grams of fiber were used with 100 grams of hot water. The score sheet contained horizontal lines for each attribute that were enumerated by ones, unlike the material used for the evaluation of the product produced in the pilot plant.

OVERALL The overall intensity of the flavor of any kind perceived was measured.

EARTHY The intensity of the earthy, muddy, musty, dirt- or clay-like flavor perceived in the fiber was measured.

BEET The intensity of the beet flavor perceived in the fiber was measured.

SOUR The intensity of the sour flavor perceived in the fiber was measured.

RANCID The intensity of the rancid or paint-like flavor (similar to old oil or butter; chemical like turpentine; or petroleum) perceived was measured.

BITTER The intensity of the bitter, biting (astringent) flavor perceived in the fiber was measured.

Example III

High Fiber Whole Wheat Muffins

The following formula and procedure were used to prepare a high fiber whole wheat muffin with and without sugarbeet fiber, with attributes, as described above, that meet the qualifications of the product of the present invention. The ingredients, i.e., formula, for the muffin containing the sugarbeet fiber are listed below. For the control muffin, all the ingredients and amounts (in grams) are the same, but the amount of whole wheat flour was increased to compensate for the lack of sugarbeet fiber. The nutritional data for each type of muffin were compared. This information indicates that the food product containing sugarbeet fiber has significantly fewer calories, less fat, more total dietary fiber, and more soluble fiber than the control muffin.

| Formula | | |
|---|---|---|
| Ingredients | Grams | Mix % |
| Pastry Flour | 85 | 26.2 |
| Sugar | 70 | 21.6 |
| Whole Wheat Flour | 50 | 15.4 |
| Shortening | 35 | 10.8 |
| Sugarbeet Fiber | 22.5 | 6.9 |
| Honey | 22.5 | 6.9 |
| Molasses | 15 | 4.6 |
| Milk Powder | 15 | 4.6 |
| Baking Powder | 2.75 | 0.9 |
| Egg White | 2.5 | 0.8 |
| Salt | 2.0 | 0.6 |
| Baking Soda | 1.0 | 0.3 |
| Vanilla | 0.5 | 0.2 |
| Cinnamon | 0.5 | 0.2 |

Procedure

Preheat the oven to 400° F. (204° C.). Grease muffin pans or use paper baking cups. Empty the muffin mix into the bowl. Add 1¼ cups (296 ml) water to the mix. Mix until a smooth batter is formed. Fill muffin cups ¾ full. Bake 20 to 25 minutes. Cool 10 to 15 minutes. Makes 6-8 large muffins.

| Nutrition Information | | |
|---|---|---|
| | Fiber Muffin | Control Muffin |
| Total Dietary Fiber (TDF) | 6.9% | 2.8% |
| Insoluble Dietary Fiber (IDF) | 4.6% | 2.0% |
| Soluble Dietary Fiber (SDF) | 1.2% | 0.8% |
| Calories | 383 Kcal/100 g | 410 Kcal/100 g |
| Protein | 5.2% | 6.1% |
| Total Carbohydrate | 44.1% | 52.4% |
| Fat | 6.3% | 8.1% |
| Moisture | 42.8% | 31.3% |
| Ash (minerals) | 1.6% | 2.2% |

Example IV

Cereal and Snack Product Analysis

The following cereal and snack products were prepared and extruded with various levels of sugarbeet fiber. In each case the product was prepared with sugarbeet fiber material having improved flavor and odor characteristics, due to processing according to the general methods described above. The products were generally found to have improved properties.

All of the following products were extruded using a CLEXTRAL ® Twin-Screw Extruder. The extrusion parameters, ingredients, and dietary fiber analyses are listed. The total dietary fiber analysis was carried out according to the AOAC method (AACC Approved Methods, 8th Ed., Method 32-05).

A. Breakfast Cereal Product

For a cereal type product with up to about a 10% addition-level and a proportionate reduction of corn, wheat, and oat flour, a product without a significantly reduced density or any apparent change in the product attributes resulted. At about a 15% use-level, where the ratio of ingredients were kept essentially the same as the control, and the starch level was increased to about 8% of the formula, with less processing water, a product with properties better than the control, i.e., the product without sugarbeet fiber, was formed. The finished product taste was good, the color was excellent and lighter than that of the control.

| Extrusion Parameters | | | |
|---|---|---|---|
| Pump H₂O (lb/hr) | 60 | 50 | 60 |
| Temperature/ Control (°C.) | | | |
| Zone 1 | 18 | 13 | 19 |
| Zone 2 | 100 | 103 | 100 |
| Zone 3 | 133 | 131 | 171 |
| Zone 4 | 140 | 144 | 150 |
| Temp. Die (°C.) | 126 | 135 | 143 |
| Press Die (bar) | — | — | — |
| Press Bearing (bar) | 153 | 149 | 114 |
| Screw Amps | 95 | 85 | 67 |
| Screw RPM | 220 | 220 | 273 |
| Feeder RPM | 30 | 30 | 30 |
| Cutter RPM | 4890 | 4420 | 4920 |
| Product Throughput (lb/hr) | 410 | 434 | — |
| Ingredients (mix) | | | |
| Corn Flour (%) | 51.8 | 48.5 | 45.2 |
| Wheat Flour (%) | 25.8 | 22.5 | 19.2 |
| Oat Flour (%) | 12.4 | 9.1 | 5.8 |
| Corn Starch (%) | 6.0 | 6.0 | 8.2 |
| Sugar (%) | 3.2 | 3.2 | 6.0 |
| Salt (%) | 0.8 | 0.8 | 0.8 |
| Sugarbeet Fiber (%) | — | 10.0 | 15.0 |
| Dietary Fiber Analysis | | | |
| Total Dietary Fiber (%) | 4.48 | 11.88 | 19.44 |
| Soluble Fiber (SDF) (%) | 0.99 | 2.28 | 3.51 |
| Insoluble Fiber (%) | 3.49 | 9.60 | 15.93 |
| Moisture (%) | 3.52 | 2.99 | 2.96 |
| Ash (%) | 1.78 | 1.81 | 2.02 |
| Density (grams/liter) | 59.5 | 57.5 | 82.6 |
| TDF grams per 1 oz serving | 1.3 | 3.4 | 5.5 |
| SDF grams per 1 oz serving | 0.3 | 0.6 | 1.0 |

B. Wheat Snack

For a wheat snack, replacement of wheat bran with sugarbeet fiber up to about a 28% use-level resulted in a crisper product; a more expanded product; a good tasting product; and, a product with a higher fiber level, lower caloric content, and less fines.

| Extrusion Parameters | | | | |
|---|---|---|---|---|
| Pump H₂O (lb/hr) | 32 | 35 | 42 | 42 |
| Temperature/ Control (°C.) | | | | |
| Zone 1 | 16 | 14 | 15 | 15 |
| Zone 2 | 102 | 100 | 105 | 101 |
| Zone 3 | 122 | 150 | 145 | 138 |
| Zone 4 | 140 | 155 | 132 | 144 |
| Temp. Die (°C.) | 147 | 182 | 182 | 171 |
| Press Bearing (bar) | 97 | 84 | 65 | 85 |
| Screw Amps | 85 | 79 | 77 | 73 |
| Screw RPM | 290 | 292 | 290 | 290 |
| Feeder RPM | 46 | 46 | 40 | 40 |
| Cutter RPM | 950 | 1140 | 1140 | 810 |
| Ingredients (mix) | | | | |
| Wheat Flour (%) | 70 | 70 | 70 | 84 |
| Wheat Bran (%) | 28 | 14 | 0 | 0 |
| Vegetable Oil (%) | 1 | 1 | 1 | 1 |
| Salt (%) | 1 | 1 | 1 | 1 |
| Sugarbeet Fiber (%) | 0 | 14 | 28 | 14 |
| Dietary Fiber Analysis | | | | |
| Total Dietary Fiber (%) | 19.12 | 23.78 | 27.68 | 21.16 |
| Soluble Fiber (SDF) (%) | 2.25 | 3.72 | 4.92 | 3.73 |
| Insoluble Fiber (%) | 16.86 | 19.55 | 22.75 | 17.43 |
| Moisture (%) | 3.53 | 3.82 | 3.05 | 4.11 |
| Ash (%) | 4.53 | 3.51 | 3.09 | 2.82 |
| Density (grams/liter) | 118. | 86. | 75. | 79. |
| TDF grams per 1 oz serving | 5.4 | 6.7 | 7.8 | 6.0 |
| SDF grams per | 0.6 | 1.1 | 1.4 | 1.1 |

C. Corn Snack

The use of sugarbeet fiber in a corn snack product, achieved the same expansion at about a 20% use level as that achieved at 15% corn bran level.

| Extrusion Parameters | | | |
|---|---|---|---|
| Pump H₂O (lb/hr) | 35 | 43 | 43 |
| Temperature/Control (°C.) | | | |
| Zone 1 | 21 | 19 | 20 |
| Zone 2 | 100 | 103 | 104 |
| Zone 3 | 121 | 122 | 123 |
| Zone 4 | 153 | 156 | 159 |
| Temp. Die (°C.) | 152 | 175 | 180 |
| Press Bearing (bar) | 61 | 70 | 73 |
| Screw Amps | 69 | 68 | 86 |
| Screw RPM | 295 | 295 | 295 |
| Feeder RPM | 30 | 37 | 44 |
| Cutter RPM | 1230 | 1830 | 1830 |
| Product Throughput (lb/hr) | — | — | 600 |
| Ingredients (mix) | | | |
| Corn Meal (%) | 84 | 84 | 79 |
| Corn Bran (%) | 15 | 0 | 0 |
| Sugarbeet Fiber (%) | 0 | 15 | 20 |
| Salt (%) | 1 | 1 | 1 |
| Dietary Fiber Analysis | | | |
| Total Dietary Fiber (%) | 13.84 | 14.78 | 17.73 |
| Soluble Fiber (SDF) (%) | 0.36 | 2.33 | 0.92 |
| Insoluble Fiber (%) | 13.48 | 12.46 | 16.81 |
| Moisture (%) | 4.94 | 3.92 | 4.12 |
| Ash (%) | 2.01 | 2.11 | 2.12 |
| Density (grams/liter) | 42.00 | 60.00 | 43.00 |
| TDF grams per 1 oz serving | 3.7 | 4.5 | 4.8 |
| SDF grams per 1 oz serving | 0.1 | 0.6 | 0.3 |

D. Crisp Rice Cereal Product

The use of sugarbeet fiber in a crisp rice cereal product dramatizes the unusual properties of sugarbeet fiber. The density and taste were not adversely effected by the inclusion of sugarbeet fiber at about a 20% use-level.

| Extrusion Parameters | | | | |
|---|---|---|---|---|
| Pump H₂O (lb/hr) | 45 | 45 | 45 | 45 |
| Temperature/Control (°C.) | | | | |
| Zone 1 | 38 | 39 | 33 | 37 |
| Zone 2 | 99 | 102 | 103 | 99 |
| Zone 3 | 150 | 153 | 159 | 150 |
| Zone 4 | 137 | 124 | 120 | 125 |
| Temp. Die (°C.) | 154 | 145 | 148 | 150 |
| Press Bearing (bar) | 112 | 122 | 115 | 102 |
| Screw Amps | 107 | 113 | 110 | 103 |
| Screw RPM | 290 | 290 | 290 | 290 |
| Feeder RPM | 40 | 40 | 40 | 40 |
| Cutter RPM | 4920 | 4930 | 4920 | 4920 |
| Product Throughput (lb/hr) | — | — | 534 | — |
| Ingredients (mix %) | | | | |
| Rice Flour (%) | 86 | 88 | 78 | 68 |
| Sugar (%) | 8 | 8 | 8 | 8 |
| Salt (%) | 2 | 2 | 2 | 2 |
| Wheat Starch (%) | 2 | 2 | 2 | 2 |
| Sugarbeet Fiber (%) | 0 | 0 | 10 | 20 |
| Malt Syrup (%) | 2 | 0 | 0 | 0 |
| Dietary Fiber Analysis | | | | |
| Total Dietary Fiber (%) | 3.74 | 0.51 | 6.84 | 13.41 |
| Soluble Fiber (SDF) (%) | 0.82 | 0.30 | 0.88 | 2.33 |
| Insoluble Fiber (%) | 2.93 | 0.21 | 5.96 | 11.08 |
| Moisture (%) | 4.67 | 2.54 | 2.53 | 2.59 |
| Ash (%) | 2.64 | 2.70 | 2.99 | 2.90 |
| Density (grams/liter) | 96. | 94. | 91. | 83. |
| TDF grams per 1 oz serving | 1.1 | 0.1 | 1.9 | 3.8 |
| SDF grams per 1 oz serving | 0.2 | 0.1 | 0.2 | 0.7 |

The invention has been described with reference to various specific and preferred embodiments and techniques. It should be understood, however, that many variations and modifications may be made while remaining within the spirit and scope of the invention.

What is claimed and desired to be secured by letters patent is as follows:

1. A processed sugarbeet fiber material having a wet flavor profile characterized by:
   a. a wet earthy flavor of no greater than about 26 on a scale of 0 to 60;
   b. a wet rancid flavor of no greater than about 7 on a scale of 0 to 60; and,
   c. having been processed in the absence of an organic extraction solvent.

2. A processed sugarbeet fiber material according to claim 1 having a wet flavor profile further characterized by:
   a. a wet beet flavor of no greater than about 25 on a scale of 0 to 60;
   b. a wet bitter flavor of no greater than about 12 on a scale of 0 to 60;
   c. a wet sour flavor of no greater than about 6 on a scale of 0 to 60; and,
   d. having been processed in the absence of an alcoholic solvent.

3. A non-soy dietary fiber material comprising:
   a. at least about 80 wt % total dietary fiber, based upon the total dry weight of the material;
   b. at least about 10 wt % soluble fiber, based upon the total dietary fiber content;
   c. residual organic extraction solvent content of less than about 10 ppm; and,
   d. a wet flavor profile characterized by:
      i. a wet earthy flavor of no greater than about 26 on a scale of 0 to 60; and,
      ii. a wet rancid flavor of no greater than about 7 om a scale of 0 to 60.

4. A fiber material according to claim 3 wherein said dietary fiber material includes less than about 1 calorie per gram and the wet flavor profile is further characterized by:
   a. a wet beet flavor of no greater than about 25 on a scale of 0 to 60;
   b. a wet bitter flavor of no greater than about 12 on a scale of 0 to 60; and,
   c. a wet sour flavor of no greater than about 6 on a scale of 0 to 60.

5. A fiber material according to claim 4 including less than about 1.0 ppm of residual organic extraction solvent.

6. A fiber material according to claim 5 including less than about 0.1 ppm of residual organic extraction solvent.

7. A fiber material according to claim 4 wherein the soluble dietary fiber material is within a range of about 10% to 20% and said fiber material has a caloric content of less than about 0.6 calorie per gram.

8. A fiber material according to claim 3 further including a wet flavor profile characterized by a wet overall flavor of no greater than about 37 on a scale of 0 to 60.

9. A sugarbeet fiber material containing:
(a) less than about 10 ppm of residual organic extraction solvent;
(b) no more than about 234 ppb trans, trans-2,4-decadienal; and,
(c) no more than about 48 ppb 2-methoxy-3-sec-butylpyrazine.

10. A sugarbeet fiber material according to claim 9 containing:
(a) no more than about 98 ppb trans, trans-2,4-decadienal; and,
(b) no more than about 20 ppb 2-methoxy-3-sec-butylpyrazine.

11. A sugarbeet fiber material according to claim 10 containing:
(a) no more than about 35 ppb cis-3-hexenol;
(b) no more than about 98 ppb trans-2-heptenal;
(c) no more than about 35 ppb trans,cis-2,6-nonadienal;
(d) no more than about 98 ppb trans-2-nonenal; and,
(e) no more than about 434 ppb trans,trans-2,4-heptadienal.

12. A sugarbeet fiber material according to claim 11 containing less than about 1.0 ppm of residual alcohol.

13. A non-soy dietary fiber material comprising:
(a) at least about 80 wt % total dietary fiber, based upon the total dry weight of the material;
(b) at least about 10 wt % soluble fiber, based upon the total dietary fiber content;
(c) no more than about 234 ppb trans,trans-2,4-decadienal;
(d) no more than about 48 ppb 2-methoxy-3-sec-butylpyrazine; and,
(e) less than about 10 ppm of residual organic extraction solvent.

14. A dietary fiber material according to claim 13 having:
(a) no more than about 1 calorie per gram;
(b) no more than about 98 ppb trans,trans-2,4-decadienal; and,
(c) no more than about 20 ppb 2-methoxy-3-sec-butylpyrazine.

15. A dietary fiber material according to claim 14 having:
(a) no more than about 35 ppb cis-3-hexenol;
(b) no more than about 98 ppb trans-2-heptenal;
(c) no more than about 35 ppb trans,cis-2,6-nonadienal;
(d) no more than about 98 ppb trans-2-nonenal; and,
(e) no more than about 434 ppb trans,trans-2,4-heptadienal.

16. A dietary fiber material according to claim 15 including less than about 10 ppm of residual alcohol.

17. A process for improving the flavor and odor characteristics of previously washed, substantially organic extraction solvent-free, sugarbeet fiber material having trans,trans-2,4-decadienal and 2-methoxy-3-sec-butylpyrazine therein, said process including the steps of:
(a) decreasing an amount of said trans,trans-2,4-decadienal therein by at least about 40%, by weight; and,
(b) decreasing an amount of said 2-methoxy-3-sec-butylpyrazine therein by at least about 40%, by weight.

18. A process according to claim 17 wherein:
(a) said step of decreasing an amount of trans,trans-2,4-decadienal includes decreasing same by at least about 75% by weight; and,
(b) said step of decreasing an amount of 2-methoxy-3-sec-butylpyrazine includes decreasing same by at least about 75%, by weight.

19. A process according to claim 18 wherein:
(a) said previously washed sugarbeet fiber material includes: cis-3-hexenol; trans-2-heptenal; trans,cis-2,6-nonadienal; trans-2-nonenal; trans,trans-2,4-heptadienal; and, less than about 10 ppm of residual alcohol; and,
(b) said process includes a step of decreasing an amount of each of said cis-3-hexenol; trans-2-heptenal; trans,cis-2,6-nonadienal; trans-2-nonenal; and, trans,trans-2,4-heptadienal by at least about 30%.

20. A process according to claim 19 wherein:
(a) said process includes:
(i) decreasing said cis-3-hexenol by at least about 50%;
(ii) decreasing said trans-2-heptenal by at least about 75%;
(iii) decreasing said trans,cis-2,6-nonadienal by at least about 85%;
(iv) decreasing said trans-2-nonenal by at least about 45%; and,
(v) decreasing said trans,trans-2,4-heptadienal by at least about 90%.

* * * * *

UNITED STATES PATENT AND TRADEMARK OFFICE
CERTIFICATE OF CORRECTION

PATENT NO. : 5,112,638

DATED : May 12, 1992

INVENTOR(S) : Paul M. Cagley, et al

It is certified that error appears in the above-identified patent and that said Letters Patent is hereby corrected as shown below:

Title page, Item [63] "Continuation of" should read --Continuation-in-part of--.

Column 5, line 41 "(2.3X10; to 2.7X10;kg)" should read --(2.3X10$^7$ to 2.7X10$^7$;kg)--.

Column 14, line 1 "mad" should be --made--.

Column 21, line 57 "get" should be --wet--.

Column 22, line 47 delete "&" after the word "transferred".

Column 22, line 55 "155" should read --115--.

Column 25, line 3 "rewatered" should read --dewatered--.

Column 29, line 48 insert --the fiber is pumped through the unit by other means.-- after the word "Therefore,".

Column 36, line 36 "310" should read --310'--.

Column 42, line 28 insert --preferably there is less than about 0.1 ppm of residual-- after the word "more".

Column 46, line 18 "(5.00; T 0.5;" should read --(5.00; T = 0.5;--.

Column 49, line 18 insert --=--after the word "treatment".

UNITED STATES PATENT AND TRADEMARK OFFICE
CERTIFICATE OF CORRECTION

PATENT NO. : 5,112,638

DATED : May 12, 1992

INVENTOR(S) : Paul M. Cagley, et al

It is certified that error appears in the above-identified patent and that said Letters Patent is hereby corrected as shown below:

Column 52, line 46 insert --.-- after the word "washing".

Column 59, line 68 insert --(SDF)(%)-- after the word "Fiber".

Column 60, line 2 delete "(SDF)(%)" after the word "continued"--.

Column 60, line 49 "om" should read --on--.

Signed and Sealed this

Twenty-sixth Day of October, 1993

Attest:

BRUCE LEHMAN

Attesting Officer

Commissioner of Patents and Trademarks